(12) United States Patent
Kawai et al.

(10) Patent No.: US 10,547,202 B2
(45) Date of Patent: Jan. 28, 2020

(54) POWER SUPPLYING SYSTEM

(71) Applicant: Murata Manufacturing Co., Ltd., Nagaokakyo-shi, Kyoto-fu (JP)

(72) Inventors: Toru Kawai, Nagaokakyo (JP); Gaku Kamitani, Nagaokakyo (JP); Masahiro Otsuka, Nagaokakyo (JP); Ryoji Yamato, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 39 days.

(21) Appl. No.: 15/925,085

(22) Filed: Mar. 19, 2018

(65) Prior Publication Data

US 2018/0212458 A1    Jul. 26, 2018

Related U.S. Application Data

(63) Continuation of application No. PCT/JP2016/078292, filed on Sep. 26, 2016.

(30) Foreign Application Priority Data

Sep. 29, 2015   (JP) .................................. 2015-190932

(51) Int. Cl.
| | | |
|---|---|---|
| *H02J 7/00* | (2006.01) | |
| *H02J 7/34* | (2006.01) | |
| *H01M 4/505* | (2010.01) | |
| *H01M 4/525* | (2010.01) | |
| *H01M 4/58* | (2010.01) | |

(Continued)

(52) U.S. Cl.
CPC ............. *H02J 7/34* (2013.01); *H01M 2/1077* (2013.01); *H01M 4/131* (2013.01); *H01M 4/364* (2013.01);
(Continued)

(58) Field of Classification Search
CPC .... Y02E 60/12; G01R 31/3648; H01M 10/44; H02J 7/0031; H02J 7/0047
(Continued)

(56) References Cited

U.S. PATENT DOCUMENTS 5,606,242 A  *  2/1997  Hull .................... H02J 7/0004
                                                         320/106
5,633,573 A  *  5/1997  van Phuoc .......... H01M 6/5011
                                                         320/128

(Continued)

FOREIGN PATENT DOCUMENTS

| CN | 104319425 A | 1/2015 |
| JP | 03-121660 U1 | 12/1991 |

(Continued)

OTHER PUBLICATIONS

International Seach Report issued in International Application No. PCT/JP2016/078292, dated Dec. 13, 2016.

(Continued)

*Primary Examiner* — Arun C Williams
(74) *Attorney, Agent, or Firm* — Arent Fox LLP

(57) ABSTRACT

A power supplying system that includes a power supplying mechanism, an electric load, a power line, and a storage pack. The power supplying mechanism supplies a DC power. The electric load is connected to the power supplying mechanism by the power line. The storage pack is connected to the power line. The charging/discharging curve of the storage pack has a step difference that passes through the rated voltage of the power supplying mechanism. An average discharging voltage on a lower-SOC side of the start point of the step difference is −20% or more of the rated voltage. An average charging voltage on a higher-SOC side of the end point of the step difference is +20% or less of the rated voltage.

18 Claims, 32 Drawing Sheets

(51) Int. Cl.
*H01M 10/42* (2006.01)
*H01M 4/36* (2006.01)
*H01M 10/052* (2010.01)
*H01M 10/46* (2006.01)
*H01M 10/44* (2006.01)
*H01M 2/10* (2006.01)
*H01M 4/131* (2010.01)
*H01M 16/00* (2006.01)
*H01M 10/48* (2006.01)
*H01M 10/30* (2006.01)
*H01M 4/02* (2006.01)

(52) U.S. Cl.
CPC .......... *H01M 4/505* (2013.01); *H01M 4/525* (2013.01); *H01M 4/58* (2013.01); *H01M 4/5825* (2013.01); *H01M 10/052* (2013.01); *H01M 10/425* (2013.01); *H01M 10/44* (2013.01); *H01M 10/441* (2013.01); *H01M 10/46* (2013.01); *H01M 10/48* (2013.01); *H01M 16/00* (2013.01); *H02J 7/00* (2013.01); *H01M 10/30* (2013.01); *H01M 10/465* (2013.01); *H01M 2004/027* (2013.01); *H01M 2004/028* (2013.01)

(58) Field of Classification Search
USPC ........................................... 320/127
See application file for complete search history.

(56) References Cited

U.S. PATENT DOCUMENTS

| | | | |
|---|---|---|---|
| 7,465,518 | B2 | 12/2008 | Mansuetto et al. |
| 2004/0224229 | A1 | 11/2004 | Mansuetto et al. |
| 2006/0068272 | A1* | 3/2006 | Takami ............ B60L 3/0046 429/62 |
| 2006/0257741 | A1 | 11/2006 | Mansuetto et al. |
| 2013/0041538 | A1* | 2/2013 | Jin ............. B60L 50/64 701/22 |
| 2017/0170669 | A1 | 6/2017 | Wang et al. |

FOREIGN PATENT DOCUMENTS

| | | |
|---|---|---|
| JP | 2007-515753 A | 6/2007 |
| JP | 2014-036550 A | 2/2014 |
| JP | 2006-338889 A | 6/2014 |
| JP | 2014-233098 A | 12/2014 |
| WO | 2013016426 A1 | 1/2013 |

OTHER PUBLICATIONS

Written Opinion of the International Seaching Authority issued in International Application No. PCT/JP2016/078292, dated Dec. 13, 2016.

* cited by examiner

POWER SUPPLYING SYSTEM

CROSS REFERENCE TO RELATED APPLICATIONS

The present application is a continuation of International application No. PCT/JP2016/078292, filed Sep. 26, 2016, which claims priority to Japanese Patent Application No. 2015-190932, filed Sep. 29, 2015, the entire contents of each of which are incorporated herein by reference.

FIELD OF THE INVENTION

The present invention relates to a power supplying system.

BACKGROUND OF THE INVENTION

In recent years, there is an increasing prevalence of a power supplying system in which a power supplying mechanism, such as a power system for commercial purposes, a wind-power generation system, or a solar power generation system, and a storage pack are combined and connected to an electric load. In this power supplying system, the storage pack performs a function of storing electric power supplied from the power supplying mechanism or a system-stabilizing function of stabilizing the electric power supplied from the power supplying mechanism.

For example, in a power supplying system disclosed in Patent Document 1 in which a secondary battery is connected to an electric power system, it is stated that stable supply of electric power or backup at the time of power outage is enabled by performing charging/discharging between the electric power system and the secondary battery.

Patent Document 1: Japanese Patent Application Laid-Open No. 2014-233098

SUMMARY OF THE INVENTION

Meanwhile, a storage pack is generally degraded early by being brought into an overcharged state or overly discharged state. Accordingly, it is desirable to use a storage device within a range such that the SOC representing a charged state of the secondary battery (State of Charge: ratio of charged capacity relative to the charged amount in a fully charged state) is not in an overly charged/discharged state (SOC use range).

In the storage system disclosed in Patent Document 1, a controlling device including a charging/discharging instruction receiving unit, an operation instruction receiving unit, a SOC monitoring unit, an appropriate value determining unit, a charging/discharging controlling unit, and a charging/discharging start time determining unit, or a switch circuit is provided between the electric power system and the secondary battery, so as to monitor or control the SOC of the secondary battery, whereby the secondary battery is controlled so as not to be brought into an overly charged/discharged state, and charging/discharging to the electric power system is controlled.

However, since the controlling device or switch circuit is expensive and large in scale, there is a problem of being expensive and large in scale in the power supplying system disclosed in Patent Document 1 in which the controlling device or switch circuit is essential for monitoring or controlling the SOC of the secondary battery.

A principal object of the present invention is to achieve cost reduction and scale reduction of a power supplying system.

A power supplying system according to the present invention includes a power supplying mechanism, an electric load, a power line, and a storage pack. The power supplying mechanism supplies a DC power. The electric load is connected to the power supplying mechanism by the power line. The storage pack is connected to the power line. The charging discharging curve of the storage pack has a step difference that passes through the rated voltage of the power supplying mechanism. An average discharging voltage on a lower-SOC side of the start point of the step difference is −20% or more of the rated voltage. An average charging voltage on a higher-SOC side of the end point of the step difference is +20% or less of the rated voltage.

In the first power supplying system according to the present invention, the charging/discharging curve of the storage pack has a step difference that passes through the rated voltage of the power supplying mechanism. For this reason, the voltage of the storage pack is almost equal to the rated voltage of the power supplying mechanism in the step difference that the charging/discharging curve of the storage pack has. Accordingly, little electric current flows through the storage pack. Thus, there is not necessarily a need to provide a controlling device for monitoring or controlling the SOC of the storage pack in order to keep the SOC of the storage pack in an almost constant state. Therefore, cost reduction and scale reduction of the power supplying system can be achieved.

Further, in the first power supplying system according to the present invention, the average discharging voltage on the lower-SOC side of the start point of the step difference that the charging/discharging curve of the storage pack has is −20% or more of the rated voltage of the power supplying mechanism. For this reason, discharging occurs from the storage pack to the electric load when the voltage of the electric power that is supplied from the power supplying mechanism becomes lower than the voltage that the electric load needs due to decrease in the amount of power supply from the power supplying mechanism or increase in the power consumption of the electric load. This can suppress a situation in which the voltage of the electric power supplied to the electric load becomes lower than −20% of the rated voltage of the power supplying mechanism. Accordingly, occurrence of power outage caused by decrease in the voltage of the electric power supplied to the electric load or generation of hindrance in the electric load can be suppressed. Also, there is not necessarily a need to provide a monitoring device that monitors the voltage of the electric power supplied from the power supplying mechanism, the voltage of the storage pack, or the like. Therefore, cost reduction and scale reduction of the power supplying system can be achieved.

In the first power supplying system according to the present invention, the average charging voltage on the higher-SOC side of the end point of the step difference that the charging/discharging curve of the storage pack has is +20% or less of the rated voltage of the power supplying mechanism. For this reason, charging occurs from the power supplying mechanism to the storage pack when the voltage of the electric power that is supplied from the power supplying mechanism becomes higher than the voltage that the electric load needs due to increase in the amount of power supply from the power supplying mechanism or decrease in the power consumption of the electric load. This can suppress a situation in which the voltage of the electric power supplied to the electric load becomes higher than +20% of the rated voltage of the power supplying mechanism. Accordingly, occurrence of power outage caused by overvoltage of the electric power supplied to the electric load or generation of hindrance in the electric load can be suppressed. Also, there is not necessarily a need to provide a monitoring device that monitors the voltage of the electric power supplied from the power supplying mechanism, the voltage of the storage pack, or the like. Therefore, cost reduction and scale reduction of the power supplying system can be achieved.

In the first power supplying system according to the present invention, it is preferable that the average discharging voltage on the lower-SOC side of the start point of the step difference that the charging/discharging curve of the storage pack has is −2% or less of the rated voltage. In this case, frequency of charging/discharging of the storage pack can be reduced, and also degradation caused by charging/discharging of the storage pack can be prevented, so that the lifetime of the power supplying system can be prolonged. It is preferable that the average charging voltage on the higher-SOC side of the end point of the step difference that the charging/discharging curve of the storage pack has is +2% or more of the rated voltage. In this case, frequency of charging/discharging of the storage pack can be reduced, and also degradation caused by charging/discharging of the storage pack can be prevented, so that the lifetime of the power supplying system can be prolonged.

A second power supplying system according to the present invention includes a power supplying mechanism, an electric load, a power line, and a storage pack. The power supplying mechanism supplies a DC power. The electric load is connected to the power supplying mechanism by the power line. The storage pack is connected to the power line. The charging/discharging curve of the storage pack has a step difference that passes through the rated voltage of the power supplying mechanism. A voltage of a peak top on a curve (dQ/dV curve) obtained by differentiating the discharging curve of the storage pack with respect to the voltage on a lower-SOC side of a start point of the step difference is −20% or more of the rated voltage. A voltage of a peak top on a curve (dQ/dV curve) obtained by differentiating the charging curve of the storage pack with respect to the voltage on a higher-SOC side of an end point of the step difference is +20% or less of the rated voltage.

In the second power supplying system according to the present invention, the charging/discharging curve of the storage pack has a step difference that passes through the rated voltage of the power supplying mechanism. For this reason, the voltage of the storage pack is almost equal to the rated voltage of the power supplying mechanism in the step difference that the charging/discharging curve of the storage pack has. Accordingly, little electric current flows through the storage pack. Thus, there is not necessarily a need to provide a controlling device for monitoring or controlling the SOC of the storage pack in order to keep the SOC of the storage pack in an almost constant state. Therefore, cost reduction and scale reduction of the power supplying system can be achieved.

Further, in the second power supplying system according to the present invention, the voltage of the peak top on the curve (dQ/dV curve) obtained by differentiating the discharging curve of the storage pack with respect to the voltage on the lower-SOC side of the start point of the step difference that the charging/discharging curve of the storage pack has is −20% or more of the rated voltage. For this reason, discharging occurs from the storage pack to the electric load when the voltage of the electric power that is supplied from the power supplying mechanism becomes lower than the voltage that the electric load needs due to decrease in the amount of power supply from the power supplying mechanism or increase in the power consumption of the electric load. This can suppress a situation in which the voltage of the electric power supplied to the electric load becomes lower than −20% of the rated voltage of the power supplying mechanism. Accordingly, occurrence of power outage caused by decrease in the voltage of the electric power supplied to the electric load or generation of hindrance in the electric load can be suppressed. Also, there is not necessarily a need to provide a monitoring device that monitors the voltage of the electric power supplied from the power supplying mechanism, the voltage of the storage pack, or the like. Therefore, cost reduction and scale reduction of the power supplying system can be achieved.

In the second power supplying system according to the present invention, the voltage of the peak top on the curve (dQ/dV curve) obtained by differentiating the charging curve of the storage pack with respect to the voltage on the higher-SOC side of the end point of the step difference that the charging/discharging curve of the storage pack has is +20% or less of the rated voltage. For this reason, charging occurs from the power supplying mechanism to the storage pack when the voltage of the electric power that is supplied from the power supplying mechanism becomes higher than the voltage that the electric load needs due to increase in the amount of power supply from the power supplying mechanism or decrease in the power consumption of the electric load. This can suppress a situation in which the voltage of the electric power supplied to the electric load becomes higher than +20% of the rated voltage of the power supplying mechanism. Accordingly, occurrence of power outage caused by overvoltage of the electric power supplied to the electric load or generation of hindrance in the electric load can be suppressed. Also, there is not necessarily a need to provide a monitoring device that monitors the voltage of the electric power supplied from the power supplying mechanism, the voltage of the storage pack, or the like. Therefore, cost reduction and scale reduction of the power supplying system can be achieved.

In the second power supplying system according to the present invention, it is preferable that the voltage of the peak top on the curve (dQ/dV curve) obtained by differentiating the discharging curve of the storage pack with respect to the voltage on the lower-SOC side of the start point of the step difference that the charging/discharging curve of the storage pack has is −2% or less of the rated voltage. In this case, frequency of charging/discharging of the storage pack can be reduced, and also degradation caused by charging/discharging of the storage pack can be prevented, so that the lifetime of the power supplying system can be prolonged. It is preferable that the voltage of the peak top on the curve (dQ/dV curve) obtained by differentiating the charging curve of the storage pack with respect to the voltage on the higher-SOC side of the end point of the step difference that the charging/discharging curve of the storage pack has is +2% or more of the rated voltage. In this case, frequency of charging/discharging of the storage pack can be reduced, and also degradation caused by charging/discharging of the storage pack can be prevented, so that the lifetime of the power supplying system can be prolonged.

In the first and second power supplying systems according to the present invention, the storage pack may include one of a lithium ion secondary battery and a nickel hydrogen secondary battery.

In the first and second power supplying systems according to the present invention, the storage pack may include a lithium ion secondary battery. In this case, a positive electrode of the lithium ion secondary battery may include at least one kind selected from the group consisting of Li[Ni$_x$Mn$_{(2-x)}$]O$_4$ (0.05≤x≤0.45), Li[Co$_x$Mn$_{(2-x)}$]O$_4$ (0.1≤x≤1), Li[Fe$_x$Mn$_{(2-x)}$]O$_4$ (0.05≤x≤0.45), LiFe$_a$Mn$_b$Co$_c$Ni$_d$PO$_4$ (0≤a≤1, 0≤b≤1, 0≤c≤1, 0≤d≤1, a+b+c+d=1), and Li$_3$V$_2$(PO$_4$)$_3$ as a positive electrode active material.

In the first and second power supplying systems according to the present invention, the storage pack may include a lithium ion secondary battery. In this case, a positive electrode of the lithium ion secondary battery may include a plurality of kinds of positive electrode active materials.

In the first and second power supplying systems according to the present invention, the storage pack may include a lithium ion secondary battery, and a negative electrode of the lithium ion secondary battery may include a plurality of kinds of negative electrode active materials.

In the first and second power supplying systems according to the present invention, the storage pack may be configured in such a manner that a plurality of storage modules connected in parallel, each of the plurality of storage modules comprises a plurality of storage devices connected in series, and the plurality of storage modules may include storage modules that are different from each other in the number of connected storage devices.

In the first and second power supplying systems according to the present invention, the storage pack may include a plurality of kinds of storage modules having different kinds of storage devices. In this case, the charging/discharging curve of the storage pack can be provided with a step difference.

In each of the first and second power supplying systems according to the present invention, it is preferable that, in the storage pack, a ratio of a first capacity on the lower-SOC side of the start point of the step difference to a second capacity on the higher-SOC side of the end point of the step difference is within a range of 10:90 to 90:10.

The present invention can achieve cost reduction and scale reduction of a power supplying system.

DETAILED DESCRIPTION OF THE INVENTION

Hereafter, one example of a preferable embodiment in which the present invention is carried out will be described. However, the following embodiment is merely an exemplification. The present invention is in no way limited to the following embodiment. Also, in each of the drawings to which reference is made in the embodiment and the like, members having substantially the same function will be denoted with the same reference symbol.

Figure 1:
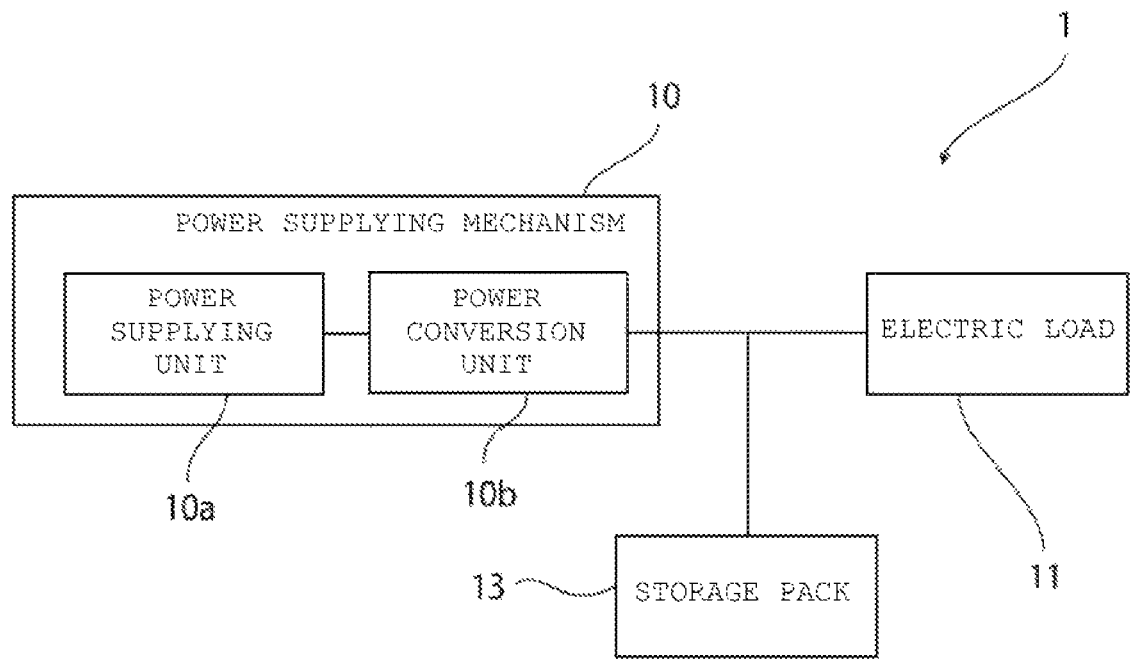
FIG. 1 is a schematic circuit diagram of a power supplying system according to one embodiment of the present invention.

FIG. 1 is a schematic circuit diagram of a power supplying system 1 according to the present embodiment.

The power supplying system 1 shown in FIG. 1 includes a power supplying mechanism 10. The power supplying mechanism 10 is a mechanism that supplies a DC power. The power supplying mechanism 10 can be configured with, for example, various power generators such as a diesel power generator, a wind power generator, a nuclear power generator, a hydraulic power generator, a thermal power generator, a fuel cell, and a solar cell, an internal-combustion engine, or the like. Also, the power supplying mechanism 10 may include a plurality of kinds of power generating mechanisms and the like.

In the present embodiment, an example will be described in which the power supplying mechanism 10 is configured with a power supplying unit 10a including a power generator or the like that supplies an AC power and a power conversion unit 10b that is connected to the power supplying unit 10a and having an AC-DC conversion function. Here, the power supplying mechanism may be configured in such a manner that a power conversion unit having a DC-DC conversion function is further connected at a stage subsequent to the power conversion unit 10b having an AC-DC conversion function.

Here, when a power generating mechanism that generates a DC power such as a solar cell is used as the power supplying unit, the power supplying mechanism may be configured only with the power supplying unit, or alternatively, the power supplying mechanism 10 may be configured with the power supplying unit and a power conversion unit connected thereto and having a DC-DC conversion function.

A rated voltage of the power supplying mechanism in the present application refers to the rated voltage of an output of the power supplying unit when the power supplying mechanism does not include a power conversion unit having an AC-DC conversion function, a power conversion unit having a DC-DC conversion function, or the like.

Also, when the power supplying mechanism includes a power conversion unit having an AC-DC conversion function, a power conversion unit having a DC-DC conversion function, or the like, the rated voltage of the power supplying mechanism refers to the rated voltage of an output of the last stage of these.

An electric load 11 is connected to the power supplying mechanism 10. The electric load 11 is a mechanism that converts the electric power deriving from the power supplying mechanism 10 into energy other than electric power, such as a kinetic energy. The electric load 11 may be, for example, a motor of an automobile, a marine vessel, an aircraft, or the like, or an electric appliance used in general houses, public facilities, private facilities, and the like (for example, an air conditioner, a computer, a server, or the like). Here, when a main body of the electric load 11 is operated with an AC power as a driving force, the electric load 11 may include a power conversion unit having a DC-AC conversion function. Also, when there is a need to convert the DC voltage, the electric load 11 may include a power conversion unit having a DC-DC conversion function.

The power supplying mechanism 10 and the electric load 11 are electrically connected with each other by a power line 12. A storage pack 13 is connected to the power line 12. Here, a fuse, an FET (Field effect transistor) switch, or the like may be provided between the power line 12 and the storage pack 13 in accordance with the needs. Also, the storage pack 13 may be connected to a controlling device for suppressing generation of abnormalities such as an overcharged state, overheating, and the like in accordance with the needs.

Here, in the present invention, the "storage pack" includes at least one kind of a storage device. Among the storage packs, a storage pack configured with at least one secondary battery is referred to as a "secondary battery pack". Accordingly, a lithium ion secondary battery pack means a secondary battery pack configured with at least one lithium ion secondary battery. A lead secondary battery pack means a secondary battery pack configured with at least one lead secondary battery. A nickel hydrogen secondary battery pack means a secondary battery pack configured with at least one nickel hydrogen secondary battery.

The storage pack may be configured with one storage module. The storage pack may be configured with a plurality of storage modules that are connected in parallel. The storage pack may be one in which a storage module is connected in parallel to at least one of a plurality of storage modules that are connected in series.

In the present invention, the "storage device" means a secondary battery such as a lead secondary battery, a lithium ion secondary battery, or a nickel hydrogen secondary battery, or a single cell such as a capacitor such as a lithium ion capacitor or an electric double-layer capacitor.

In the present invention, the "storage module" means one or more storage devices that are connected in series. Accordingly, the storage pack may have a storage module.

In the present invention, when the storage pack has a plurality of storage devices, the plurality of storage devices may be of the same kind or may include a plurality of kinds of storage devices.

Figure 2:
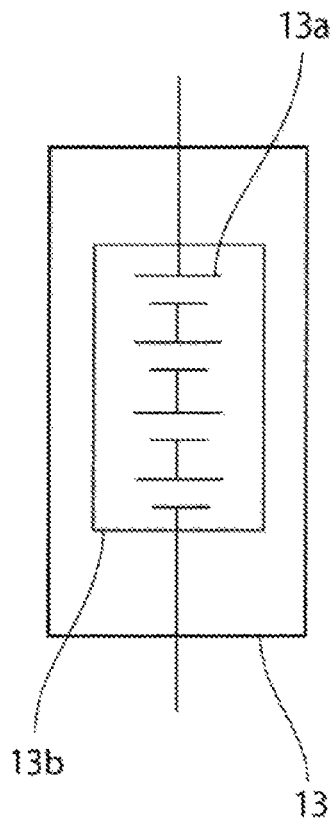
FIG. 2 is a schematic circuit diagram of a storage pack according to one embodiment of the present invention.

Referring to FIG. 2, in the present embodiment, an example will be described in which the storage pack 13 is configured with one storage module 13b including a plurality of storage devices 13a that are connected in series. Specifically, in the present embodiment, an example will be described in which the storage pack 13 is configured with four lithium ion secondary battery devices 13a that are connected in series.

Figure 3:
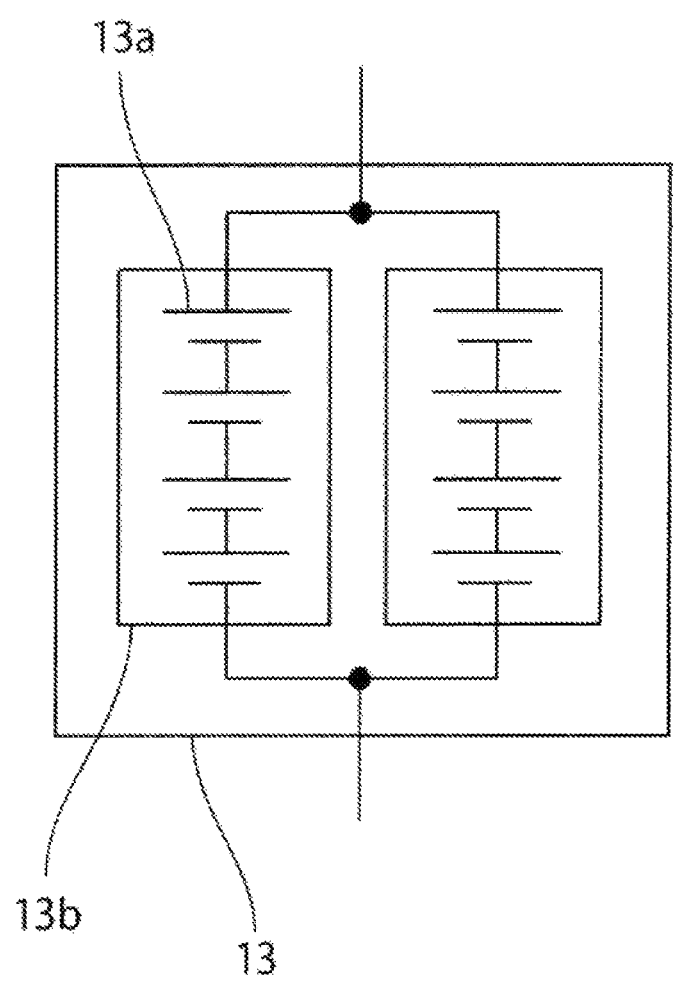
FIG. 3 is a schematic circuit diagram of a storage pack according to a first modification.
Figure 4:
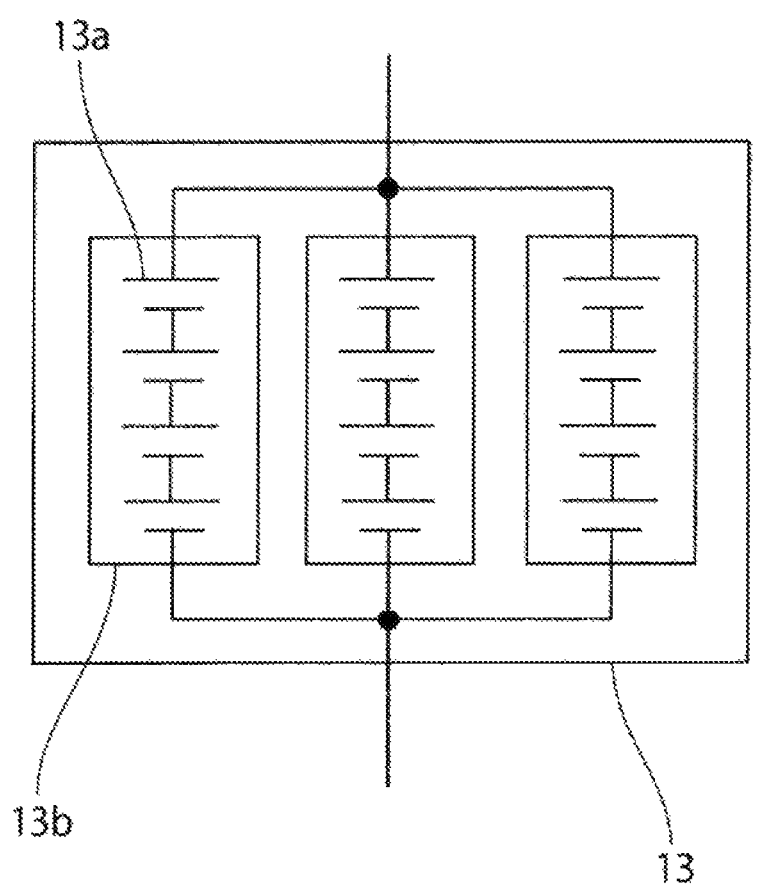
FIG. 4 is a schematic circuit diagram of a storage pack according to a second modification.
Figure 5:
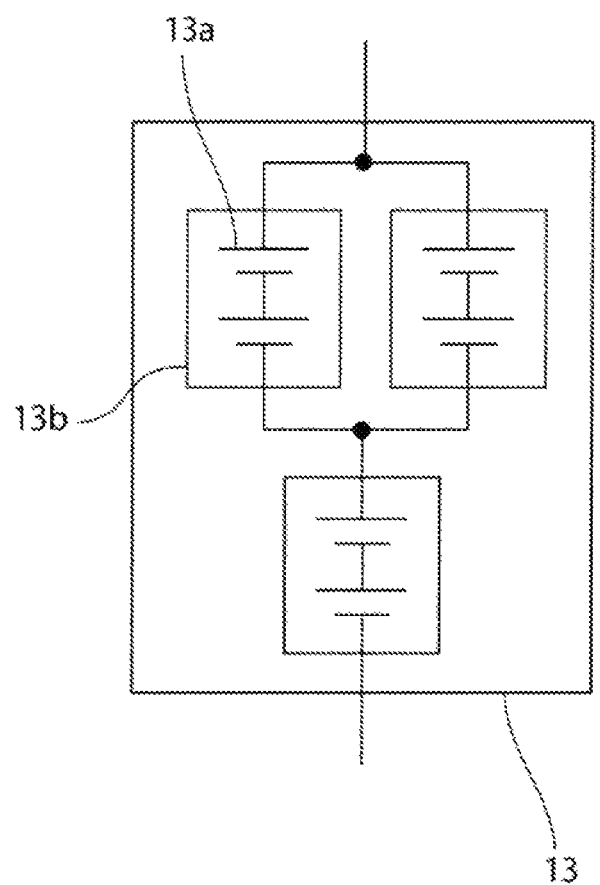
FIG. 5 is a schematic circuit diagram of a storage pack according to a third modification.

In the present invention, the storage pack need not necessarily be configured with one storage module. For example, referring to FIGS. 3 and 4, a plurality of storage modules 13b may be connected in parallel in the storage pack 13. For example, referring to FIG. 5, a storage module 13b may be connected in parallel to at least one of a plurality of storage modules 13b that are connected in series.

When the storage pack 13 is a lithium ion secondary battery pack, a positive electrode active material contained in a positive electrode of the lithium ion secondary battery may be, for example, an inorganic compound such as a composite oxide of a transition metal and lithium, a transition metal oxide, or a transition metal sulfide, an organic compound, or the like. Specific examples of the positive electrode active materials that are preferably used include composite oxides of transition metals and lithium such as $LiCoO_2$, $LiNiO_2$, $LiMnO_2$, $LiMn_2O_4$, $Li_{(1+a)}Ni_xMn_yCo_zO_2$ ($0 \leq a \leq 0.5$, $0 \leq x \leq 1$, $0 \leq y \leq 1$, $0 \leq z \leq 1$, $x+y+z=1$), $Li[Ni_xMn_{(2-x)}]O_4$ ($0 \leq x \leq 0.5$), $Li[Co_xMn_{(2-x)}]O_4$ ($0 \leq x \leq 1$), $Li[Fe_xMn_{(2-x)}]O_4$ ($0 \leq x \leq 1$), $LiNiVO_4$, $LiFePO_4$, $LiMnPO_4$, $LiCoPO_4$, $LiNiPO_4$, $LiFe_aMn_bCo_cNi_dPO_4$ ($0 \leq a \leq 1$, $0 \leq b \leq 1$, $0 \leq c \leq 1$, $0 \leq d \leq 1$, $a+b+c+d=1$), $Li_3V_2(PO_4)_3$, and $LiVOPO_4$; transition metal oxides such as $MnO_2$, $MnO$, and $V_2O_5$; transition metal sulfides such as FeS and TiS; and organic compounds such as quinone compounds, disulfide compounds, diazine compounds, radialene compounds, rubeanic acid compounds, and organic radical compounds. A compound obtained by replacing a transition metal element of the above inorganic compound with an element of different kind may be used as the positive electrode active material as well. These positive electrode active materials may be used either alone as one kind, or two or more kinds of positive electrode active materials may be simultaneously used.

A negative electrode active material contained in a negative electrode of the lithium ion secondary battery may be, for example, an inorganic compound such as a composite oxide of a transition metal and lithium, a metal oxide, an alloy-based material, or a transition metal sulfide, a carbon material, an organic compound, lithium metal, or the like. Specific examples of the negative electrode active materials include composite oxides of transition metals and lithium such as $LiMn_2O_4$, $Li_4Ti_5O_{12}$, $Li_2Ti_3O_7$, $LiMg_{1/2}Ti_{3/2}O_4$, $LiCo_{1/2}Ti_{3/2}O_4$, $LiZn_{1/2}Ti_{3/2}O_4$, $LiFeTiO_4$, $LiCrTiO_4$, $Li_2SrTi_6O_{14}$, $Li_2BaTi_6O_{14}$; metal oxides such as $TiO_2$, $WO_3$, $MoO_2$, $MnO_2$, $V_2O_5$, $SiO_2$, $SiO$, and $SnO_2$; alloy-based materials such as Si and Sn; transition metal sulfides such as FeS and TiS; carbon materials such as graphite, hardly graphitizable carbon, and easily graphitizable carbon; and organic compounds such as quinone compounds, disulfide compounds, diazine compounds, radialene compounds, rubeanic acid compounds, and organic radical compounds. A compound obtained by replacing a transition metal element of the above compound with an element of different kind may be used as the inorganic compound as well. These negative electrode active materials may be used either alone as one kind, or two or more kinds of negative electrode active materials may be simultaneously used. Further, a material obtained by subjecting the above negative electrode active material to a lithium ion pre-doping treatment may be used as the negative electrode active material as well.

Figure 6:
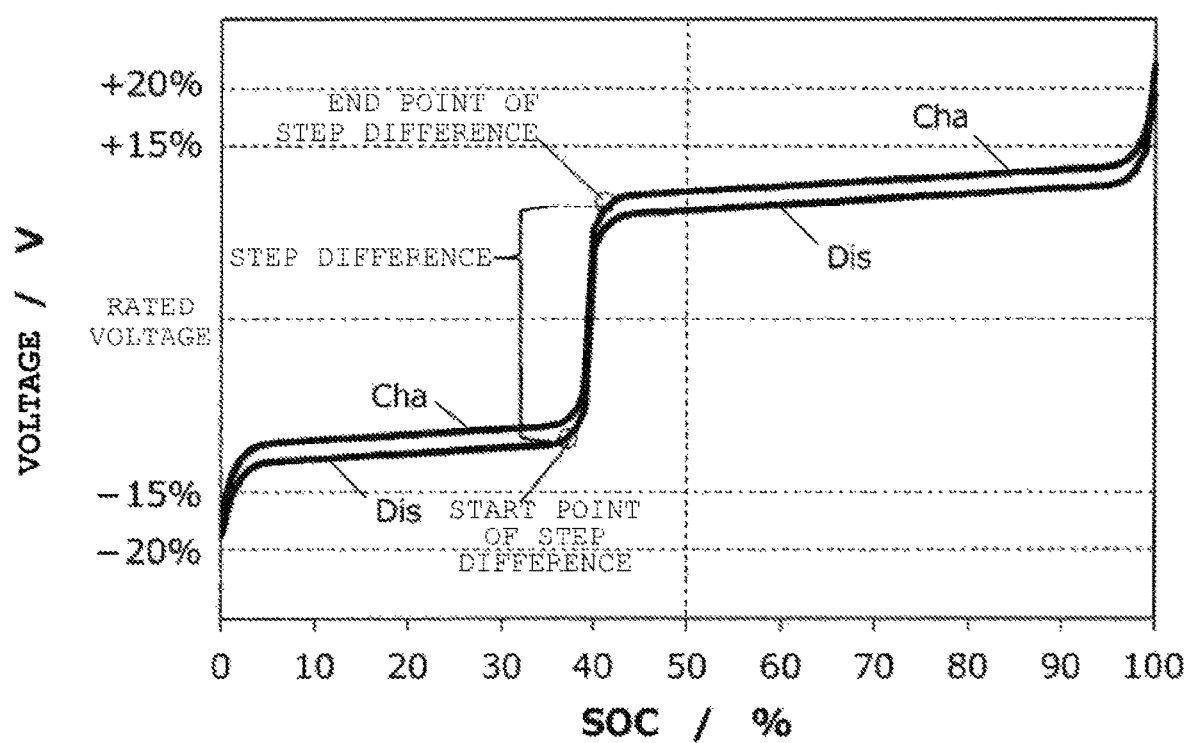
FIG. 6 is a view describing a charging/discharging curve of the storage pack in one embodiment of the present invention.

FIG. 6 is a view describing a charging/discharging curve of the storage pack in the present embodiment. In more detail, the charging/discharging curve of the storage pack 13 shown in FIG. 6 is a charging/discharging curve obtained when constant-current charging/discharging is performed at a current value of 0.2 C in an atmosphere of 25° C.±5° C. within a voltage range from a discharging end voltage to a charging end voltage.

As shown in FIG. 6, the power supplying system 1 satisfies the following conditions (a), (b), and (c). Here, in FIG. 6, the rated voltage represents the rated voltage of the power supplying mechanism 10; Cha represents the charging curve of the storage pack 13; and Dis represents the discharging curve of the storage pack 13.

(a) The charging/discharging curve of the storage pack has a step difference that passes through the rated voltage of the power supplying mechanism 10.

(b) An average discharging voltage on a lower-SOC side of a start point of the step difference that the charging/discharging curve of the storage pack 13 has is −20% or more of the rated voltage.

(c) An average charging voltage on a higher-SOC side of an end point of the step difference that the charging/discharging curve of the storage pack 13 has is +20% or less of the rated voltage.

Figure 7:
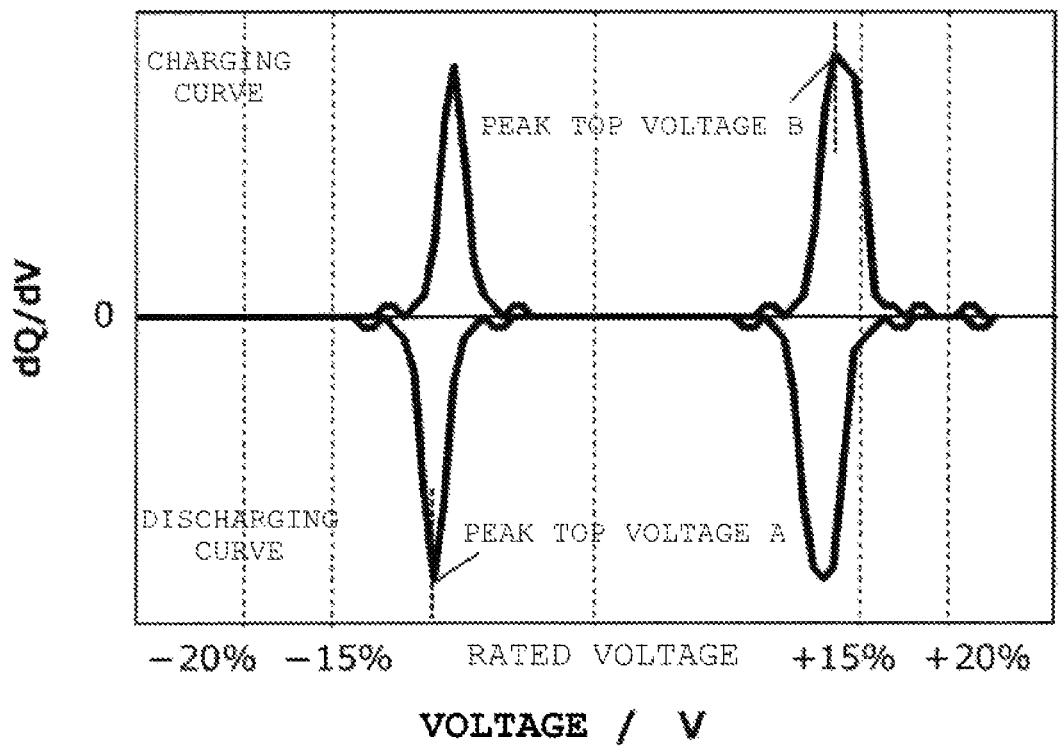
FIG. 7 is a view describing a dQ/dV curve of the storage pack in one embodiment of the present invention.

FIG. 7 is a view describing a dQ/dV curve of the storage pack 13 in the present embodiment. In more detail, the dQ/dV curve of the storage pack 13 shown in FIG. 7 is a curve (dQ/dV curve) obtained by differentiating the charging/discharging curve with respect to the voltage when constant-current charging/discharging is performed at a current value of 0.2 C in an atmosphere of 25° C.±5° C. within a voltage range from a discharging end voltage to a charging end voltage.

Here, when a plurality of peaks are present on the dQ/dV curve (discharging curve) of the storage pack 13 in a voltage range lower than the rated voltage of the power supplying mechanism 10 or when a plurality of peaks are present on the dQ/dV curve (charging curve) of the storage pack 13 in a voltage range higher than the rated voltage of the power supplying mechanism 10, the maximum peak voltage in each case shall be defined as the peak top voltage.

As shown in FIG. 7, the power supplying system 1 further satisfies the following conditions (d) and (e).

(d) A voltage of the peak top on the curve (dQ/dV curve) obtained by differentiating the discharging curve of the storage pack 13 with respect to the voltage on the lower-SOC side of the start point of the step difference that the charging/discharging curve of the storage pack 13 has is −20% or more of the rated voltage.

(e) A voltage of the peak top on the curve (dQ/dV curve) obtained by differentiating the charging curve of the storage pack 13 with respect to the voltage on the higher-SOC side of the end point of the step difference that the charging/discharging curve of the storage pack 13 has is +20% or less of the rated voltage.

In the present invention, the "step difference of the charging/discharging curve" refers to a range in which the voltage changes greatly within a range of SOC of the second storage pack being 5% or more and 95% or less. Specifically, the "step difference of the charging/discharging curve" refers to a range in which the absolute value of ΔV/ΔSOC, which is a ratio of the change of the voltage (ΔV) of at least one of the charging curve and the discharging curve relative to the change of SOC (ΔSOC), is (0.008×rated voltage) V/% or more within a range of SOC being 5% or more and 95% or less. Here, the rated voltage is the value (unit: V) of the rated voltage of the power supplying mechanism 10.

The "start point of the step difference" means the minimum voltage of the discharging curve within a range of one step difference and the SOC at that voltage.

The "average discharging voltage on the lower-SOC side of the start point of the step difference" refers to an arithmetic average value of the voltage of the discharging curve within a range from the SOC being 0% to the SOC at the start point of the step difference.

The "end point of the step difference" means the maximum voltage of the charging curve within a range of the same one step difference and the SOC at that voltage.

The "average charging voltage on the higher-SOC side of the end point of the step difference" refers to an arithmetic average value of the voltage of the charging curve within a range from the SOC at the end point of the step difference to the SOC being 100%.

Here, the power supplying system 1 of the present embodiment satisfies all of the conditions (a), (b), (c), (d), and (e); however, the present invention is not limited thereto. The storage system according to the present invention may be configured to satisfy only the conditions (a), (b), and (c). Also, the storage system according to the present invention may be configured to satisfy only the conditions (a), (d), and (e).

The power supplying system 1 according to the present embodiment satisfies the condition (a). For this reason, the voltage of the storage pack 13 is almost equal to the rated voltage of the power supplying mechanism 10 in the step difference that the charging/discharging curve of the storage pack 13 has. Accordingly, little electric current flows through the storage pack 13. Thus, there is not necessarily a need to provide a controlling device for monitoring or controlling the SOC of the storage pack 13 in order to keep the SOC of the storage pack 13 in an almost constant state. Also, the capacity required in the storage pack 13 can be reduced. Therefore, cost reduction and scale reduction of the power supplying system 1 can be achieved. Further, the frequency of charging-discharging of the storage pack 13 can be reduced. For this reason, degradation of the storage pack 13 due to repetition of the charging/discharging cycles and degradation caused by heat generation accompanying the charging/discharging can be suppressed. As a result, the exchange cost and the maintenance cost of the storage pack 13 can be reduced, so that the running cost of the power supplying system 1 can be lowered.

Further, the power supplying system 1 satisfies at least one of the conditions (b) and (d). For this reason, discharging occurs from the storage pack 13 to the electric load 11 when the voltage of the electric power that is supplied from the power supplying mechanism 10 becomes lower than the voltage that the electric load 11 needs due to decrease in the amount of power supply from the power supplying mechanism 10 or increase in the power consumption of the electric load 11. Also, for example, when the power supply from the power supplying mechanism 10 stops, discharging occurs from the storage pack 13 to the electric load 11. This can suppress a situation in which the voltage of the electric power supplied to the electric load 11 becomes lower than −20% of the rated voltage of the power supplying mechanism 10. Accordingly, occurrence of power outage caused by decrease in the voltage of the electric power supplied to the electric load 11 or generation of hindrance in the electric load 11 can be suppressed. Also, there is not necessarily a need to provide a monitoring device that monitors the voltage of the electric power supplied from the power supplying mechanism 10, the voltage of the storage pack 13, or the like. Therefore, cost reduction and scale reduction of the power supplying system 1 can be achieved. From this viewpoint, the power supplying system 1 preferably satisfies at least one of the following conditions (b1) and (d1).

(b1) An average discharging voltage on a lower-SOC side of a start point of the step difference that the charging/discharging curve of the storage pack 13 has is −15% or more of the rated voltage.

(d1) A voltage of the peak top on the curve (dQ/dV curve) obtained by differentiating the discharging curve of the storage pack 13 with respect to the voltage on the lower-SOC side of the start point of the step difference that the charging/discharging curve of the storage pack 13 has is −15% or more of the rated voltage.

As described above, when the decrease in the amount of power supply from the power supplying mechanism 10 or the increase in the power consumption of the electric load 11 is dissolved after discharging occurs from the storage pack 13 to the electric load 11, the voltage of the storage pack 13 is almost equal to the rated voltage of the power supplying mechanism 10 in the step difference that the charging/discharging curve of the storage pack 13 has because the condition (a) is satisfied in the power supplying system 1. For this reason, the storage pack 13 is automatically charged by the electric power from the power supplying mechanism 10. Thus, there is not necessarily a need to provide a special controlling device in the storage pack 13. Accordingly, cost reduction and scale reduction of the power supplying system 1 can be achieved.

Further, the power supplying system 1 satisfies at least one of the conditions (c) and (e). For this reason, charging occurs from the electric load 11 to the storage pack 13 when the voltage of the electric power that is supplied from the power supplying mechanism 10 becomes higher than the voltage that the electric load 11 needs due to increase in the amount of power supply from the power supplying mechanism 10 or decrease in the power consumption of the electric load 11. Also, for example, when the electric load 11 has a motor and regenerated energy is produced from the motor, charging occurs from the electric load 11 to the storage pack 13. This can suppress a situation in which the voltage of the electric power supplied to the electric load 11 becomes higher than +20% of the rated voltage of the power supplying mechanism 10. Accordingly, occurrence of power outage caused by overvoltage of the electric power supplied to the electric load 11 or generation of hindrance in the electric load 11 can be suppressed. Also, there is not necessarily a need to provide a monitoring device that monitors the voltage of the electric power supplied from the power supplying mechanism 10, the voltage of the storage pack 13, or the like. Therefore, cost reduction and scale reduction of the power supplying system 1 can be achieved. From this viewpoint, the power supplying system 1 preferably satisfies at least one of the following conditions (c1) and (e1).

(c1) An average charging voltage on a higher-SOC side of an end point of the step difference that the charging/discharging curve of the storage pack 13 has is +15% or less of the rated voltage.

(e1) A voltage of the peak top on the curve (dQ/dV curve) obtained by differentiating the charging curve of the storage pack 13 with respect to the voltage on the higher-SOC side of the end point of the step difference that the charging/discharging curve of the storage pack 13 has is +15% or less of the rated voltage.

As described above, when the increase in the amount of power supply from the power supplying mechanism 10 or the decrease in the power consumption of the electric load 11 is dissolved after charging occurs from the power supplying mechanism 10 to the storage pack 13, the voltage of the storage pack 13 is almost equal to the rated voltage of the power supplying mechanism 10 in the step difference that the charging/discharging curve of the storage pack 13 has because the condition (a) is satisfied in the power supplying system 1. For this reason, the storage pack 13 is automatically discharged and supplies electric power to the electric load 11. Thus, there is not necessarily a need to provide a special controlling device in the storage pack 13. Accordingly, cost reduction and scale reduction of the power supplying system 1 can be achieved.

In the power supplying system 1, it is preferable that the average discharging voltage on the lower-SOC side of the start point of the step difference that the charging/discharging curve of the storage pack 13 has is −2% or less of the rated voltage. In this case, frequency of charging/discharging of the storage pack 13 can be reduced, and also degradation caused by charging/discharging of the storage pack 13 can be prevented, so that the lifetime of the power supplying system can be prolonged. From a similar viewpoint, it is preferable in the power supplying system 1 that the voltage of the peak top on the curve (dQ/dV curve) obtained by differentiating the discharging curve of the storage pack 13 with respect to the voltage on the lower-SOC side of the start point of the step difference that the charging/discharging curve of the storage pack 13 has is −2% or less of the rated voltage.

Also, in the power supplying system 1, it is preferable that the average charging voltage on the higher-SOC side of the end point of the step difference that the charging/discharging curve of the storage pack 13 has is +2% or more of the rated voltage. In this case, frequency of charging/discharging of the storage pack 13 can be reduced, and also degradation caused by charging/discharging of the storage pack 13 can be prevented, so that the lifetime of the power supplying system can be prolonged. From a similar viewpoint, it is preferable in the power supplying system 1 that the voltage of the peak top on the curve (dQ/dV curve) obtained by differentiating the charging curve of the storage pack 13 with respect to the voltage on the higher-SOC side of the end point of the step difference that the charging/discharging curve of the storage pack 13 has is +2% or more of the rated voltage.

The following methods can be considered as a method for allowing the power supplying system 1 to satisfy the conditions (a), (b), (c), (d), and (e).

(Method 1)

In this method, the storage pack 13 is configured as a lithium ion secondary battery pack having a lithium ion secondary battery, and the positive electrode of the lithium ion secondary battery is configured by using a positive electrode active material that allows the charging/discharging curve of the lithium ion secondary battery to have a step difference. Alternatively, the negative electrode of the lithium ion secondary battery is configured by using a negative electrode active material that allows the charging/discharging curve of the lithium ion secondary battery to have a step difference.

Specific examples of the positive electrode active material that allows the charging/discharging curve of the lithium ion secondary battery to have a step difference include $Li[Ni_xMn_{(2-x)}]O_4$ ($0.05 \leq x \leq 0.45$), $Li[Co_xMn_{(2-x)}]O_4$ ($0.1 \leq x \leq 1$), $Li[Fe_xMn_{(2-x)}]O_4$ ($0.05 \leq x \leq 0.45$), $LiFe_aMn_bCo_cNi_dPO_4$ ($0 \leq a \leq 1$, $0 \leq b \leq 1$, $0 \leq c \leq 1$, $0 \leq d \leq 1$, $a+b+c+d=1$), and $Li_3V_2(PO_4)_3$. These positive electrode active materials may be used either alone as one kind or by mixing a plurality of kinds of these.

(Method 2)

In this method, the storage pack 13 is configured as a lithium ion secondary battery pack having a lithium ion secondary battery, and the positive electrode of the lithium ion secondary battery is allowed to contain a plurality of kinds of positive electrode active materials.

For example, it may be considered to incorporate the following positive electrode active materials into the positive electrode of the lithium ion secondary battery.

1) $LiFePO_4$ and $LiCoO_2$
2) $LiFePO_4$ and $LiMn_2O_4$
3) $LiFePO_4$ and $Li_{(1+a)}Ni_xMn_yCo_zO_2$ ($0 \leq a \leq 0.5$, $0 \leq x \leq 1$, $0 \leq y \leq 1$, $0 \leq z \leq 1$, $x+y+z=1$)
4) $LiFePO_4$ and $Li[Ni_xMn_{(2-x)}]O_4$ ($0 \leq x \leq 0.5$)
5) $LiFePO_4$ and $LiMnPO_4$
6) $LiFePO_4$ and $LiCoPO_4$
7) $LiMn_2O_4$ and $Li[Ni_xMn_{(2-x)}]O_4$ ($0 \leq x \leq 0.5$)
8) $LiMn_2O_4$ and $LiCoPO_4$ (Method 3)

In this method, the storage pack 13 is configured as a lithium ion secondary battery pack having a lithium ion secondary battery, and the negative electrode of the lithium ion secondary battery is allowed to contain a plurality of kinds of negative electrode active materials.

For example, it may be considered to incorporate the following negative electrode active materials into the negative electrode of the lithium ion secondary battery.

1) graphite and $Li_4Ti_5O_{12}$
2) graphite and SiO
3) graphite and $SnO_2$ 4) graphite and Si
5) graphite and Sn
6) hardly graphitizable carbon and $Li_4Ti_5O_{12}$
7) hardly graphitizable carbon and SiO
8) hardly graphitizable carbon and $SnO_2$
9) hardly graphitizable carbon and Si
10) hardly graphitizable carbon and Sn
11) $Li_4Ti_5O_{12}$ and SiO
12) $Li_4Ti_5O_{12}$ and $SnO_2$
13) $Li_4Ti_5O_{12}$ and Si
14) $Li_4Ti_5O_{12}$ and Sn (Method 4)

In this method, the storage pack 13 is configured with a plurality of storage devices of one kind and is configured with storage modules that are connected in parallel and different from each other in the number of connected storage devices.

(Method 5)

In this method, the storage pack 13 is configured with a plurality of kinds of storage modules having different kinds of storage devices.

For example, it may be considered to incorporate lithium ion secondary batteries containing different positive electrode active materials into the storage pack 13, as shown in the following 1) to 8).

1) lithium ion secondary battery containing $LiFePO_4$ as a positive electrode active material and lithium ion secondary battery containing $LiCoO_2$ as a positive electrode active material 2) lithium ion secondary battery containing $LiFePO_4$ as a positive electrode active material and lithium ion secondary battery containing $LiMn_2O_4$ as a positive electrode active material 3) lithium ion secondary battery containing $LiFePO_4$ as a positive electrode active material and lithium ion secondary battery containing $Li_{(1+a)}Ni_xMn_yCo_zO_2$ (0≤a≤0.5, 0≤x≤1, 0≤y≤1, 0≤z≤1, x+y+z=1) as a positive electrode active material 4) lithium ion secondary battery containing $LiFePO_4$ as a positive electrode active material and lithium ion secondary battery containing $Li[Ni_xMn_{(2-x)}]O_4$ (0≤x≤0.5) as a positive electrode active material 5) lithium ion secondary battery containing $LiFePO_4$ as a positive electrode active material and lithium ion secondary battery containing $LiMnPO_4$ as a positive electrode active material 6) lithium ion secondary battery containing $LiFePO_4$ as a positive electrode active material and lithium ion secondary battery containing $LiCoPO_4$ as a positive electrode active material 7) lithium ion secondary battery containing $LiMn_2O_4$ as a positive electrode active material and lithium ion secondary battery containing $Li[Ni_xMn_{(2-x)}]O_4$ (0≤x≤0.5) as a positive electrode active material 8) lithium ion secondary battery containing $LiMn_2O_4$ as a positive electrode active material and lithium ion secondary battery containing $LiCoPO_4$ as a positive electrode active material For example, it may be considered to incorporate lithium ion secondary batteries containing different negative electrode active materials into the storage pack 13, as shown in the following 9) to 22).

9) lithium ion secondary battery containing graphite as a negative electrode active material and lithium ion secondary battery containing $Li_4Ti_5O_{12}$ as a negative electrode active material 10) lithium ion secondary battery containing graphite as a negative electrode active material and lithium ion secondary battery containing SiO as a negative electrode active material 11) lithium ion secondary battery containing graphite as a negative electrode active material and lithium ion secondary battery containing $SnO_2$ as a negative electrode active material 12) lithium ion secondary battery containing graphite as a negative electrode active material and lithium ion secondary battery containing Si as a negative electrode active material 13) lithium ion secondary battery containing graphite as a negative electrode active material and lithium ion secondary battery containing Sn as a negative electrode active material 14) lithium ion secondary battery containing hardly graphitizable carbon as a negative electrode active material and lithium ion secondary battery containing $Li_4Ti_5O_{12}$ as a negative electrode active material 15) lithium ion secondary battery containing hardly graphitizable carbon as a negative electrode active material and lithium ion secondary battery containing SiO as a negative electrode active material 16) lithium ion secondary battery containing hardly graphitizable carbon as a negative electrode active material and lithium ion secondary battery containing $SnO_2$ as a negative electrode active material 17) lithium ion secondary battery containing hardly graphitizable carbon as a negative electrode active material and lithium ion secondary battery containing Si as a negative electrode active material 18) lithium ion secondary battery containing hardly graphitizable carbon as a negative electrode active material and lithium ion secondary battery containing Sn as a negative electrode active material 19) lithium ion secondary battery containing $Li_4Ti_5O_{12}$ as a negative electrode active material and lithium ion secondary battery containing SiO as a negative electrode active material 20) lithium ion secondary battery containing $Li_4Ti_5O_{12}$ as a negative electrode active material and lithium ion secondary battery containing $SnO_2$ as a negative electrode active material 21) lithium ion secondary battery containing $Li_4Ti_5O_{12}$ as a negative electrode active material and lithium ion secondary battery containing Si as a negative electrode active material 22) lithium ion secondary battery containing $Li_4Ti_5O_{12}$ as a negative electrode active material and lithium ion secondary battery containing Sn as a negative electrode active material Also, for example, at least two kinds of storage modules selected from the group consisting of a lithium ion secondary battery module, a nickel hydrogen secondary battery module, a lead secondary battery module, and a capacitor may be incorporated into the storage pack 13.

(Method 6)

In this method, the storage pack 13 is configured with a plurality of storage modules connected in parallel and having voltages that are different from each other, a switch disposed in at least one of the storage modules, and a controlling unit that turns on/off the switch. In the case of the method 6, a step difference is formed in the charging/discharging curve by on/off of the switch.

In the method 6, the switch is preferably provided in a storage module having a relatively low voltage. In this case, the step difference can be formed in the charging/discharging curve by turning off the switch before the storage module provided with the switch is overly charged.

On the other hand, when the switch is provided in a storage module having a relatively high voltage, the step difference can be formed in the charging/discharging curve by turning off the switch before the storage module provided with the switch is overly discharged.

Here, the above (method 1) to (method 6) can be carried out by being suitable combined.

In the storage pack 13 in the power supplying system 1, it is preferable that a ratio of a capacity on the lower-SOC side of the start point of the step difference that the charging/discharging curve of the storage pack 13 has to a capacity on the higher-SOC side of the end point of the step difference that the charging/discharging curve of the storage pack 13 has is within a range of 10:90 to 90:10. In this case, both of voltage fall and overvoltage of the electric power supplied to the electric load 11 can be further prevented by the storage pack 13, so that further cost reduction and scale reduction of the power supplying system 1 can be achieved.

EXAMPLES

Example 1

A power supplying mechanism 10 having a rated voltage of 48 V was configured with a power source of three-phase AC 200 V as a power supplying unit 10a and an AC-DC converter that converts the electric power of three-phase AC 200 V into the electric power of DC 48 V as a power conversion unit 10b having an AC-DC conversion function. With use of this power supplying mechanism 10 and a storage module having a configuration described below as a storage pack 13, a power supplying system 1 according to the above embodiment was constructed.

With use of $Li[Ni_{0.25}Mn_{1.75}]O_4$ as a positive electrode active material and graphite as a negative electrode active material, a lithium ion secondary battery having an A/C ratio of 1.2 and a capacity of 10 Ah was prepared. For use as a storage pack 13, a storage module was prepared in which 11 lithium ion secondary batteries thus formed were connected in series.

Figure 8:
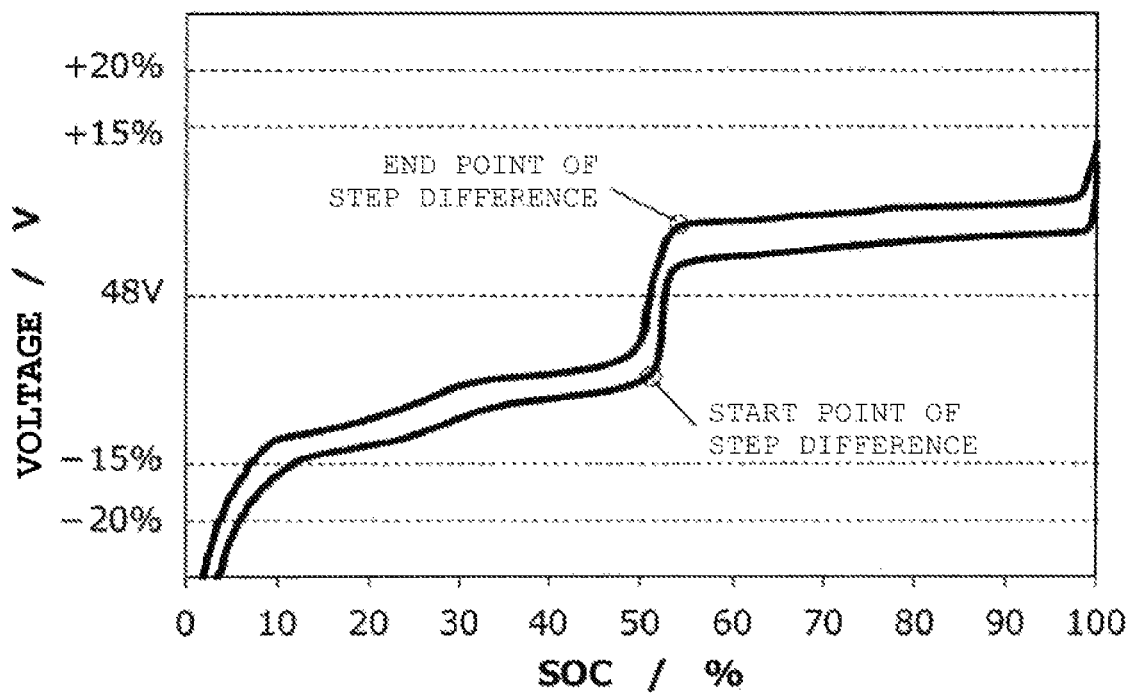
FIG. 8 is a charging/discharging curve of the storage pack 13 prepared in Example 1.
Figure 9:
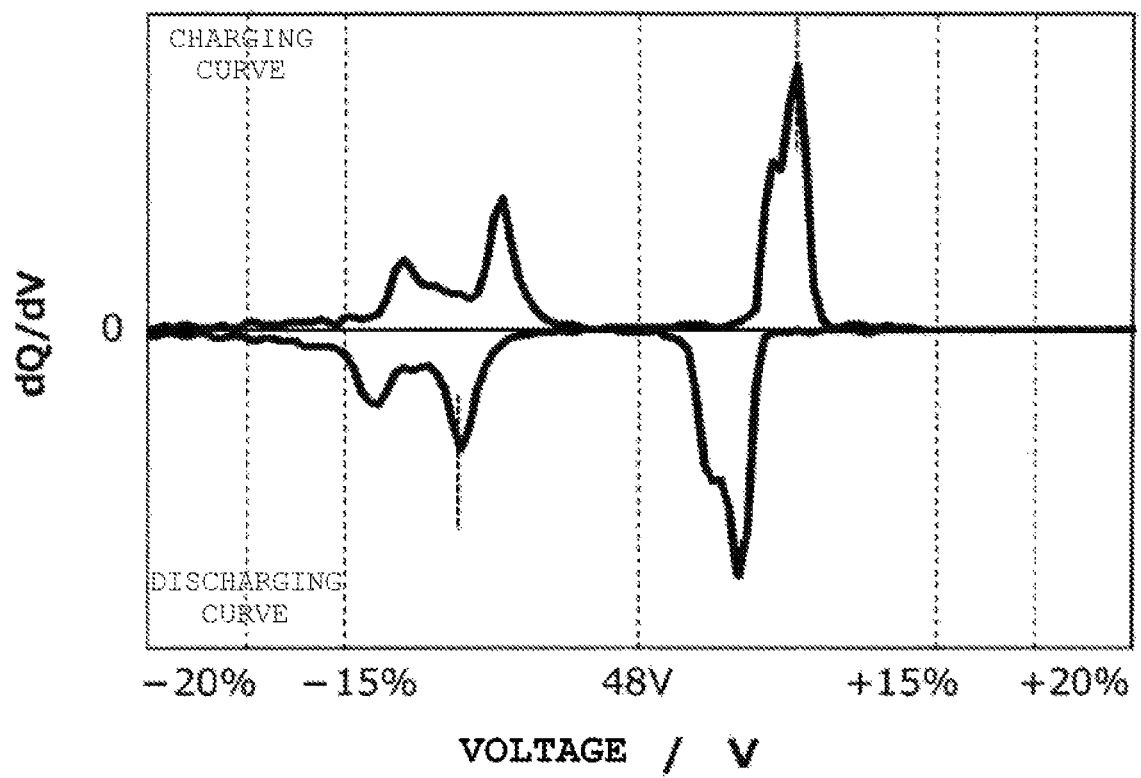
FIG. 9 is a curve (dQ/dV curve) obtained by differentiating the charging/discharging curve of the storage pack 13 prepared in Example 1 with respect to the voltage.

FIG. 8 shows a charging/discharging curve of the storage pack 13 prepared in the present Example, and FIG. 9 shows a curve (dQ/dV curve) obtained by differentiating the charging/discharging curve of the storage pack 13 with respect to the voltage.

Example 2

With use of $Li[Ni_{0.05}Mn_{1.95}]O_4$ as a positive electrode active material and graphite as a negative electrode active material, a lithium ion secondary battery having an A/C ratio of 1.2 and a capacity of 10 Ah was prepared. A power supplying system 1 was constructed in the same manner as in Example 1 except that a storage module in which 11 lithium ion secondary batteries thus prepared were connected in series was used as a storage pack 13.

Figure 10:
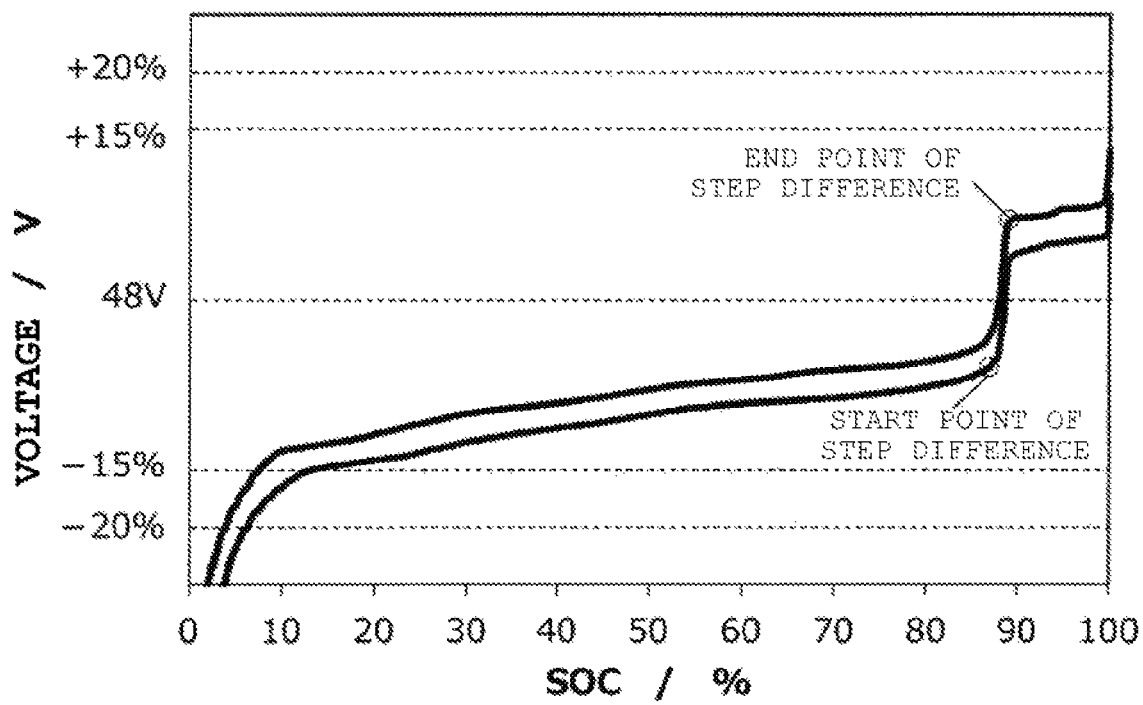
FIG. 10 is a charging/discharging curve of the storage pack 13 prepared in Example 2.
Figure 11:
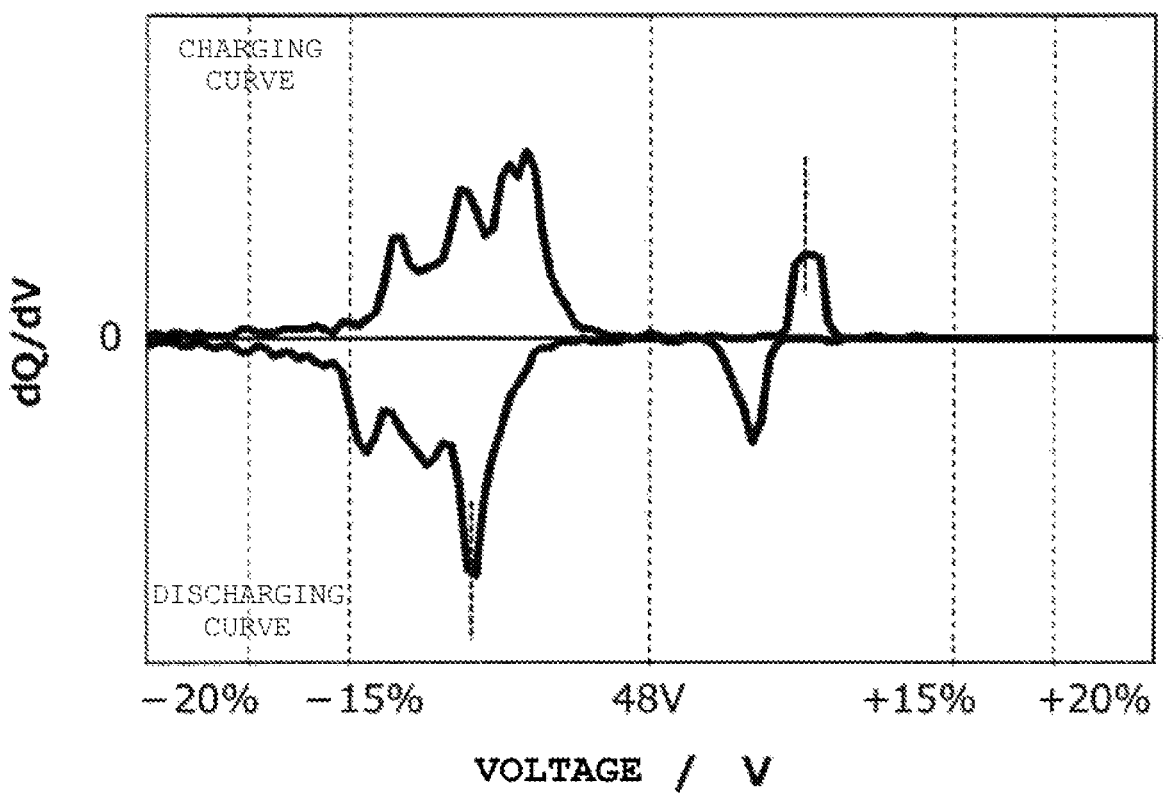
FIG. 11 is a curve (dQ/dV curve) obtained by differentiating the charging/discharging curve of the storage pack 13 prepared in Example 2 with respect to the voltage.

FIG. 10 shows a charging/discharging curve of the storage pack 13 prepared in the present Example, and FIG. 11 shows a curve (dQ/dV curve) obtained by differentiating the charging/discharging curve of the storage pack 13 with respect to the voltage.

Example 3

With use of $Li[Ni_{0.15}Mn_{1.85}]O_4$ as a positive electrode active material and graphite as a negative electrode active material, a lithium ion secondary battery having an A/C ratio of 1.2 and a capacity of 10 Ah was prepared. A power supplying system 1 was constructed in the same manner as in Example 1 except that a storage module in which 11 lithium ion secondary batteries thus prepared were connected in series was used as a storage pack 13.

Figure 12:
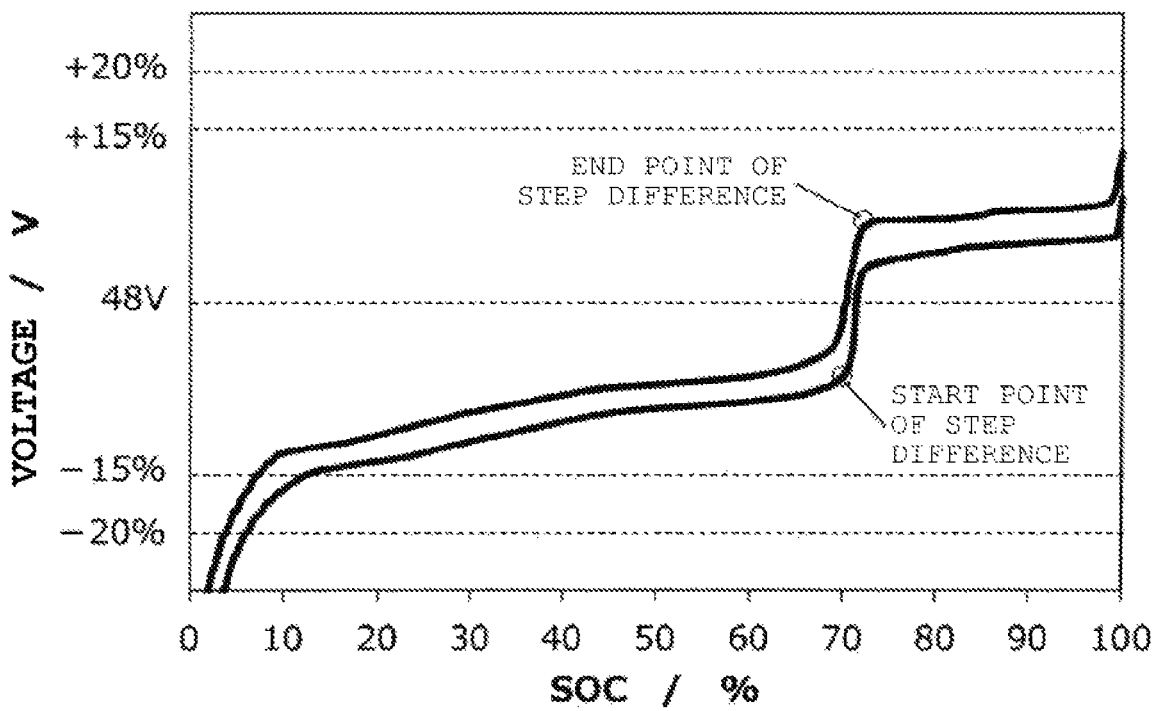
FIG. 12 is a charging/discharging curve of the storage pack 13 prepared in Example 3.
Figure 13:
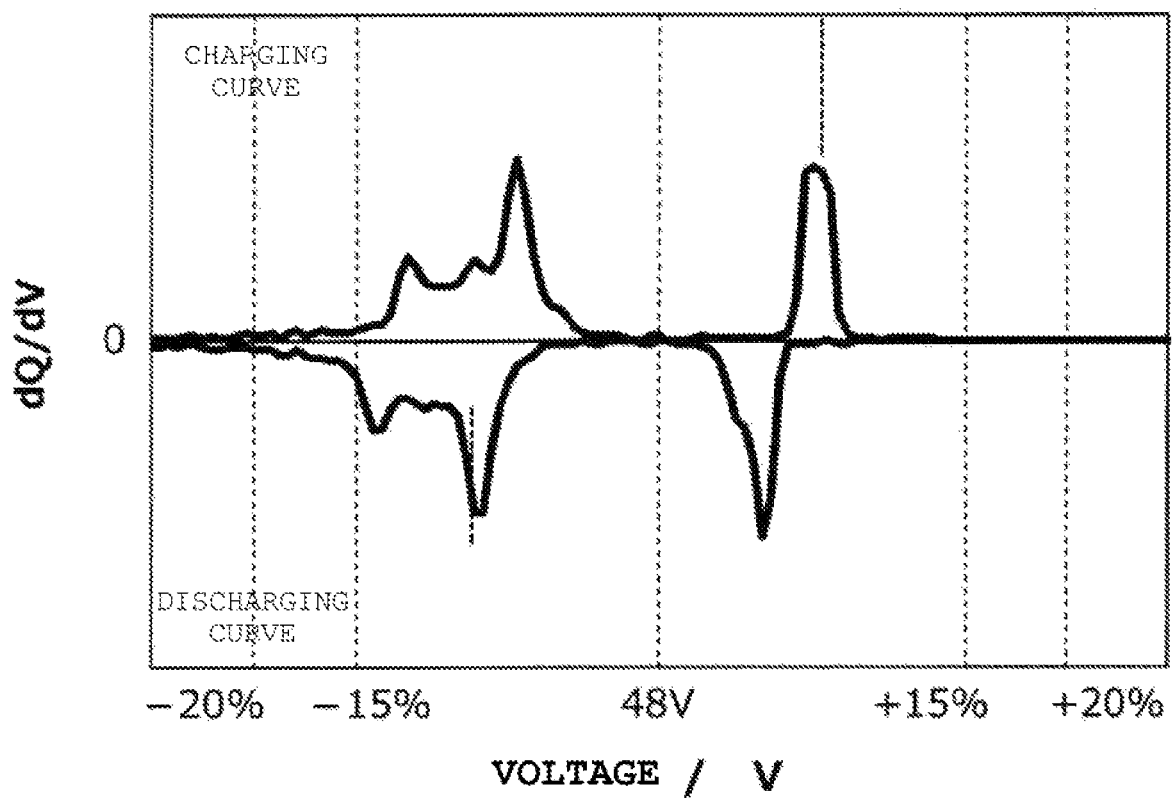
FIG. 13 is a curve (dQ/dV curve) obtained by differentiating the charging/discharging curve of the storage pack 13 prepared in Example 3 with respect to the voltage.

FIG. 12 shows a charging/discharging curve of the storage pack 13 prepared in the present Example, and FIG. 13 shows a curve (dQ/dV curve) obtained by differentiating the charging/discharging curve of the storage pack 13 with respect to the voltage.

Example 4

With use of $Li[Ni_{0.35}Mn_{1.65}]O_4$ as a positive electrode active material and graphite as a negative electrode active material, a lithium ion secondary battery having an A/C ratio of 1.2 and a capacity of 10 Ah was prepared. A power supplying system 1 was constructed in the same manner as in Example 1 except that a storage module in which 11 lithium ion secondary batteries thus prepared were connected in series was used as a storage pack 13.

Figure 14:
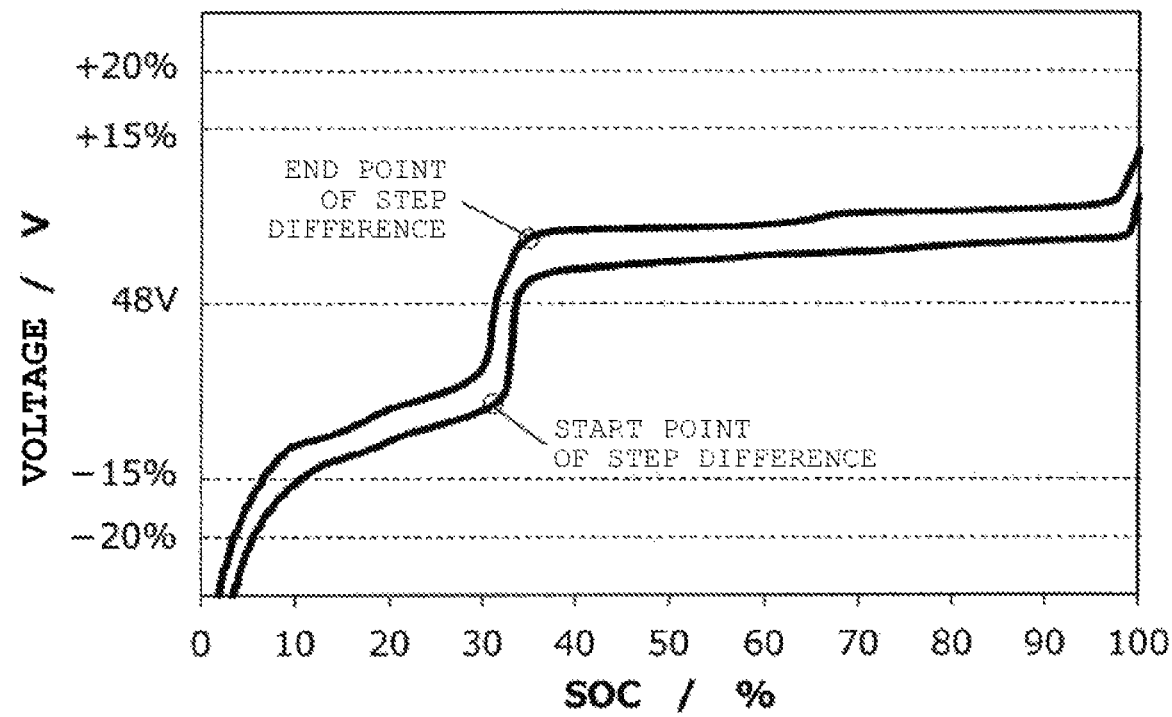
FIG. 14 is a charging/discharging curve of the storage pack 13 prepared in Example 4.
Figure 15:
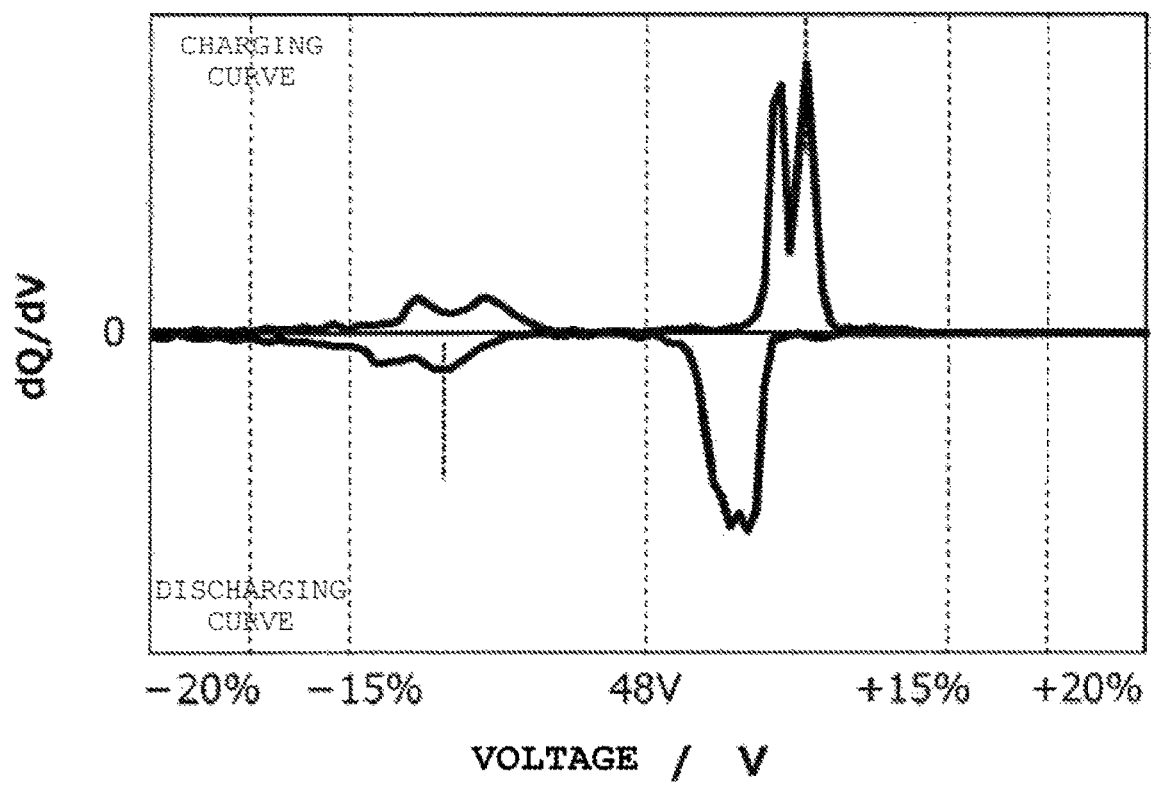
FIG. 15 is a curve (dQ/dV curve) obtained by differentiating the charging/discharging curve of the storage pack 13 prepared in Example 4 with respect to the voltage.

FIG. 14 shows a charging/discharging curve of this storage pack 13, and FIG. 15 shows a curve (dQ/dV curve) obtained by differentiating the charging/discharging curve of the storage pack 13 with respect to the voltage.

Example 5

With use of $Li[Ni_{0.40}Mn_{1.60}]O_4$ as a positive electrode active material and graphite as a negative electrode active material, a lithium ion secondary battery having an A/C ratio of 1.2 and a capacity of 10 Ah was prepared. A power supplying system 1 was constructed in the same manner as in Example 1 except that a storage module in which 11 lithium ion secondary batteries thus prepared were connected in series was used as a storage pack 13.

Figure 16:
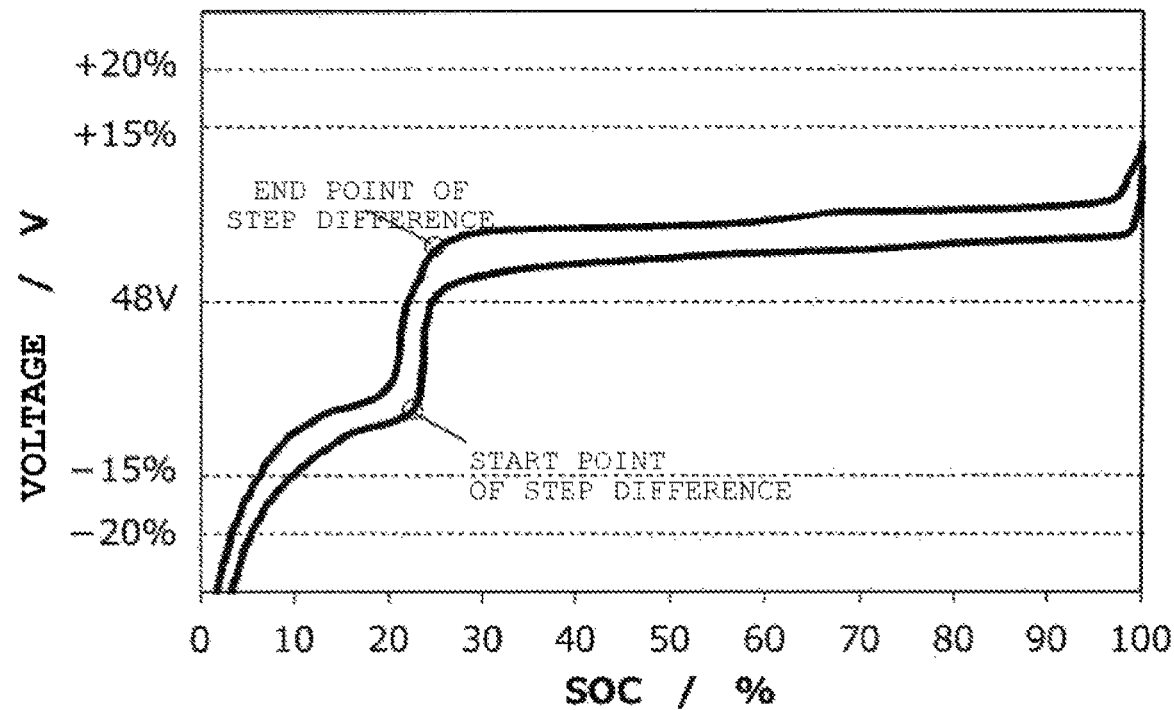
FIG. 16 is a charging/discharging curve of the storage pack 13 prepared in Example 5.
Figure 17:
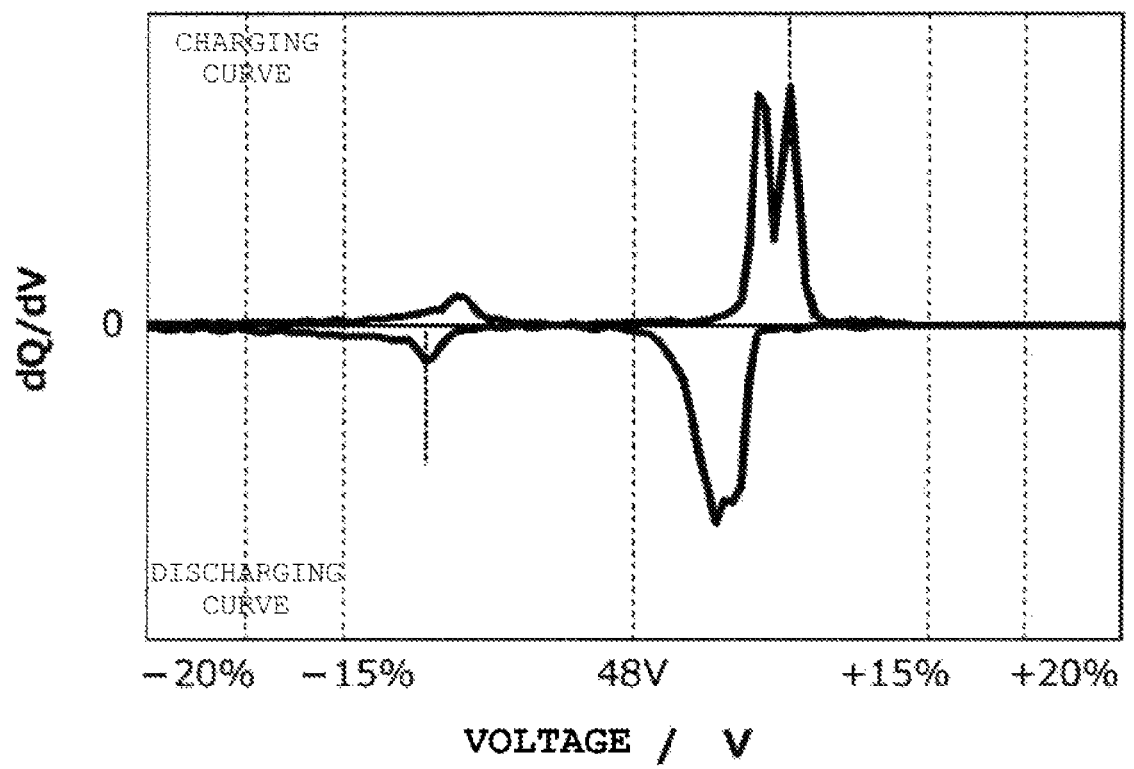
FIG. 17 is a curve (dQ/dV curve) obtained by differentiating the charging/discharging curve of the storage pack 13 prepared in Example 5 with respect to the voltage.

FIG. 16 shows a charging/discharging curve of this storage pack 13, and FIG. 17 shows a curve (dQ/dV curve) obtained by differentiating the charging/discharging curve of the storage pack 13 with respect to the voltage.

Reference Example 1

With use of $LiMn_2O_4$ as a positive electrode active material and graphite as a negative electrode active material, a lithium ion secondary battery having an A/C ratio of 1.2 and a capacity of 10 Ah was prepared. A power supplying system 1 was constructed in the same manner as in Example 1 except that a storage module in which 12 lithium ion secondary batteries thus prepared were connected in series was used as a storage pack 13.

Figure 18:
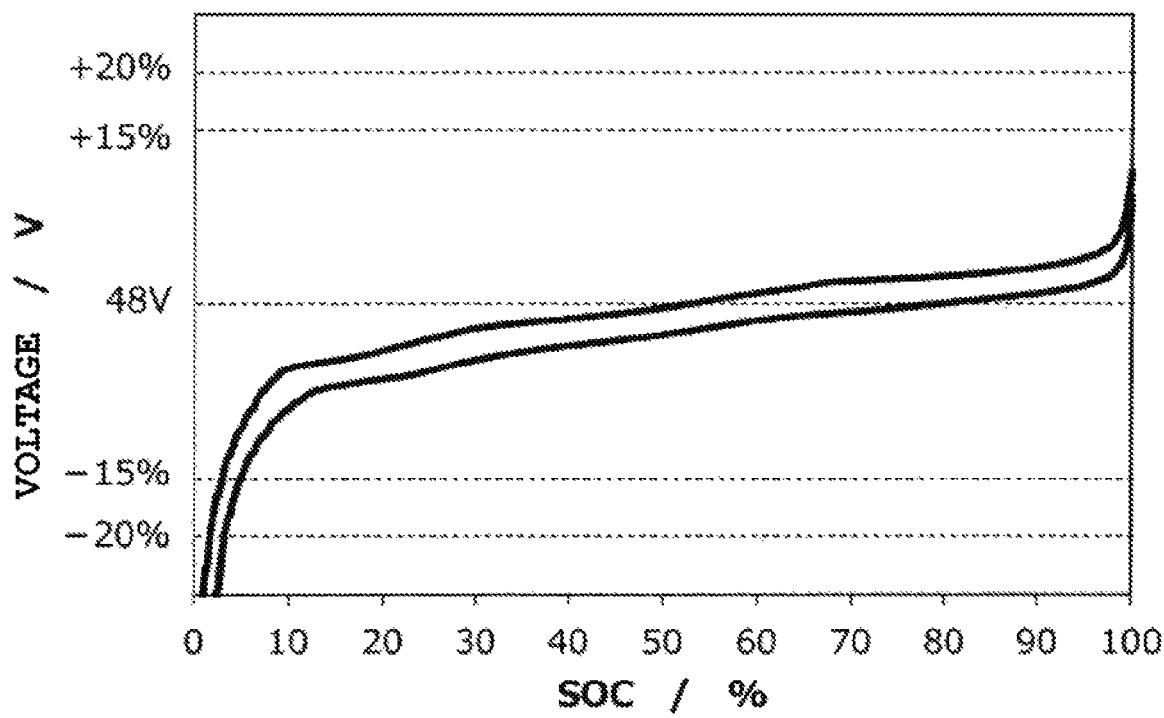
FIG. 18 is a charging/discharging curve of the storage pack 13 prepared in Reference Example 1.
Figure 19:
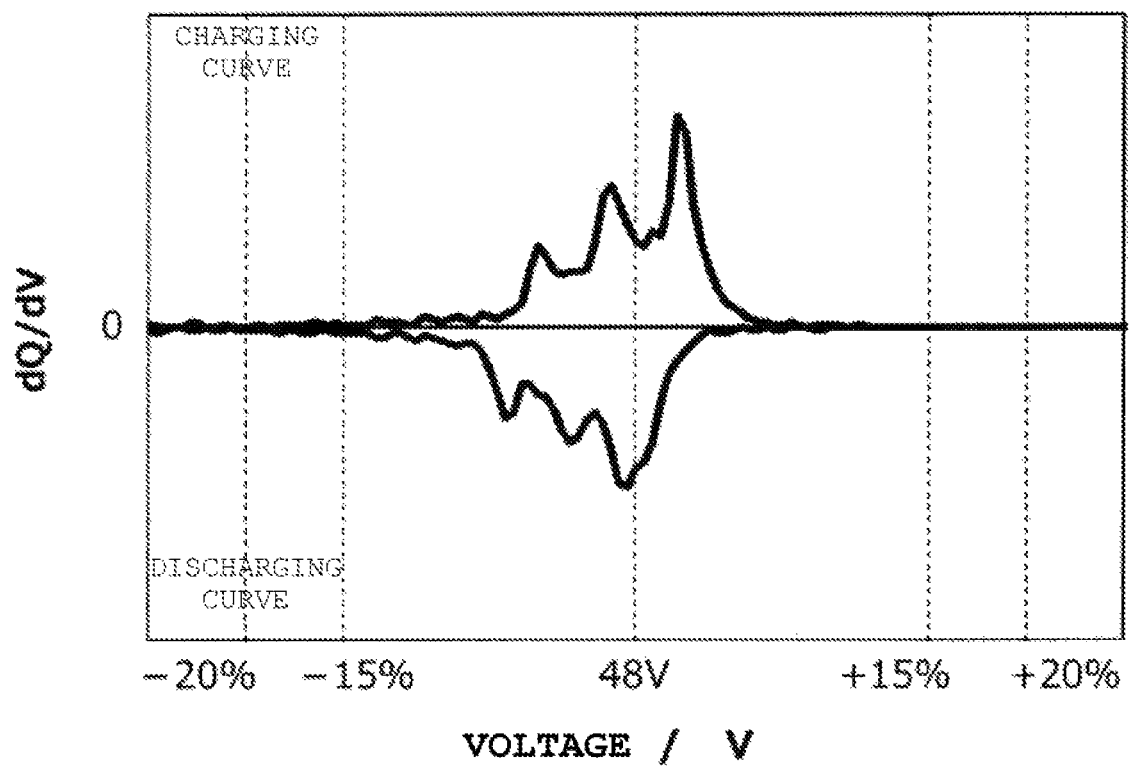
FIG. 19 is a curve (dQ/dV curve) obtained by differentiating the charging/discharging curve of the storage pack 13 prepared in Reference Example 1 with respect to the voltage.

FIG. 18 shows a charging/discharging curve of this storage pack 13, and FIG. 19 shows a curve (dQ/dV curve) obtained by differentiating the charging/discharging curve of the storage pack 13 with respect to the voltage.

Reference Example 2

With use of $Li[Ni_{0.50}Mn_{1.50}]O_4$ as a positive electrode active material and graphite as a negative electrode active material, a lithium ion secondary battery having an A/C ratio of 1.2 and a capacity of 10 Ah was prepared. A power supplying system 1 was constructed in the same manner as in Example 1 except that a storage module in which 11 lithium ion secondary batteries thus prepared were connected in series was used as a storage pack 13.

Figure 20:
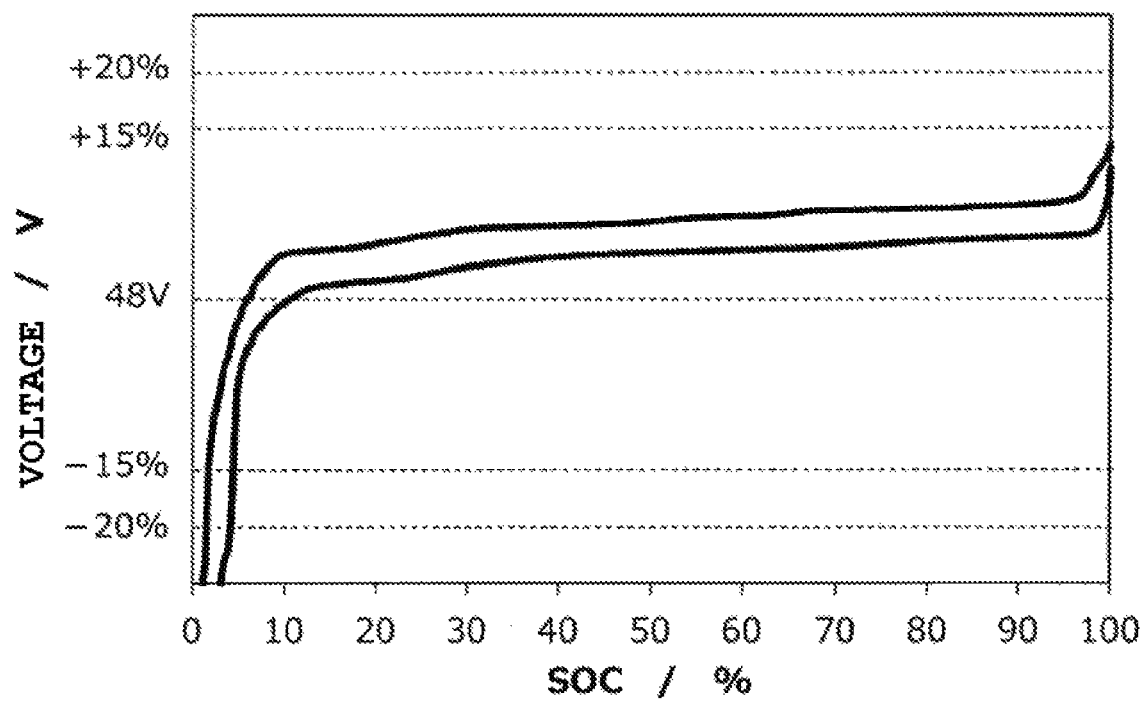
FIG. 20 is a charging/discharging curve of the storage pack 13 prepared in Reference Example 2.
Figure 21:
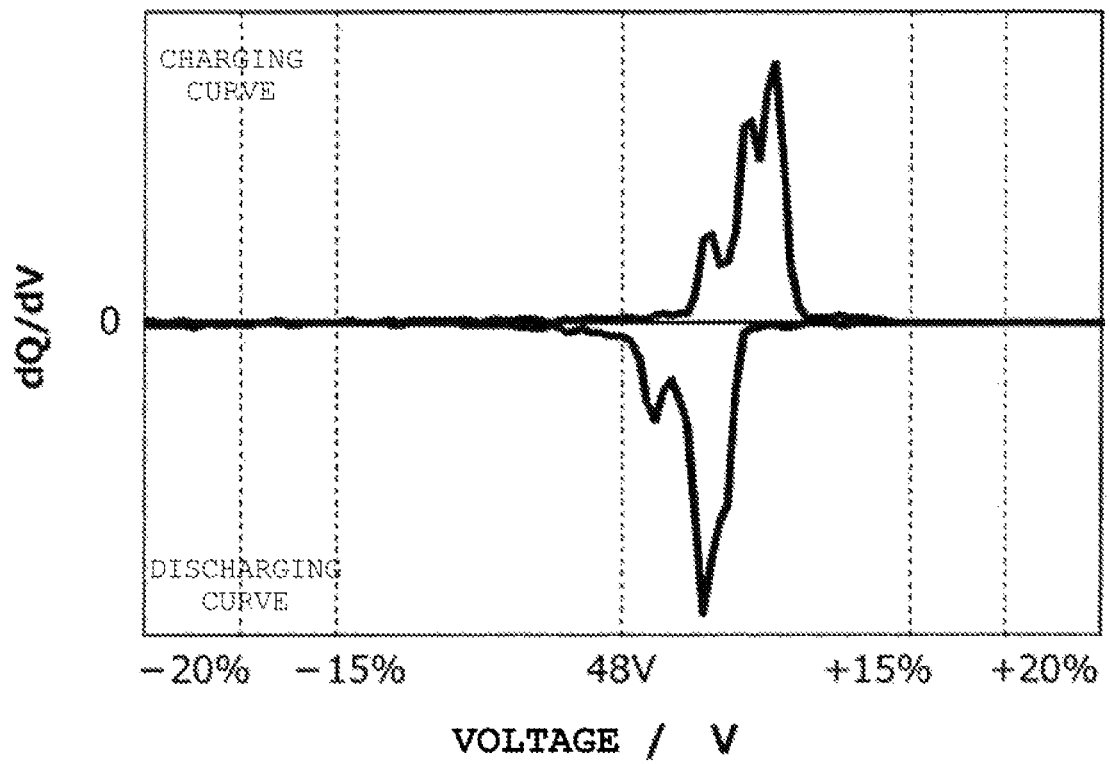
FIG. 21 is a curve (dQ/dV curve) obtained by differentiating the charging/discharging curve of the storage pack 13 prepared in Reference Example 2 with respect to the voltage.

FIG. 20 shows a charging/discharging curve of this storage pack 13, and FIG. 21 shows a curve (dQ/dV curve) obtained by differentiating the charging/discharging curve of the storage pack 13 with respect to the voltage.

Example 6

With use of $Li[Ni_{0.25}Mn_{1.75}]O_4$ as a positive electrode active material and hard carbon as a negative electrode active material, a lithium ion secondary battery having an A/C ratio of 1.2 and a capacity of 10 Ah was prepared. A power supplying system 1 was constructed in the same manner as in Example 1 except that a storage module in which 12 lithium ion secondary batteries thus prepared were connected in series was used as a storage pack 13.

Figure 22:
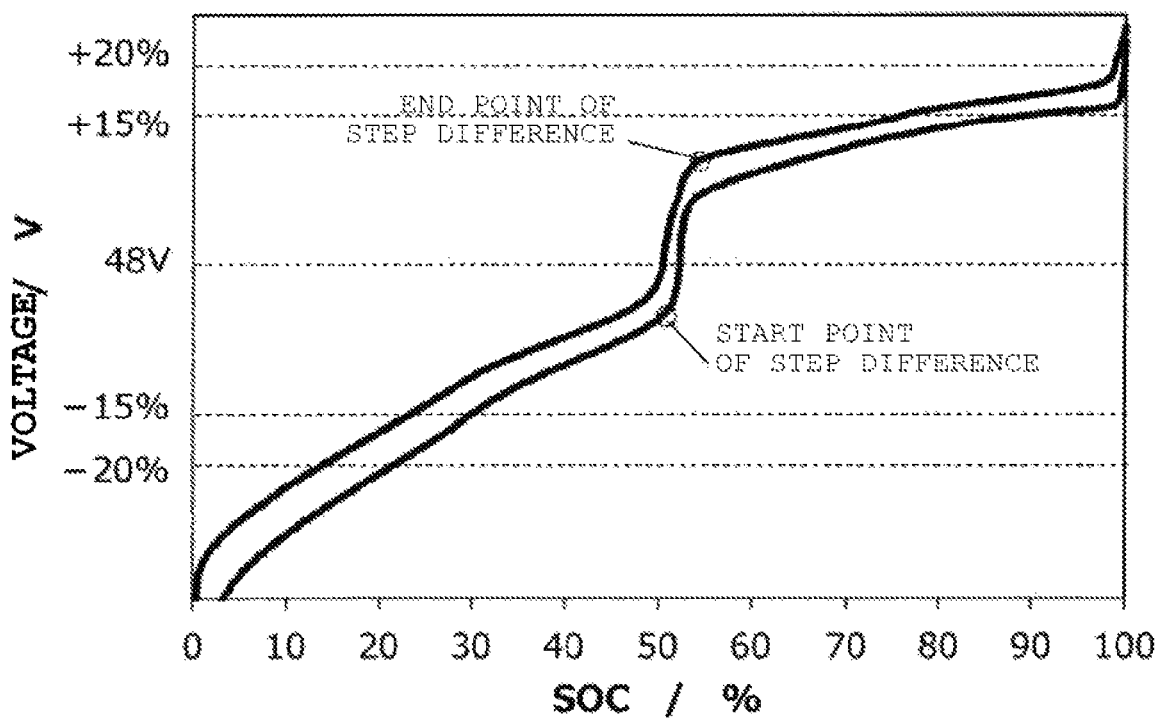
FIG. 22 is a charging/discharging curve of the storage pack 13 prepared in Example 6.
Figure 23:
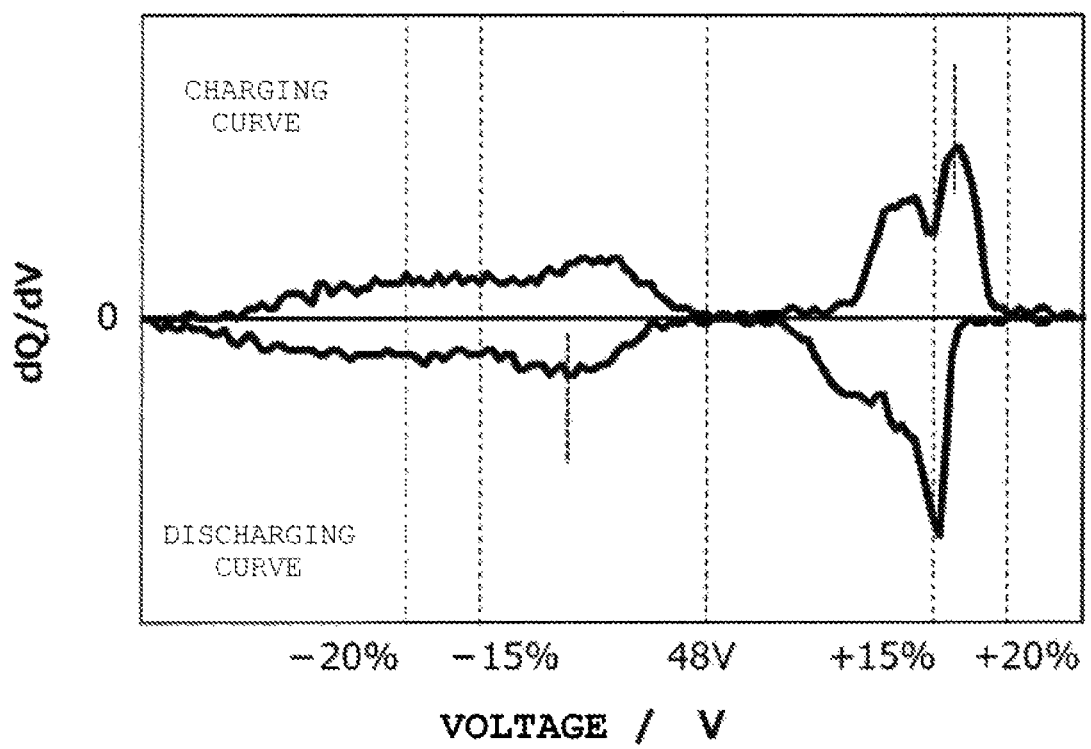
FIG. 23 is a curve (dQ/dV curve) obtained by differentiating the charging/discharging curve of the storage pack 13 prepared in Example 6 with respect to the voltage.

FIG. 22 shows a charging/discharging curve of this storage pack 13, and FIG. 23 shows a curve (dQ/dV curve) obtained by differentiating the charging/discharging curve of the storage pack 13 with respect to the voltage.

Example 7

With use of $Li[Ni_{0.25}Mn_{1.75}]O_4$ as a positive electrode active material and soft carbon as a negative electrode active material, a lithium ion secondary battery having an A/C ratio of 1.2 and a capacity of 10 Ah was prepared. A power supplying system 1 was constructed in the same manner as in Example 1 except that a storage module in which 12 lithium ion secondary batteries thus prepared were connected in series was used as a storage pack 13.

Figure 24:
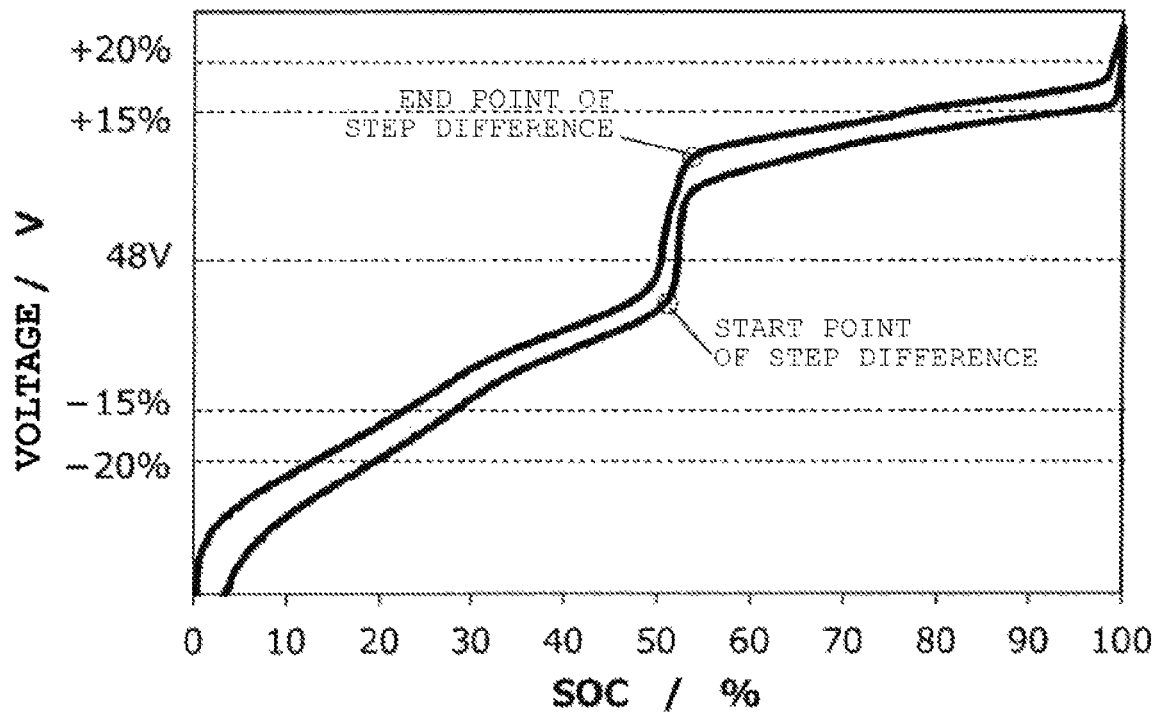
FIG. 24 is a charging/discharging curve of the storage pack 13 prepared in Example 7.
Figure 25:
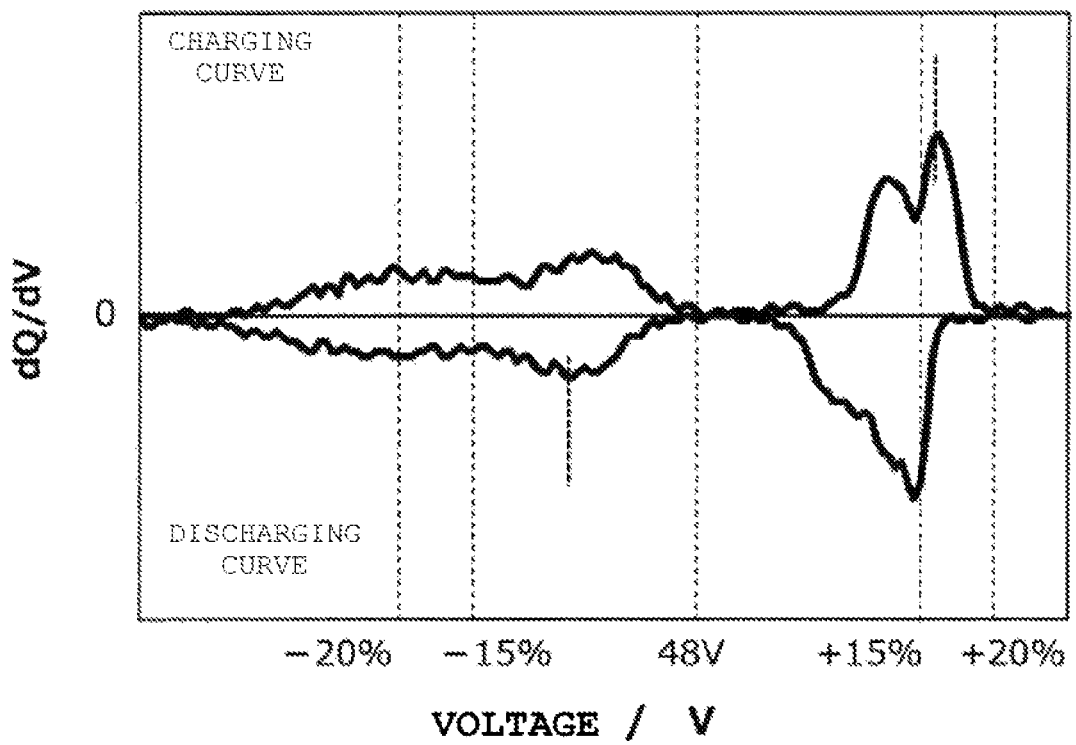
FIG. 25 is a curve (dQ/dV curve) obtained by differentiating the charging/discharging curve of the storage pack 13 prepared in Example 7 with respect to the voltage.

FIG. 24 shows a charging/discharging curve of this storage pack 13, and FIG. 25 shows a curve (dQ/dV curve) obtained by differentiating the charging/discharging curve of the storage pack 13 with respect to the voltage.

Example 8

With use of $Li[Ni_{0.25}Mn_{1.75}]O_4$ as a positive electrode active material and Si as a negative electrode active material, a lithium ion secondary battery having an A/C ratio of 2.0 and a capacity of 10 Ah was prepared. A power supplying system 1 was constructed in the same manner as in Example 1 except that a storage module in which 12 lithium ion secondary batteries thus prepared were connected in series was used as a storage pack 13.

Figure 26:
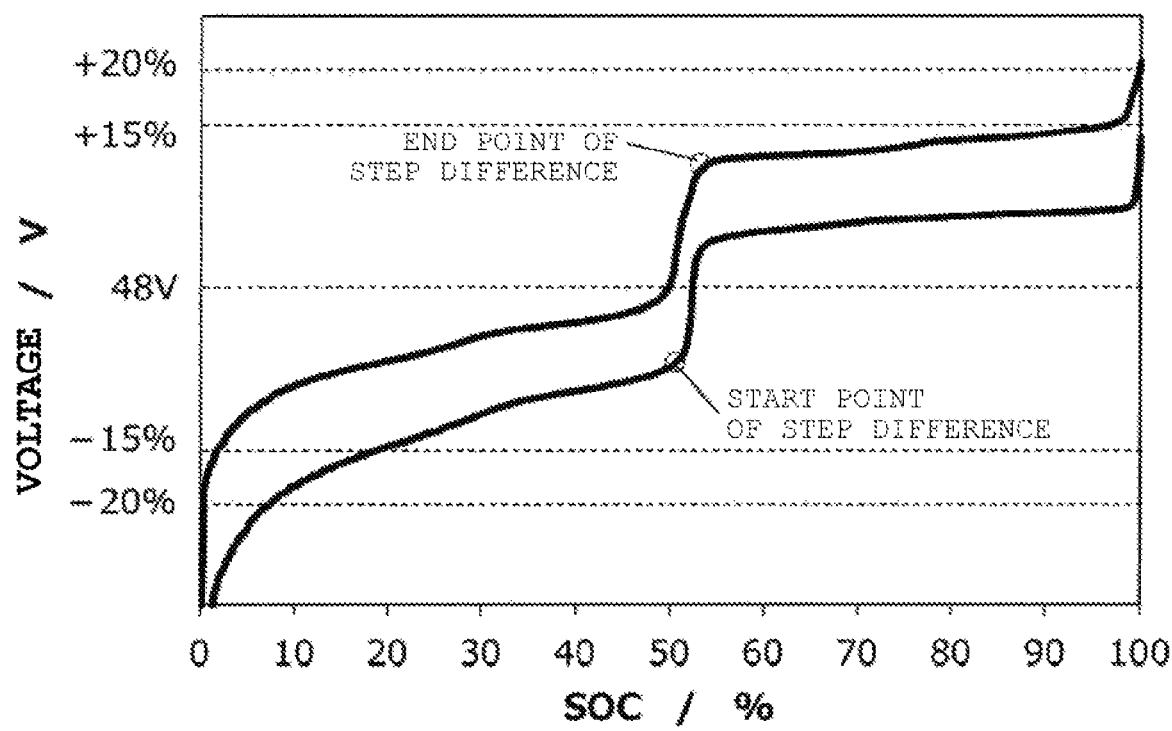
FIG. 26 is a charging/discharging curve of the storage pack 13 prepared in Example 8.
Figure 27:
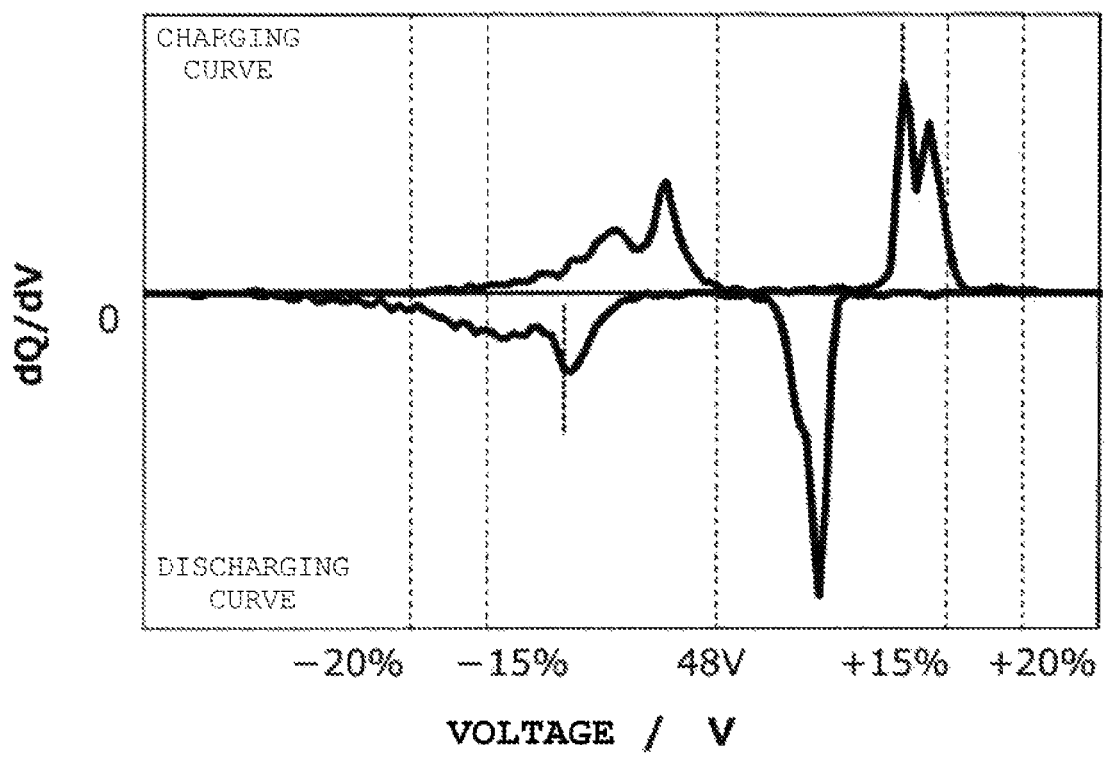
FIG. 27 is a curve (dQ/dV curve) obtained by differentiating the charging/discharging curve of the storage pack 13 prepared in Example 8 with respect to the voltage.

FIG. 26 shows a charging/discharging curve of this storage pack 13, and FIG. 27 shows a curve (dQ/dV curve) obtained by differentiating the charging/discharging curve of the storage pack 13 with respect to the voltage.

Table 1 shows the rated voltage, the configuration of the storage pack 13, the SOC and voltage at the start point of the step difference, the SOC and voltage at the end point of the step difference, the average discharging voltage and the voltage of the peak top on the dQ/dV curve on the lower-SOC side of the start point of the step difference, the average charging voltage and the voltage of the peak top on the dQ/dV curve on the higher-SOC side of the end point of the step difference, and the ratio of a capacity on the lower-SOC side of the start point of the step difference to a capacity on the higher-SOC side of the end point of the step difference in each of the Examples and Reference Examples.

From the results of Examples 1 to 8, it will be understood that a storage pack 13 can be designed satisfying at least one of the above conditions (a), (b), (c) and conditions (a), (d), (e) by using $Li[Ni_xMn_{(2-x)}]O_4$ (0.05≤x≤0.40) which is a positive electrode active material having a step difference in the charging/discharging curve.

In the $Li[Ni_xMn_{(2-x)}]O_4$ (0.05≤x≤0.40), the positions of the start point of the step difference and the end point of the step difference can be easily adjusted by adjusting the value of x and the synthesis conditions in the active material composition and, by this, the ratio of the capacity on the lower-SOC side of the start point of the step difference to the capacity on the higher-SOC side of the end point of the step difference can be easily adjusted. Further, the positions of the start point of the step difference and the end point of the step difference can be adjusted also by adding an element of different kind (for example, Li, Ti, Al, Mg, B, Cr, Co, or the like) or replacing Ni or Mn with an element of different kind besides the value of x and the synthesis conditions.

Example 9

With use of a mixture of $LiMn_2O_4$ and $Li[Ni_{0.5}Mn_{1.5}]O_4$ in a weight ratio ($LiMn_2O_4$:$Li[Ni_{0.5}Mn_{1.5}]O_4$) of 60:40 as a positive electrode active material and graphite as a negative electrode active material, a lithium ion secondary battery having an A/C ratio of 1.2 and a capacity of 10 Ah was prepared. A power supplying system 1 was constructed in the same manner as in Example 1 except that a storage module in which 11 lithium ion secondary batteries thus prepared were connected in series was used as a storage pack 13.

Figure 28:
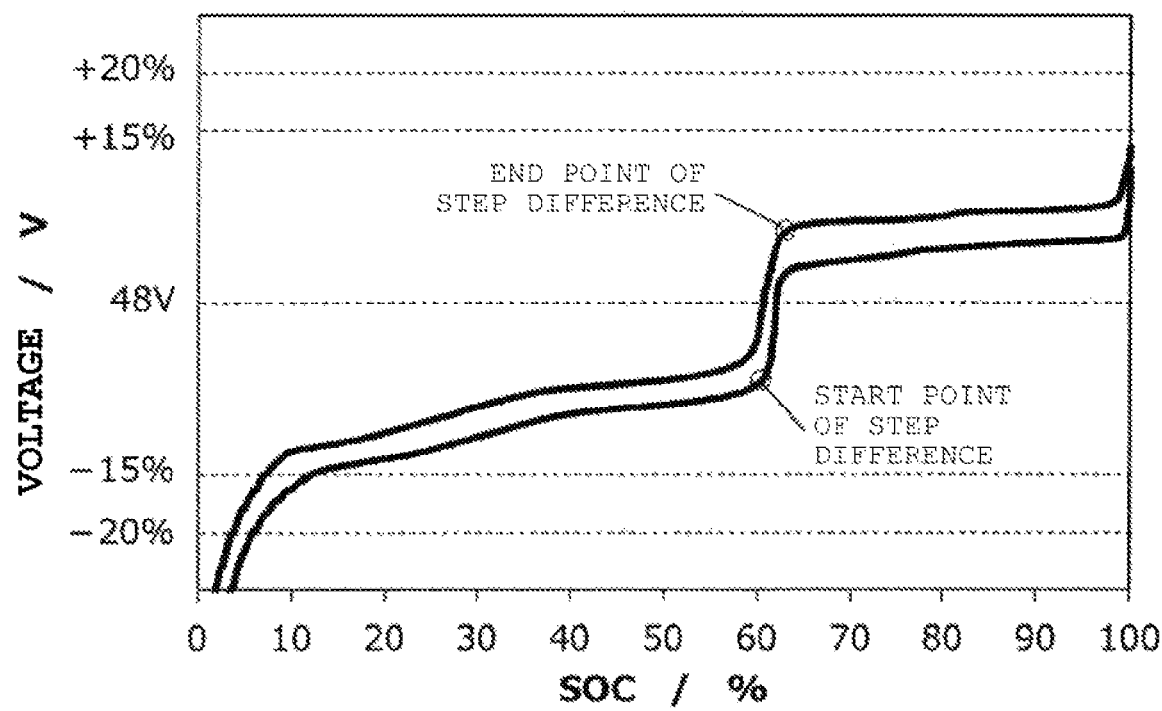
FIG. 28 is a charging/discharging curve of the storage pack 13 prepared in Example 9.
Figure 29:
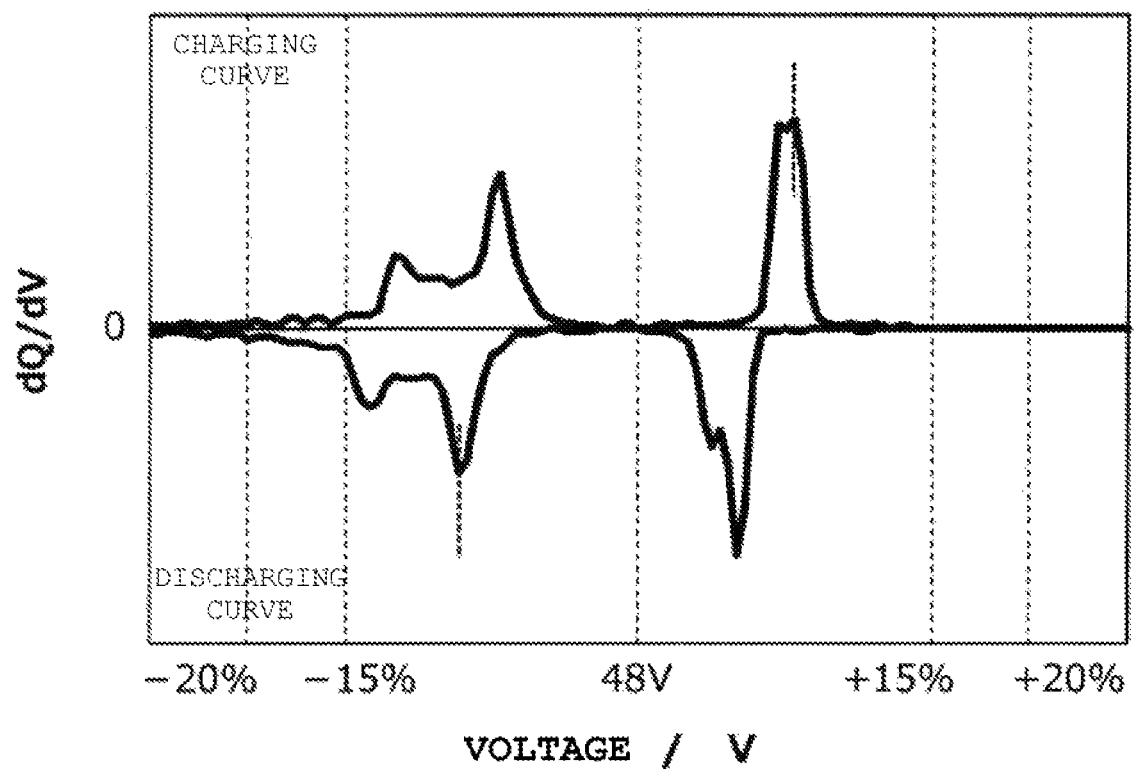
FIG. 29 is a curve (dQ/dV curve) obtained by differentiating the charging/discharging curve of the storage pack 13 prepared in Example 9 with respect to the voltage.

FIG. 28 shows a charging/discharging curve of this storage pack 13, and FIG. 29 shows a curve (dQ/dV curve) obtained by differentiating the charging/discharging curve of the storage pack 13 with respect to the voltage.

Example 10

With use of a mixture of $LiFePO_4$ and $LiNi_{1/3}Co_{1/3}Mn_{1/3}O_2$ in a weight ratio ($LiFePO_4$:$LiNi_{1/3}Co_{1/3}Mn_{1/3}O_2$) of 35:65 as a positive electrode active material and Si as a negative electrode active material, a lithium ion secondary battery having an A/C ratio of 3.0 and a capacity of 10 Ah was prepared. A power supplying system 1 was constructed in the same manner as in Example 1 except that a storage module in which 16 lithium ion secondary batteries thus prepared were connected in series was used as a storage pack 13.

Figure 30:
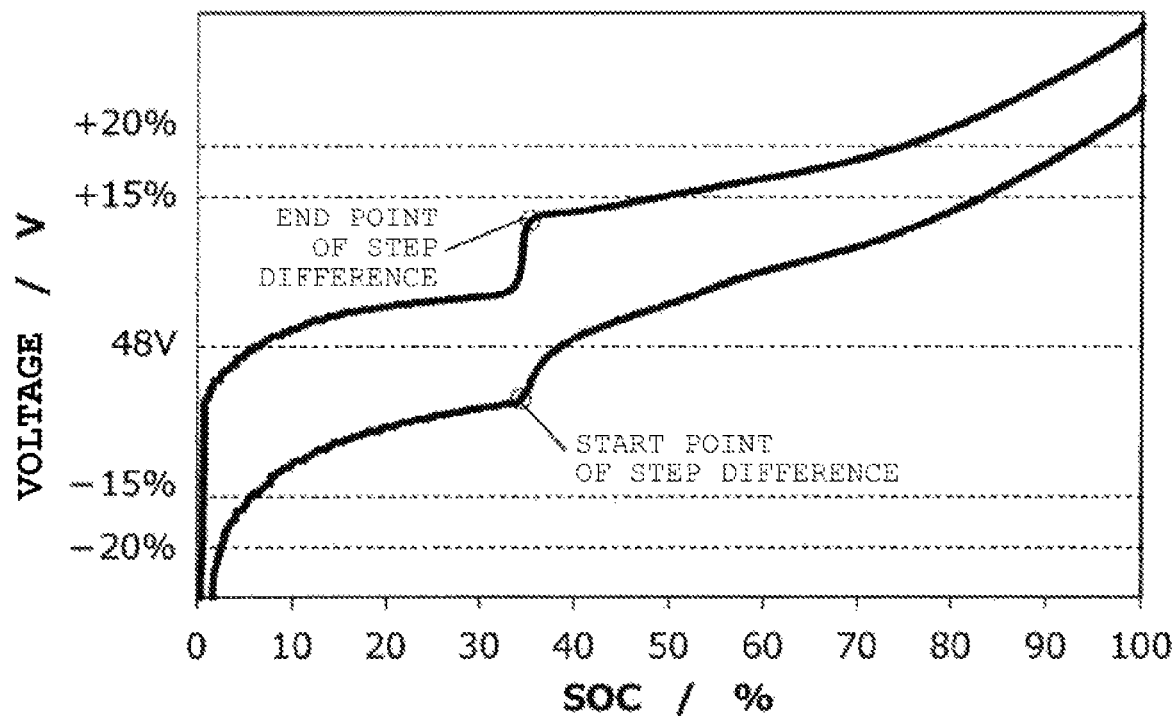
FIG. 30 is a charging/discharging curve of the storage pack 13 prepared in Example 10.
Figure 31:
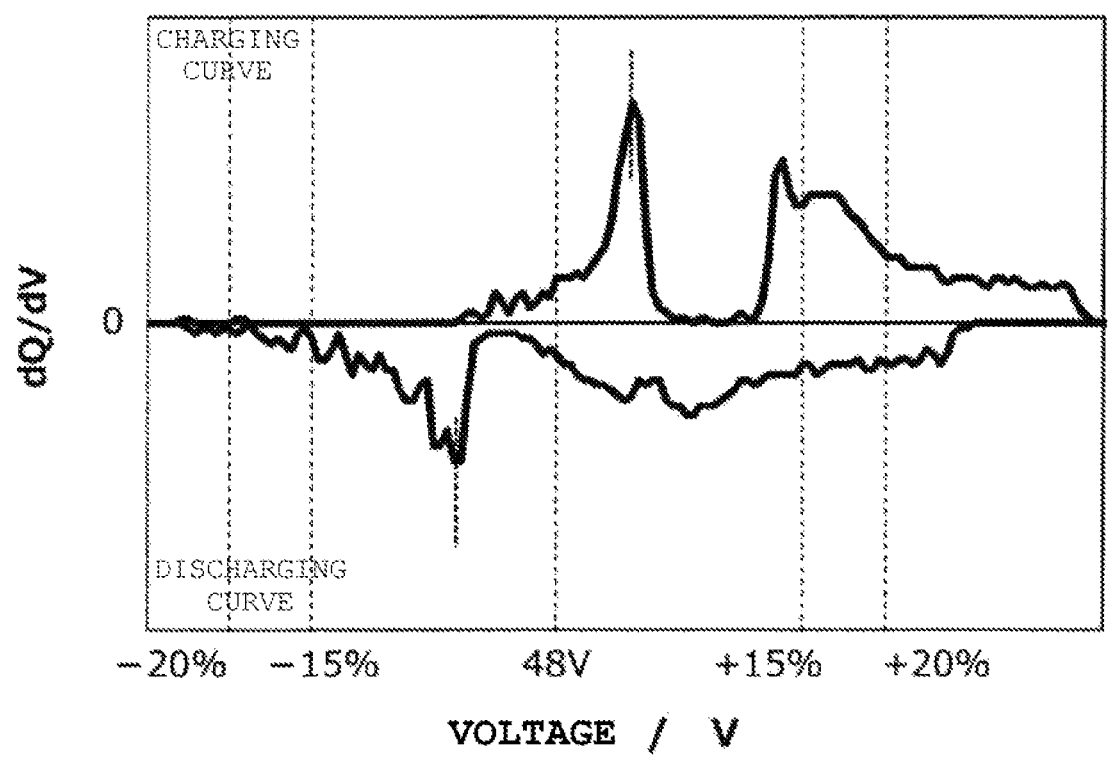
FIG. 31 is a curve (dQ/dV curve) obtained by differentiating the charging/discharging curve of the storage pack 13 prepared in Example 10 with respect to the voltage.

FIG. 30 shows a charging/discharging curve of this storage pack 13, and FIG. 31 shows a curve (dQ/dV curve) obtained by differentiating the charging/discharging curve of the storage pack 13 with respect to the voltage.

Example 11

With use of a mixture of $LiFePO_4$ and $LiNi_{1/3}Co_{1/3}Mn_{1/3}O_2$ in a weight ratio ($LiFePO_4$:$LiNi_{1/3}Co_{1/3}Mn_{1/3}O_2$) of 50:50 as a positive electrode active material and $Li_4Ti_5O_{12}$ as a negative electrode active material, a lithium ion secondary battery having an A/C ratio of 1.2 and a capacity of 10 Ah was prepared. A power supplying system 1 was constructed in the same manner as in Example 1 except that a storage module in which 24 lithium ion secondary batteries thus prepared were connected in series was used as a storage pack 13.

Figure 32:
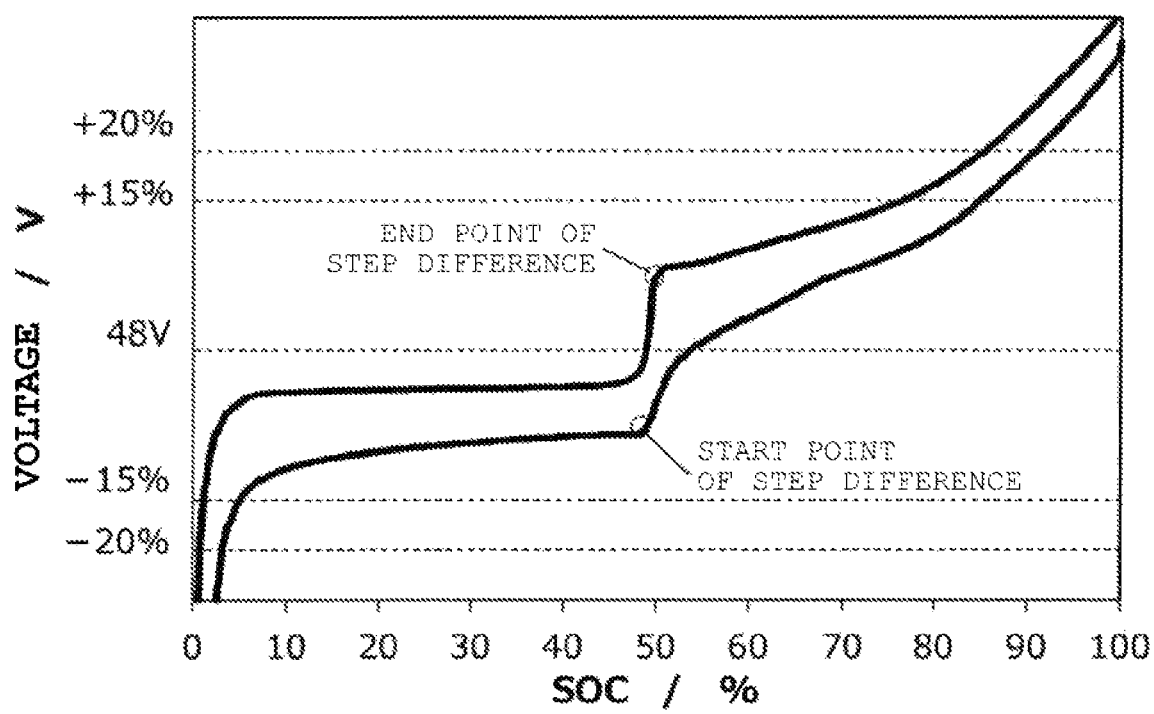
FIG. 32 is a charging/discharging curve of the storage pack 13 prepared in Example 11.
Figure 33:
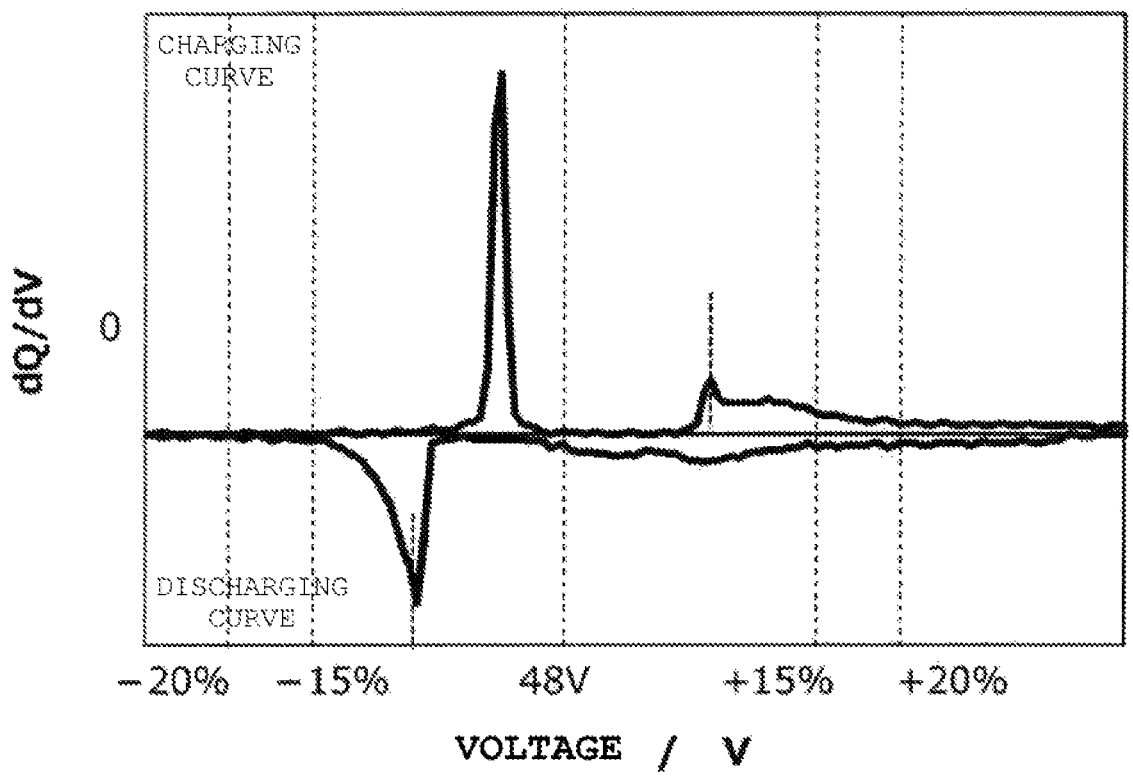
FIG. 33 is a curve (dQ/dV curve) obtained by differentiating the charging/discharging curve of the storage pack 13 prepared in Example 11 with respect to the voltage.

FIG. 32 shows a charging/discharging curve of this storage pack 13, and FIG. 33 shows a curve (dQ/dV curve) obtained by differentiating the charging/discharging curve of the storage pack 13 with respect to the voltage.

From the results of Examples 9 to 10, it will be understood that a storage pack 13 can be designed satisfying at least one of the above conditions (a), (b), (c) and conditions (a), (d), (e) by using a plurality of kinds of positive electrode active materials. Also, the positions of the start point and end point of the step difference of the charging/discharging curve can be easily adjusted by adjusting the mixing ratio of the positive electrode active materials. By this, the ratio of the capacity on the lower-SOC side of the start point of the step difference to the capacity on the higher-SOC side of the end point of the step difference can be easily adjusted.

Example 12

With use of $LiMn_2O_4$ as a positive electrode active material and graphite as a negative electrode active material, a lithium ion secondary battery having an A/C ratio of 1.2 and a capacity of 6 Ah was prepared. A first storage module was prepared in which 11 lithium ion secondary batteries thus prepared were connected in series. Also, with use of $Li[Ni_{0.5}Mn_{1.5}]O_4$) as a positive electrode active material and graphite as a negative electrode active material, a lithium ion secondary battery having an A/C ratio of 1.2 and a capacity of 4 Ah was prepared. A second storage module was prepared in which 11 lithium ion secondary batteries thus prepared were connected in series. Further, a storage pack 13 was prepared by connecting the first storage module and the second storage module in parallel. A power supplying system 1 was constructed in the same manner as in Example 1 except that this storage pack 13 was used.

The charging/discharging curve of the storage pack 13 prepared in Example 12 is similar to the charging/discharging curve of the storage pack 13 prepared in Example 9. The dQ/dV curve of the storage pack 13 prepared in Example 12 is similar to the dQ/dV curve of the storage pack 13 prepared in Example 9.

Example 13

With use of $LiFePO_4$ as a positive electrode active material and $Li_4Ti_5O_{12}$ as a negative electrode active material, a lithium ion secondary battery having an A/C ratio of 0.8 and a capacity of 5 Ah was prepared. A first storage module was assembled in which 24 lithium ion secondary batteries thus prepared were connected in series. Also, a second storage module was assembled in which 28 lithium ion secondary batteries thus prepared were connected in series. Further, a storage pack 13 was prepared by connecting the first storage module and the second storage module in parallel. A power supplying system 1 was constructed in the same manner as in Example 1 except that this storage pack 13 was used.

Figure 34:
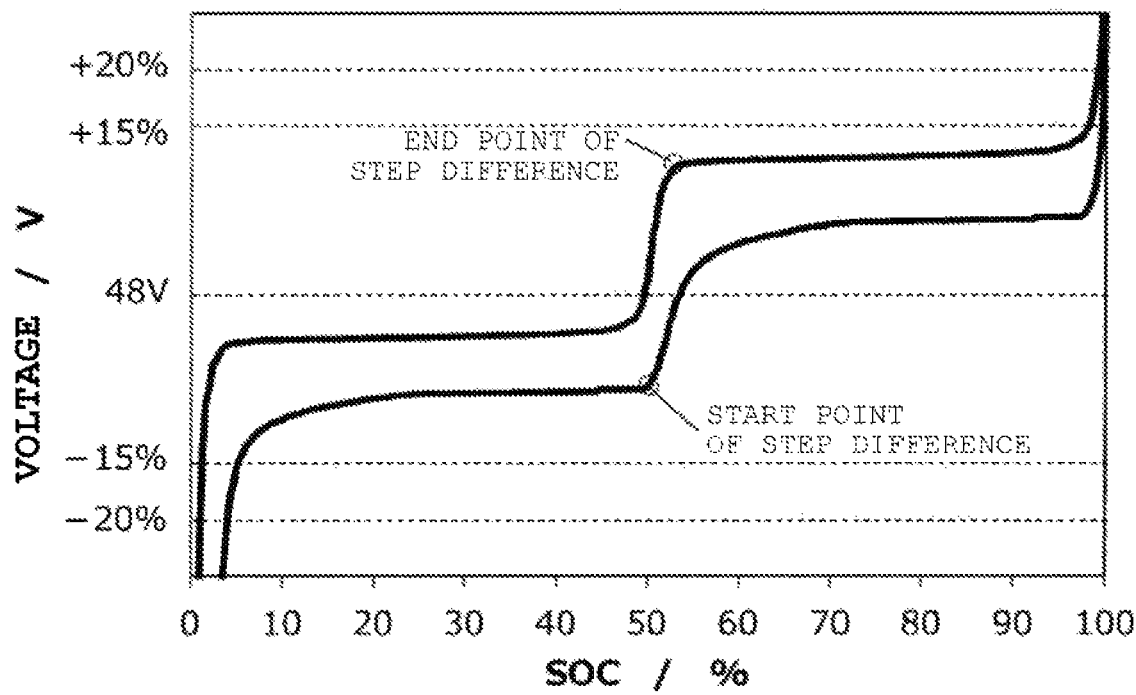
FIG. 34 is a charging/discharging curve of the storage pack 13 prepared in Example 13.
Figure 35:
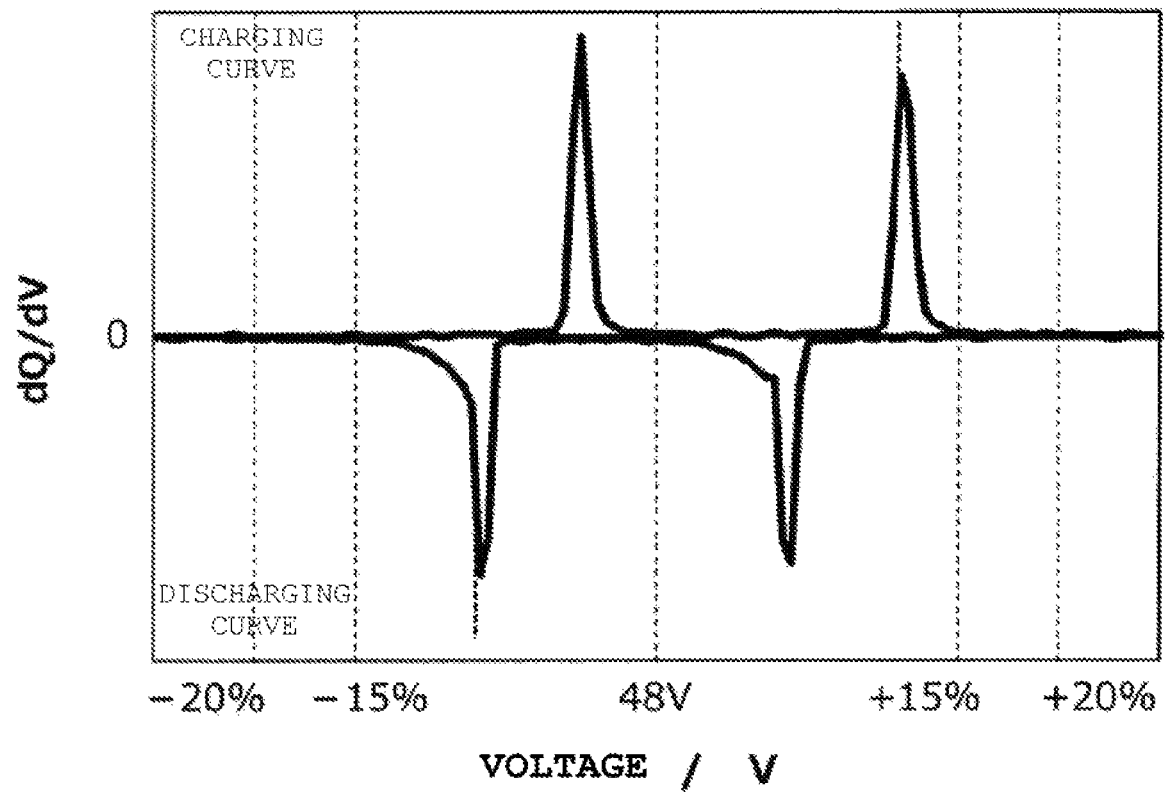
FIG. 35 is a curve (dQ/dV curve) obtained by differentiating the charging/discharging curve of the storage pack 13 prepared in Example 13 with respect to the voltage.

FIG. 34 shows a charging/discharging curve of this storage pack 13, and FIG. 35 shows a curve (dQ/dV curve) obtained by differentiating the charging/discharging curve of the storage pack 13 with respect to the voltage.

From the result of Example 13, it will be understood that a storage pack 13 can be designed satisfying at least one of the above conditions (a), (b), (c) and conditions (a), (d), (e) by connecting in parallel a plurality of storage modules that are different from each other in the number of secondary batteries connected in series. Also, when the capacity ratio of the two storage modules is changed, the positions of the start point of the step difference and the end point of the step difference can be adjusted and, by this, the ratio of the capacity on the lower-SOC side of the start point of the step difference to the capacity on the higher-SOC side of the end point of the step difference can be adjusted.

Reference Example 3

With use of a mixture of $LiFePO_4$ and $Li[Ni_{0.50}Mn_{1.50}]O_4$ in a weight ratio ($LiFePO_4$:$Li[Ni_{0.50}Mn_{1.50}]O_4$) of 50:50 as a positive electrode active material and hard carbon as a negative electrode active material, a lithium ion secondary battery having an A/C ratio of 1.5 and a capacity of 10 Ah was prepared. A power supplying system 1 was constructed in the same manner as in Example 1 except that a storage module in which 13 lithium ion secondary batteries thus prepared were connected in series was used as a storage pack 13.

Figure 36:
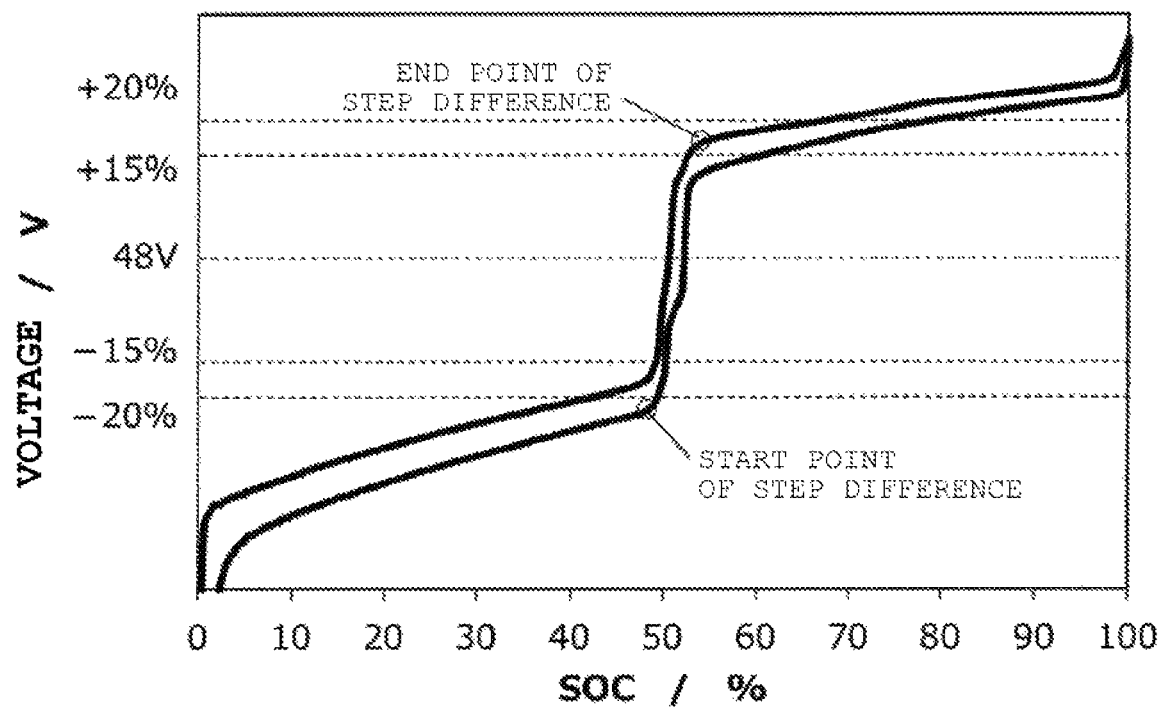
FIG. 36 is a charging/discharging curve of the storage pack 13 prepared in Reference Example 3.
Figure 37:
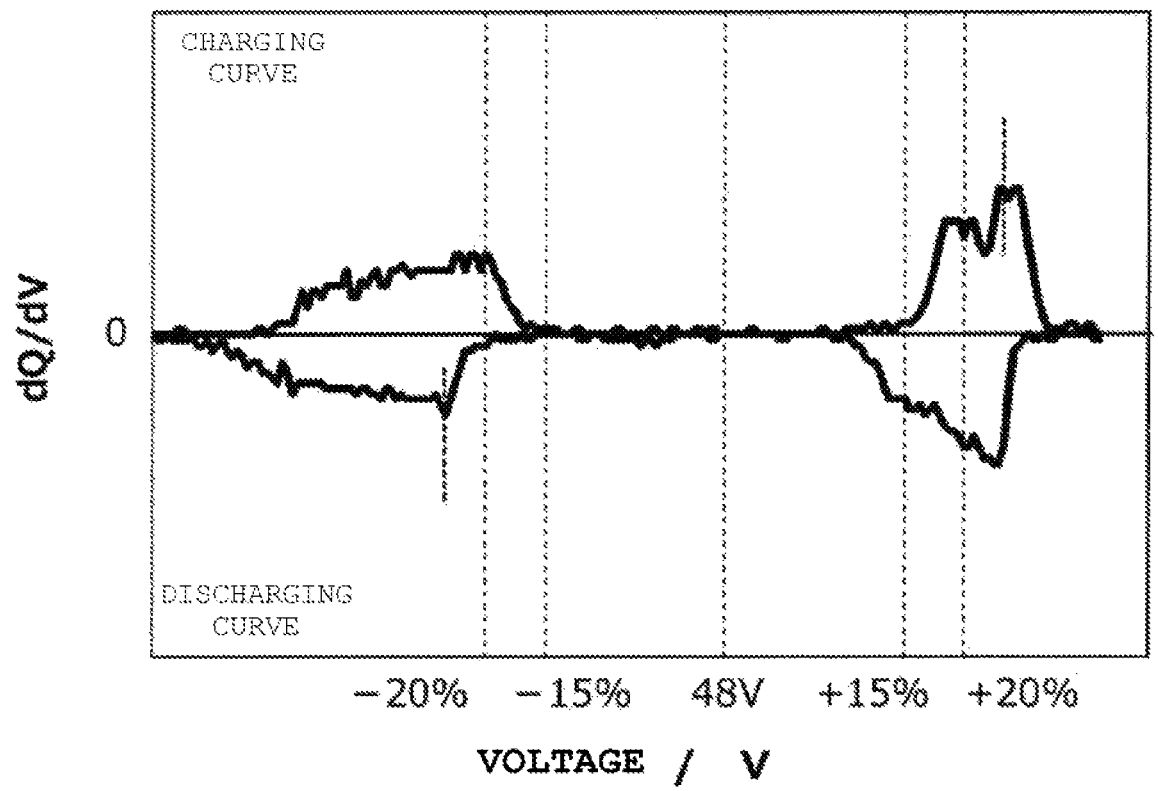
FIG. 37 is a curve (dQ/dV curve) obtained by differentiating the charging/discharging curve of the storage pack 13 prepared in Reference Example 3 with respect to the voltage.

FIG. 36 shows a charging/discharging curve of this storage pack 13, and FIG. 37 shows a curve (dQ/dV curve) obtained by differentiating the charging/discharging curve of the storage pack 13 with respect to the voltage.

Reference Example 4

With use of a mixture of $LiFePO_4$ and $LiMn_2O_4$ in a weight ratio ($LiFePO_4$:$LiMn_2O_4$) of 50:50 as a positive electrode active material and $Li_4Ti_5O_{12}$ as a negative electrode active material, a lithium ion secondary battery having an A/C ratio of 1.2 and a capacity of 10 Ah was prepared. A power supplying system 1 was constructed in the same manner as in Example 1 except that a storage module in which 21 lithium ion secondary batteries thus prepared were connected in series was used as a storage pack 13.

Figure 38:
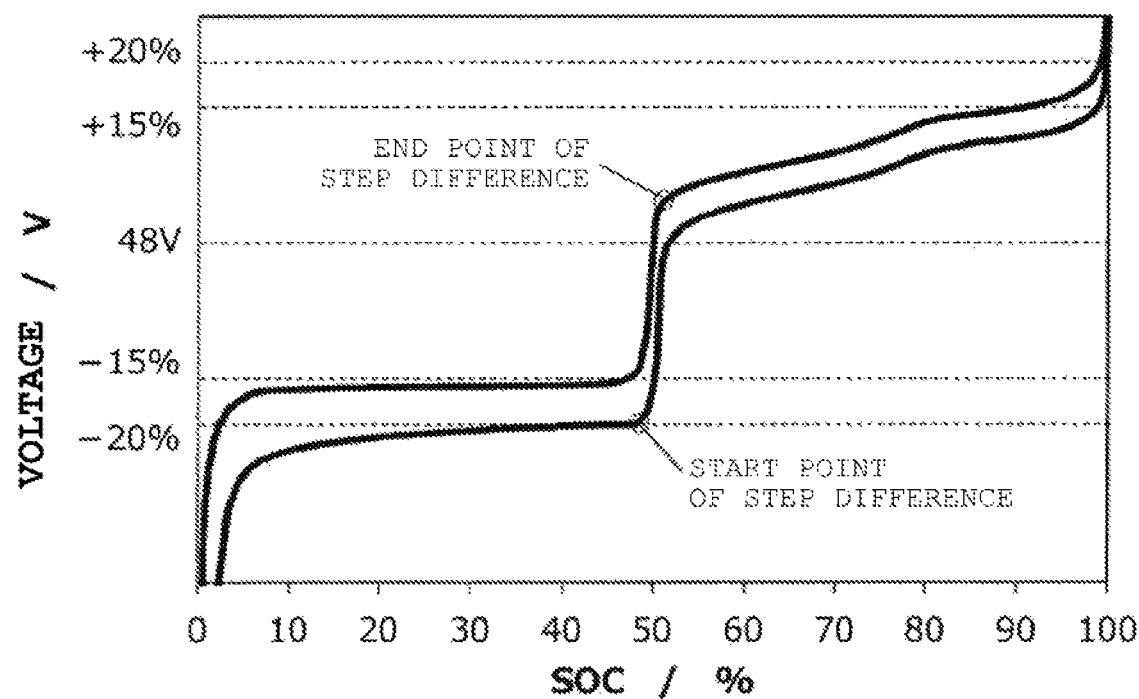
FIG. 38 is a charging/discharging curve of the storage pack 13 prepared in Reference Example 4.
Figure 39:
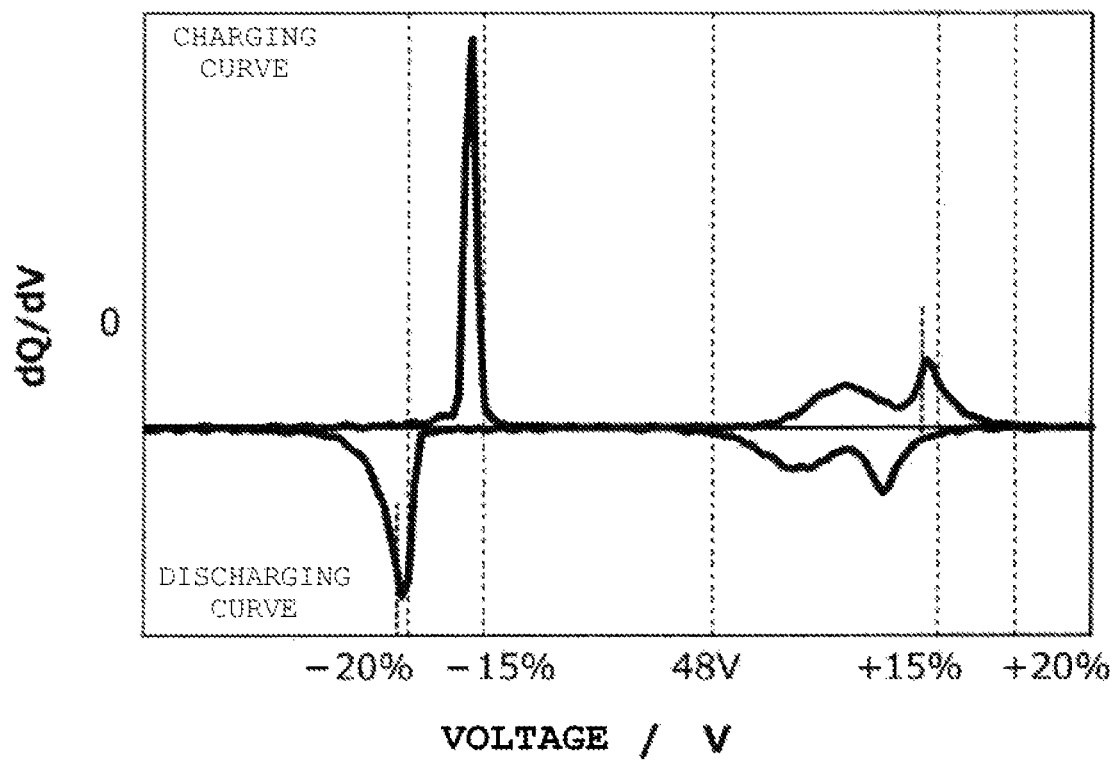
FIG. 39 is a curve (dQ/dV curve) obtained by differentiating the charging/discharging curve of the storage pack 13 prepared in Reference Example 4 with respect to the voltage.

FIG. 38 shows a charging/discharging curve of this storage pack 13, and FIG. 39 shows a curve (dQ/dV curve) obtained by differentiating the charging/discharging curve of the storage pack 13 with respect to the voltage.

Reference Example 5

With use of a mixture of $LiFePO_4$ and $LiMn_2O_4$ in a weight ratio ($LiFePO_4$:$LiMn_2O_4$) of 50:50 as a positive electrode active material and $Li_4Ti_5O_{12}$ as a negative electrode active material, a lithium ion secondary battery having an A/C ratio of 1.2 and a capacity of 10 Ah was prepared. A power supplying system 1 was constructed in the same manner as in Example 1 except that a storage module in which 23 lithium ion secondary batteries thus prepared were connected in series was used as a storage pack 13.

Figure 40:
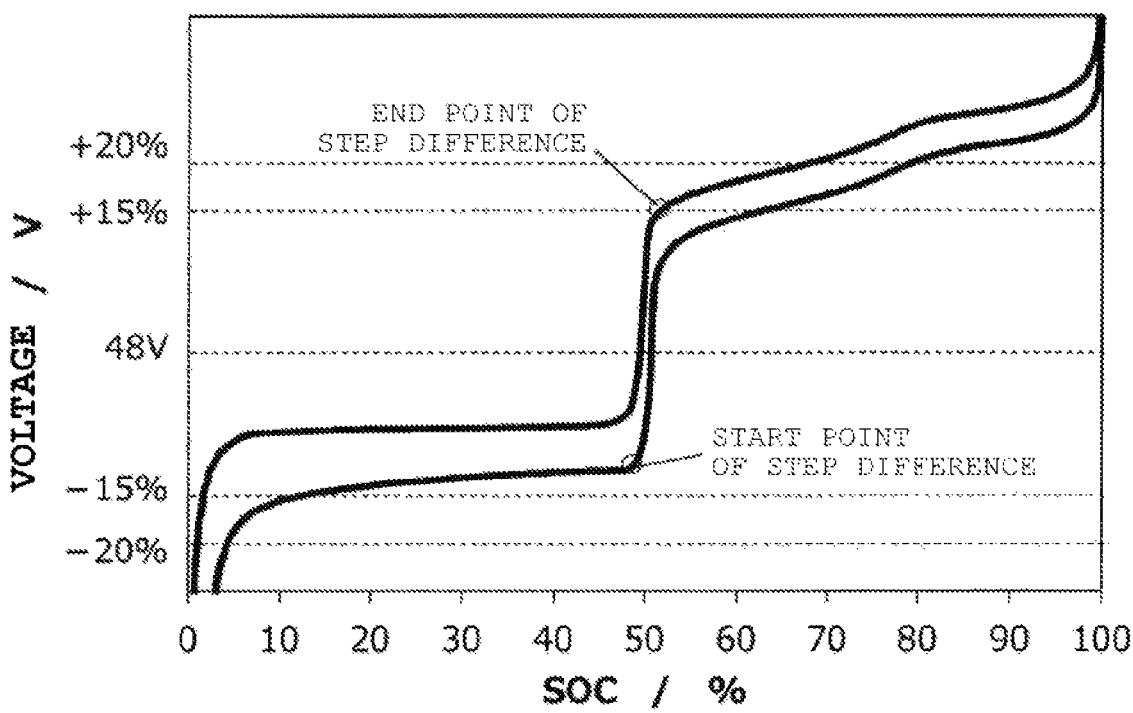
FIG. 40 is a charging/discharging curve of the storage pack 13 prepared in Reference Example 5.
Figure 41:
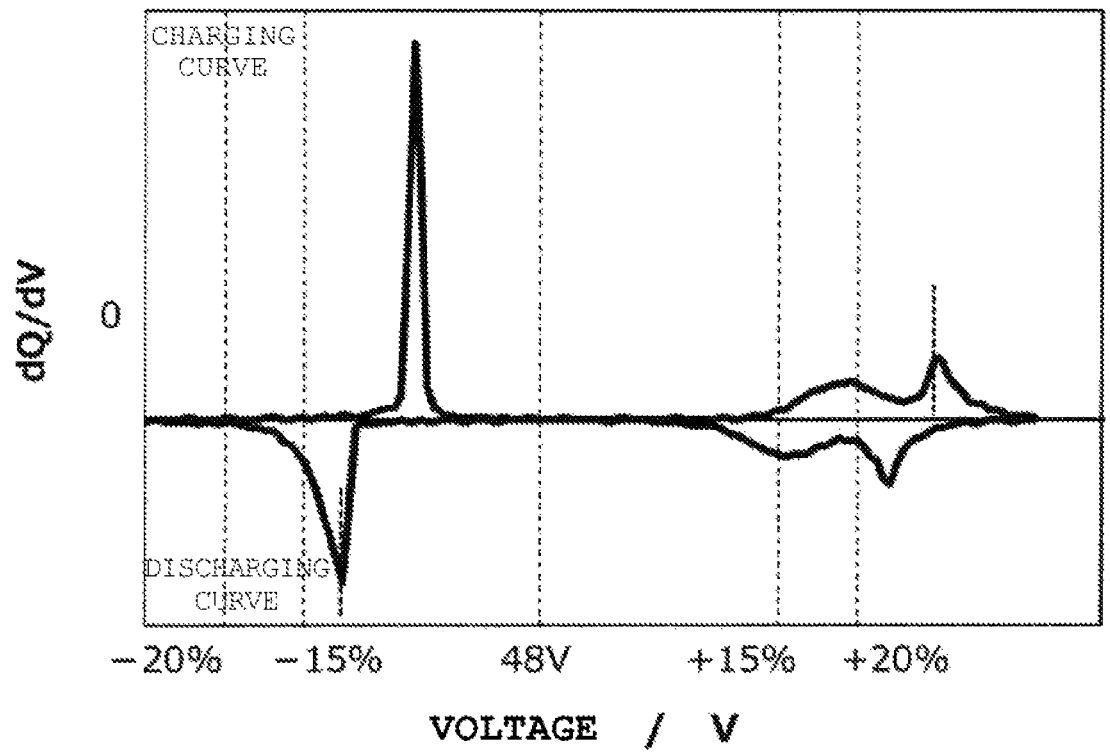
FIG. 41 is a curve (dQ/dV curve) obtained by differentiating the charging/discharging curve of the storage pack 13 prepared in Reference Example 5 with respect to the voltage.

FIG. 40 shows a charging/discharging curve of this storage pack 13, and FIG. 41 shows a curve (dQ/dV curve) obtained by differentiating the charging/discharging curve of the storage pack 13 with respect to the voltage.

Reference Example 6

With use of $Li[Ni_{0.25}Mn_{1.75}]O_4$ as a positive electrode active material and graphite as a negative electrode active material, a lithium ion secondary battery having an A/C ratio of 1.2 and a capacity of 10 Ah was prepared. A power supplying system 1 was constructed in the same manner as in Example 1 except that a storage module in which 9 lithium ion secondary batteries thus prepared were connected in series was used as a storage pack 13.

Figure 42:
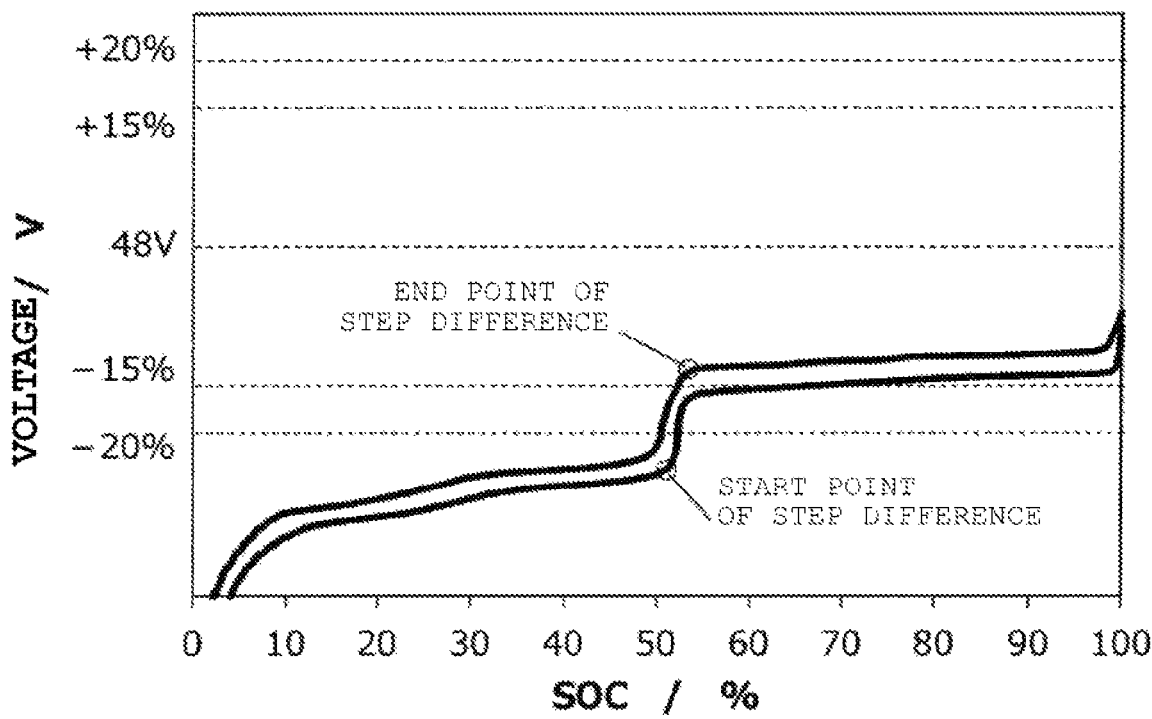
FIG. 42 is a charging/discharging curve of the storage pack 13 prepared in Reference Example 6.
Figure 43:
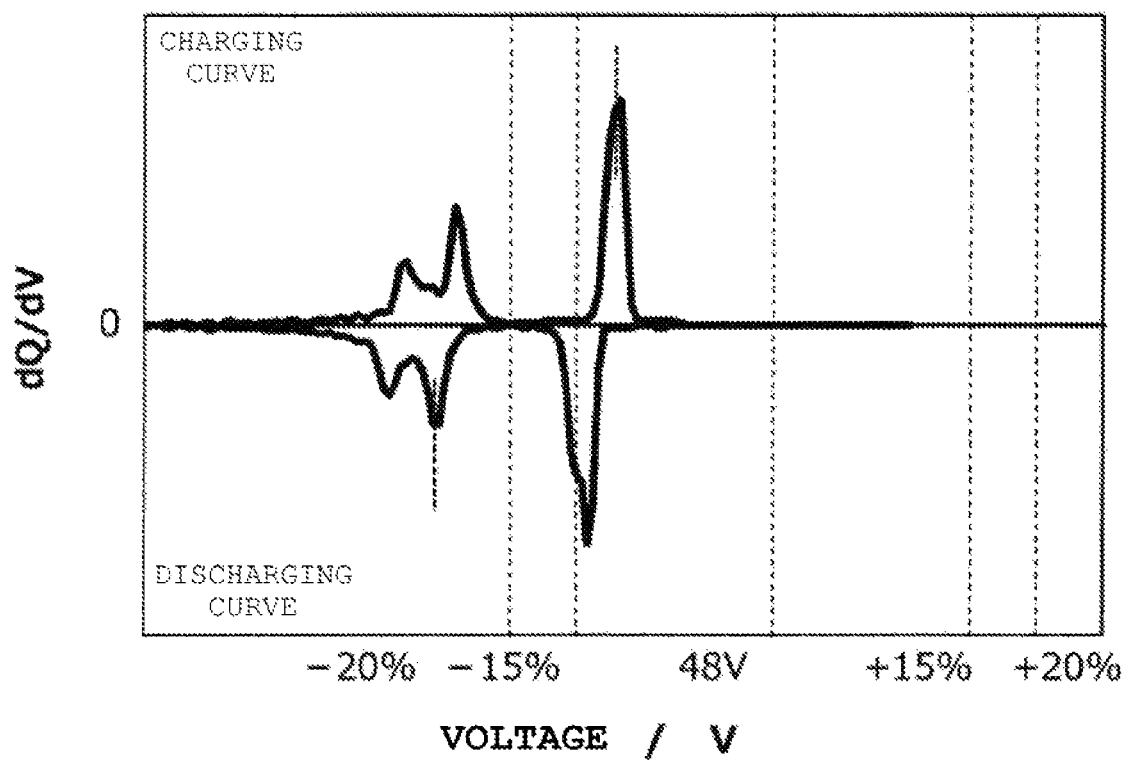
FIG. 43 is a curve (dQ/dV curve) obtained by differentiating the charging/discharging curve of the storage pack 13 prepared in Reference Example 6 with respect to the voltage.

FIG. 42 shows a charging/discharging curve of this storage pack 13, and FIG. 43 shows a curve (dQ/dV curve) obtained by differentiating the charging/discharging curve of the storage pack 13 with respect to the voltage.

Reference Example 7

With use of $Li[Ni_{0.25}Mn_{1.75}]O_4$ as a positive electrode active material and graphite as a negative electrode active material, a lithium ion secondary battery having an A/C ratio of 1.2 and a capacity of 10 Ah was prepared. A power supplying system 1 was constructed in the same manner as in Example 1 except that a storage module in which 13 lithium ion secondary batteries thus prepared were connected in series was used as a storage pack 13.

Figure 44:
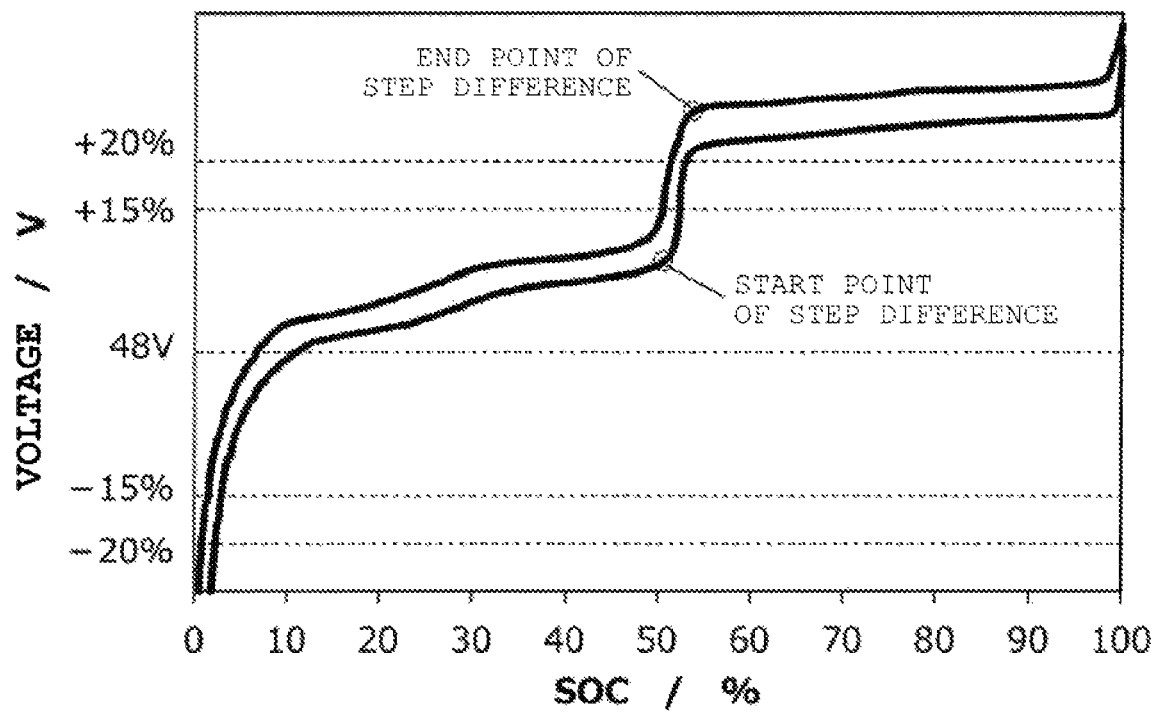
FIG. 44 is a charging/discharging curve of the storage pack 13 prepared in Reference Example 7.
Figure 45:
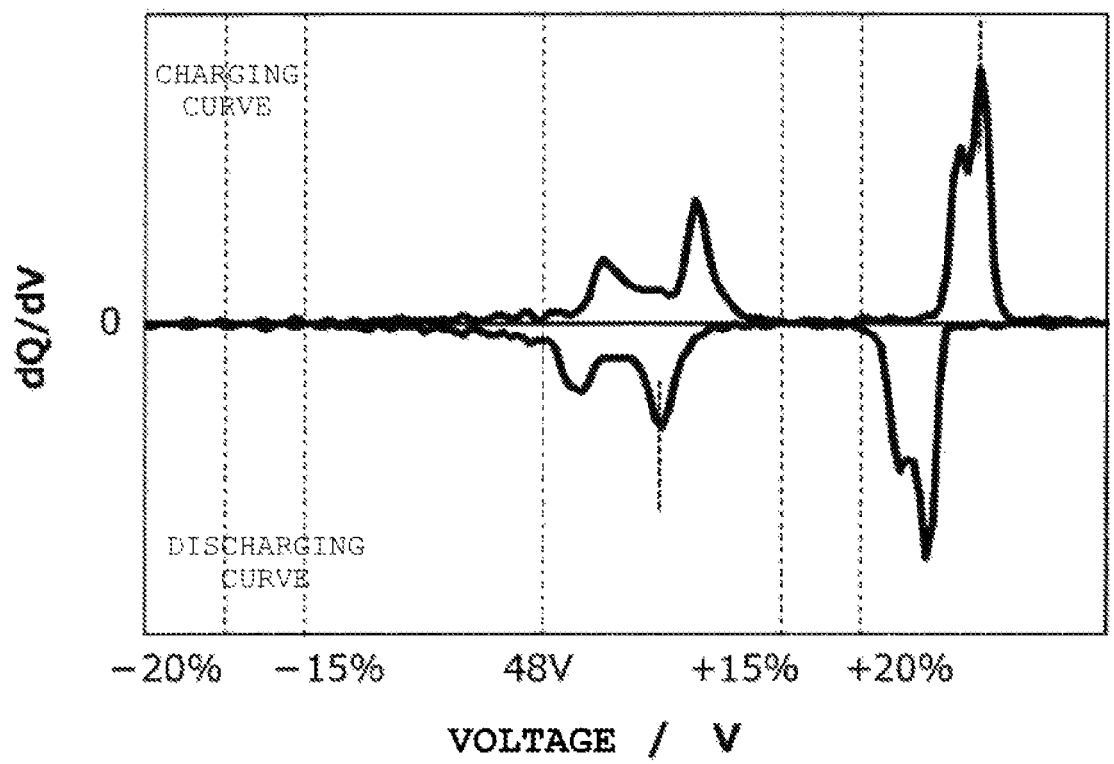
FIG. 45 is a curve (dQ/dV curve) obtained by differentiating the charging/discharging curve of the storage pack 13 prepared in Reference Example 7 with respect to the voltage.

FIG. 44 shows a charging/discharging curve of this storage pack 13, and FIG. 45 shows a curve (dQ/dV curve) obtained by differentiating the charging/discharging curve of the storage pack 13 with respect to the voltage.

Example 14

With use of Li[Ni$_{0.25}$Mn$_{1.75}$]O$_4$ as a positive electrode active material and graphite as a negative electrode active material, a lithium ion secondary battery having an A/C ratio of 1.2 and a capacity of 1 Ah was prepared. A power supplying system 1 was constructed in the same manner as in Example 1 except that a storage module in which 11 lithium ion secondary batteries thus prepared were connected in series was used as a storage pack 13.

The charging/discharging curve of the storage pack 13 prepared in Example 14 is similar to the charging/discharging curve of the storage pack 13 prepared in Example 1. The dQ/dV curve of the storage pack 13 prepared in Example 14 is similar to the dQ/dV curve of the storage pack 13 prepared in Example 1.

Example 15

With use of Li[Ni$_{0.25}$Mn$_{1.75}$]O$_4$ as a positive electrode active material and graphite as a negative electrode active material, a lithium ion secondary battery having an A/C ratio of 1.2 and a capacity of 50 Ah was prepared. A storage module was assembled by connecting 11 lithium ion secondary batteries thus prepared in series. A storage pack 13 was assembled by connecting two storage modules thus prepared in parallel. A power supplying system 1 was constructed in the same manner as in Example 1 except for the above.

The charging/discharging curve of the storage pack 13 prepared in Example 15 is similar to the charging/discharging curve of the storage pack 13 prepared in Example 1. The dQ/dV curve of the storage pack 13 prepared in Example 15 is similar to the dQ/dV curve of the storage pack 13 prepared in Example 1.

Example 16

With use of Li[Ni$_{0.25}$Mn$_{1.75}$]O$_4$ as a positive electrode active material and graphite as a negative electrode active material, a lithium ion secondary battery having an A/C ratio of 1.2 and a capacity of 50 Ah was prepared. A storage module was assembled by connecting 11 lithium ion secondary batteries thus prepared in series. A storage pack 13 was assembled by connecting 20 storage modules thus prepared in parallel. A power supplying system 1 was constructed in the same manner as in Example 1 except for the above.

The charging/discharging curve of the storage pack 13 prepared in Example 16 is similar to the charging/discharging curve of the storage pack 13 prepared in Example 1. The dQ/dV curve of the storage pack 13 prepared in Example 16 is similar to the dQ/dV curve of the storage pack 13 prepared in Example 1.

Example 17

With use of Li[Ni$_{0.25}$Mn$_{1.75}$]O$_4$ as a positive electrode active material and hard carbon as a negative electrode active material, a lithium ion secondary battery having an A/C ratio of 1.2 and a capacity of 10 Ah was prepared. For use as a storage pack 13, a storage module was prepared in which three lithium ion secondary batteries thus formed were connected in series.

Figure 46:
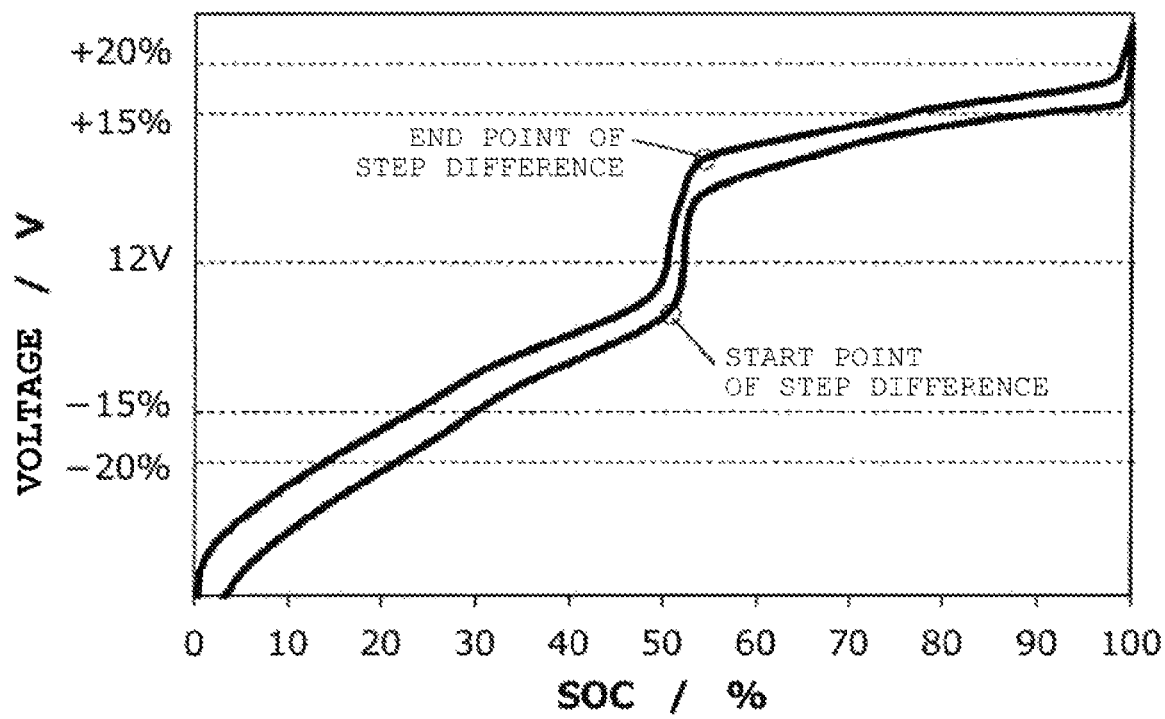
FIG. 46 is a charging/discharging curve of the storage pack 13 prepared in Example 17.
Figure 47:
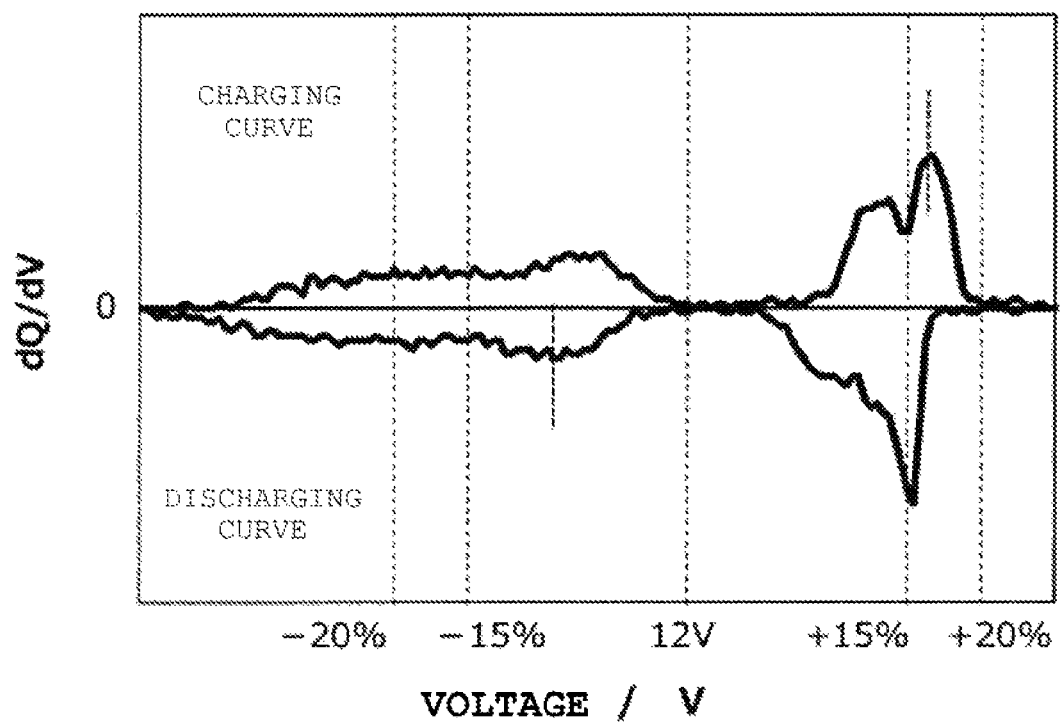
FIG. 47 is a curve (dQ/dV curve) obtained by differentiating the charging/discharging curve of the storage pack 13 prepared in Example 17 with respect to the voltage.

FIG. 46 shows a charging/discharging curve of this storage pack 13, and FIG. 47 shows a curve (dQ/dV curve) obtained by differentiating the charging/discharging curve of the storage pack 13 with respect to the voltage.

The storage pack 13 prepared in the present Example 17 can be suitably used in the power supplying system 1 having a power supplying mechanism 10 with the rated voltage of DC 12 V.

Example 18

With use of a mixture of LiFePO$_4$ and LiNi$_{1/3}$Co$_{1/3}$Mn$_{1/3}$O$_2$ in a weight ratio (LiFePO$_4$:LiNi$_{1/3}$Co$_{1/3}$Mn$_{1/3}$O$_2$) of 50:50 as a positive electrode active material and Li$_4$Ti$_5$O$_{12}$ as a negative electrode active material, a lithium ion secondary battery having an A/C ratio of 1.2 and a capacity of 10 Ah was prepared. For use as a storage pack 13, a storage module was prepared in which 7 lithium ion secondary batteries thus formed were connected in series.

Figure 48:
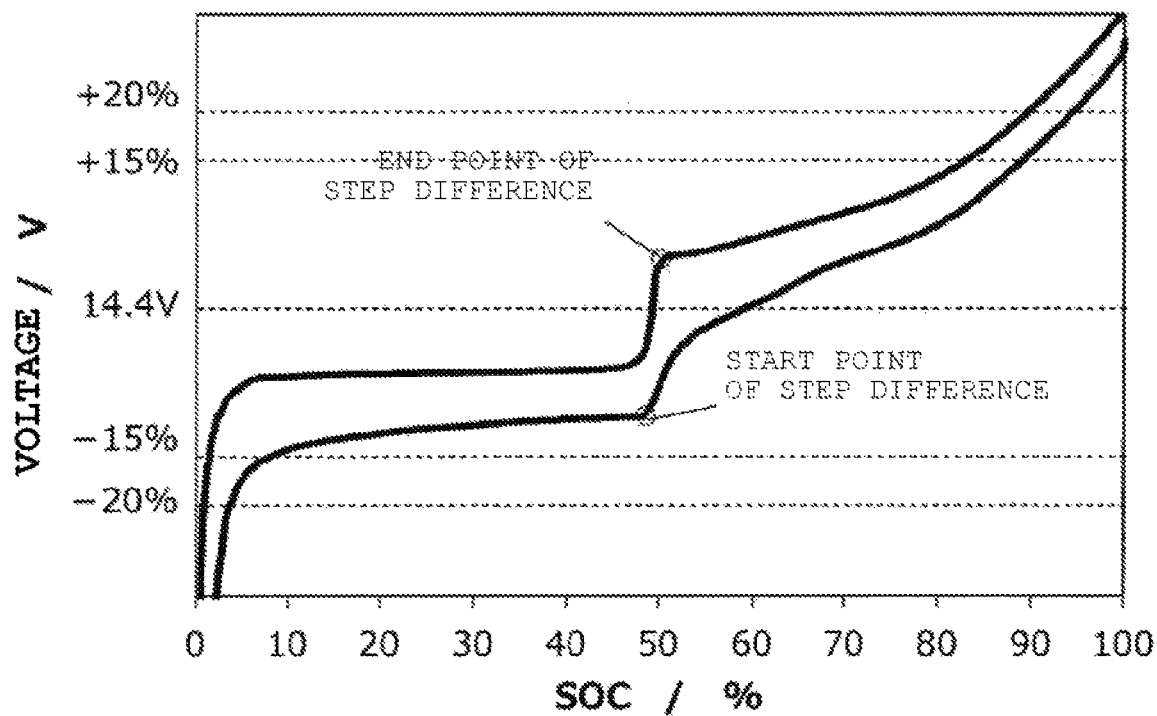
FIG. 48 is a charging/discharging curve of the storage pack 13 prepared in Example 18.
Figure 49:
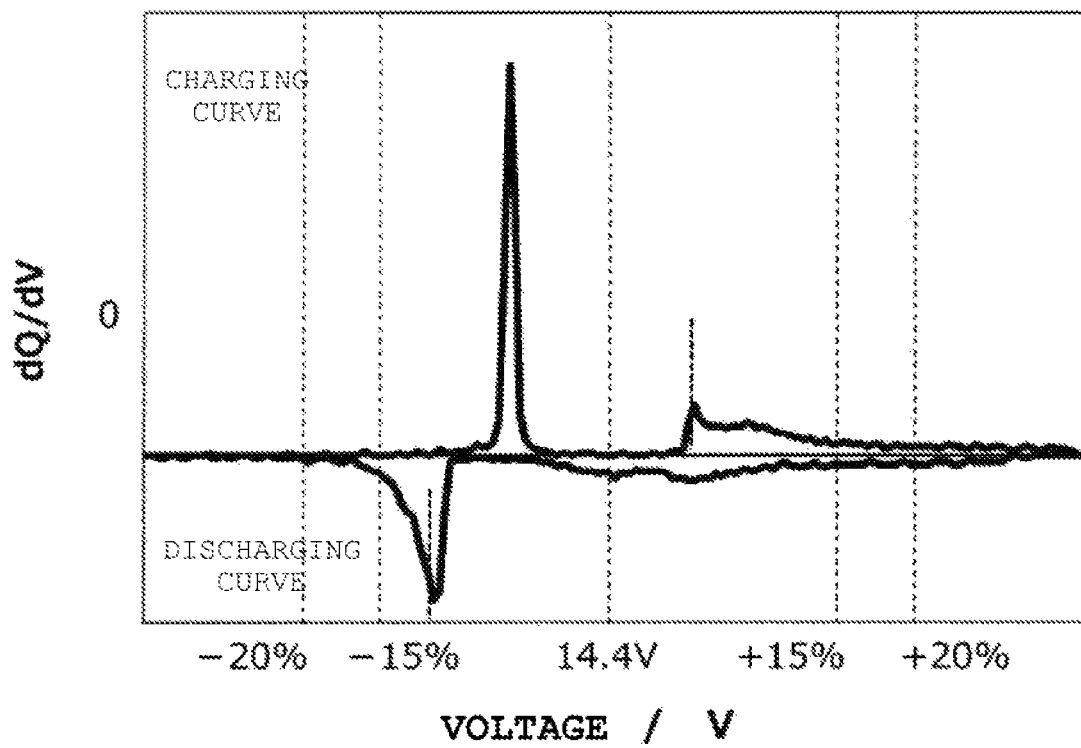
FIG. 49 is a curve (dQ/dV curve) obtained by differentiating the charging/discharging curve of the storage pack 13 prepared in Example 18 with respect to the voltage.

FIG. 48 shows a charging/discharging curve of this storage pack 13, and FIG. 49 shows a curve (dQ/dV curve) obtained by differentiating the charging/discharging curve of the storage pack 13 with respect to the voltage.

The storage pack prepared in Example 18 can be suitably used in the power supplying system 1 having a power supplying mechanism 10 with the rated voltage of DC 14.4 V.

Example 19

With use of Li[Ni$_{0.25}$Mn$_{1.75}$]O$_4$ as a positive electrode active material and hard carbon as a negative electrode active material, a lithium ion secondary battery having an A/C ratio of 1.2 and a capacity of 10 Ah was prepared. For use as a storage pack 13, a storage module was prepared in which 6 lithium ion secondary batteries thus formed were connected in series.

Figure 50:
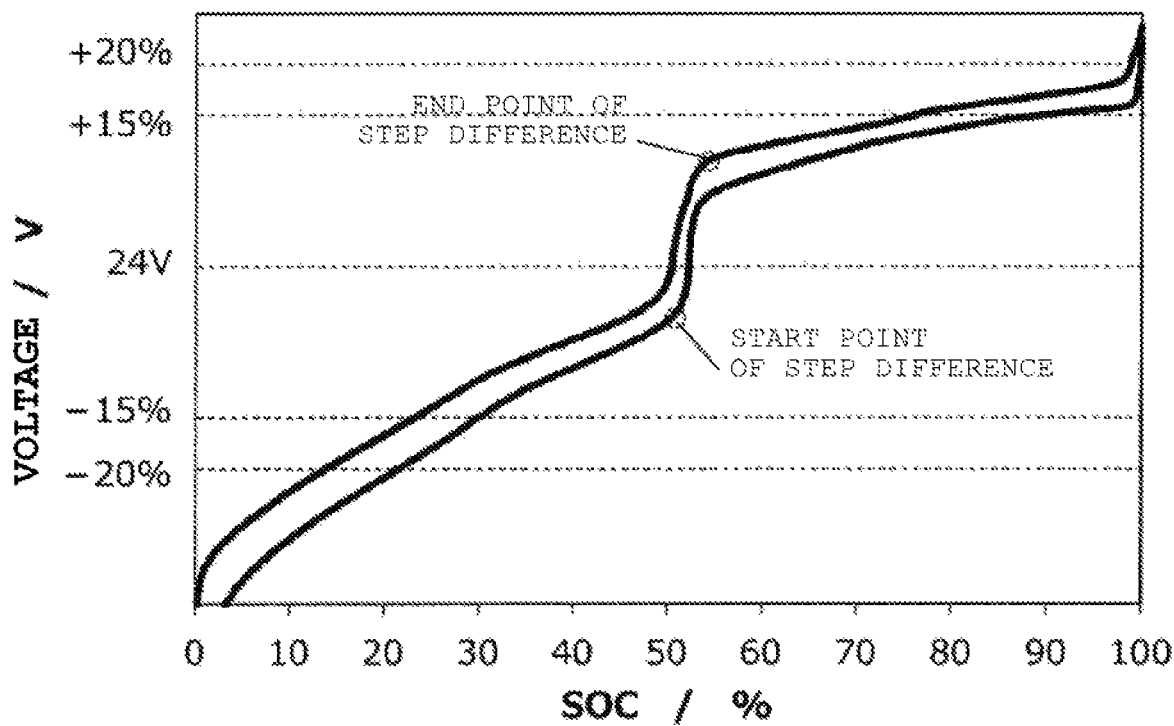
FIG. 50 is a charging/discharging curve of the storage pack 13 prepared in Example 19.
Figure 51:
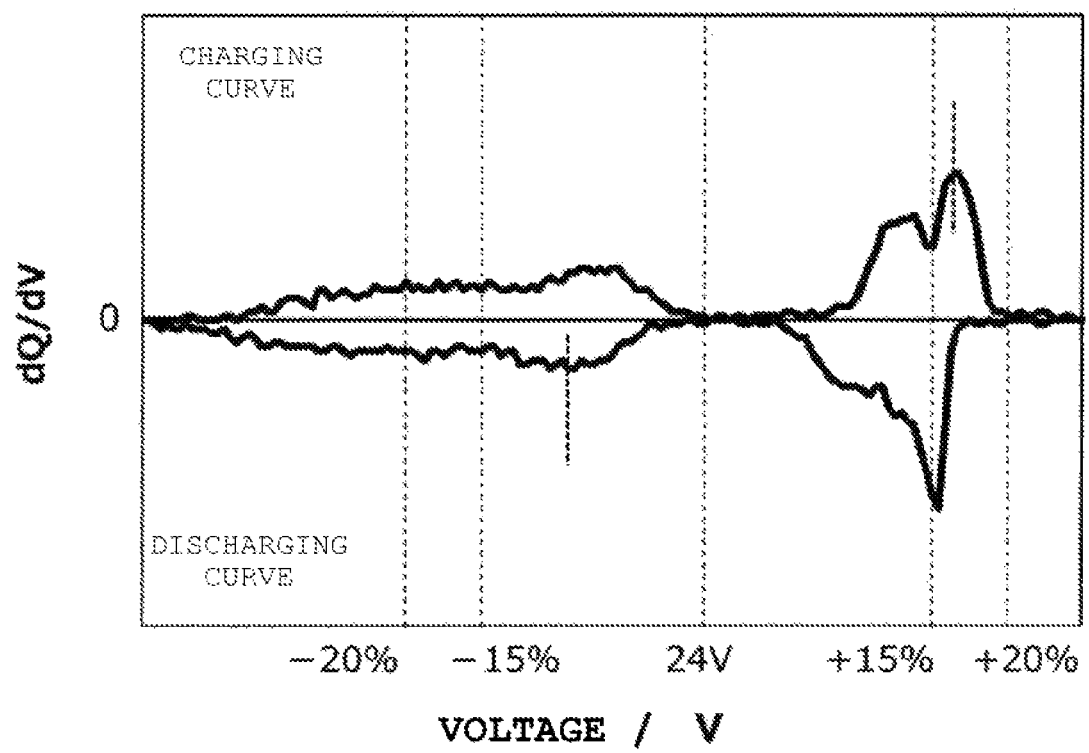
FIG. 51 is a curve (dQ/dV curve) obtained by differentiating the charging/discharging curve of the storage pack 13 prepared in Example 19 with respect to the voltage.

FIG. 50 shows a charging/discharging curve of this storage pack 13, and FIG. 51 shows a curve (dQ/dV curve) obtained by differentiating the charging/discharging curve of the storage pack 13 with respect to the voltage.

The storage pack prepared in Example 19 can be suitably used in the power supplying system 1 having a power supplying mechanism 10 with the rated voltage of DC 24 V.

Example 20

With use of Li[Ni$_{0.25}$Mn$_{1.75}$]O$_4$ as a positive electrode active material and graphite as a negative electrode active material, a lithium ion secondary battery having an A/C ratio of 1.2 and a capacity of 10 Ah was prepared. For use as a storage pack 13, a storage module was prepared in which 86 lithium ion secondary batteries thus formed were connected in series.

Figure 52:
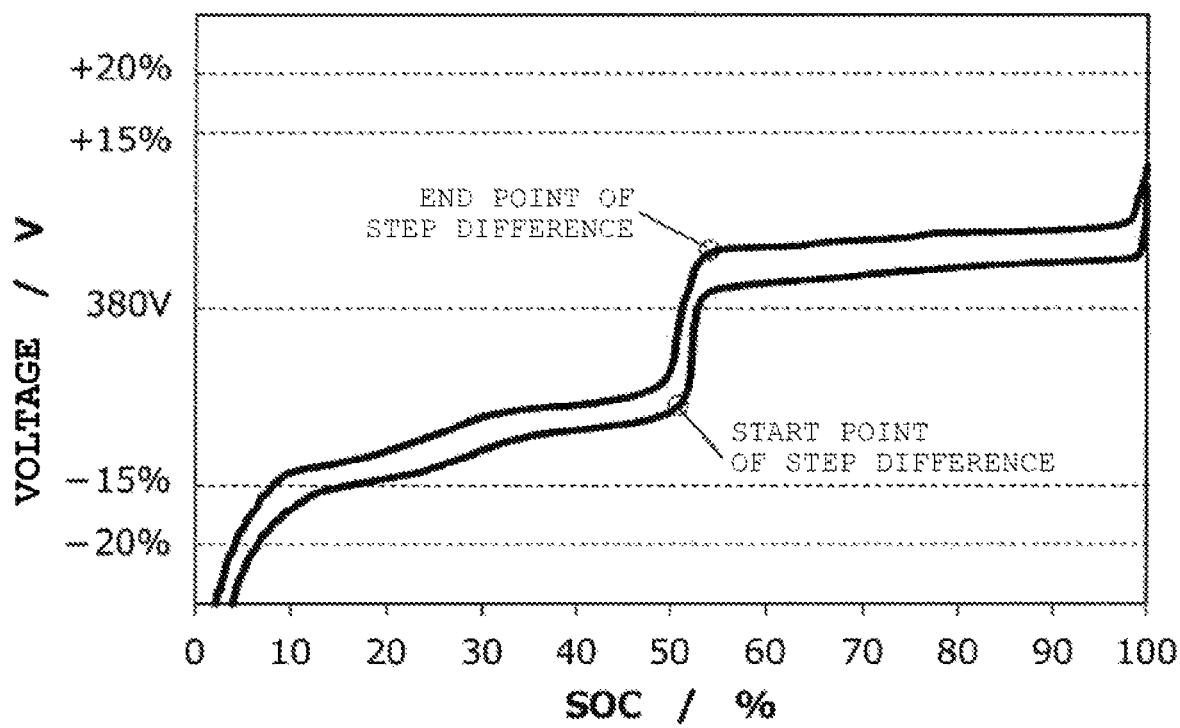
FIG. 52 is a charging/discharging curve of the storage pack 13 prepared in Example 20.
Figure 53:
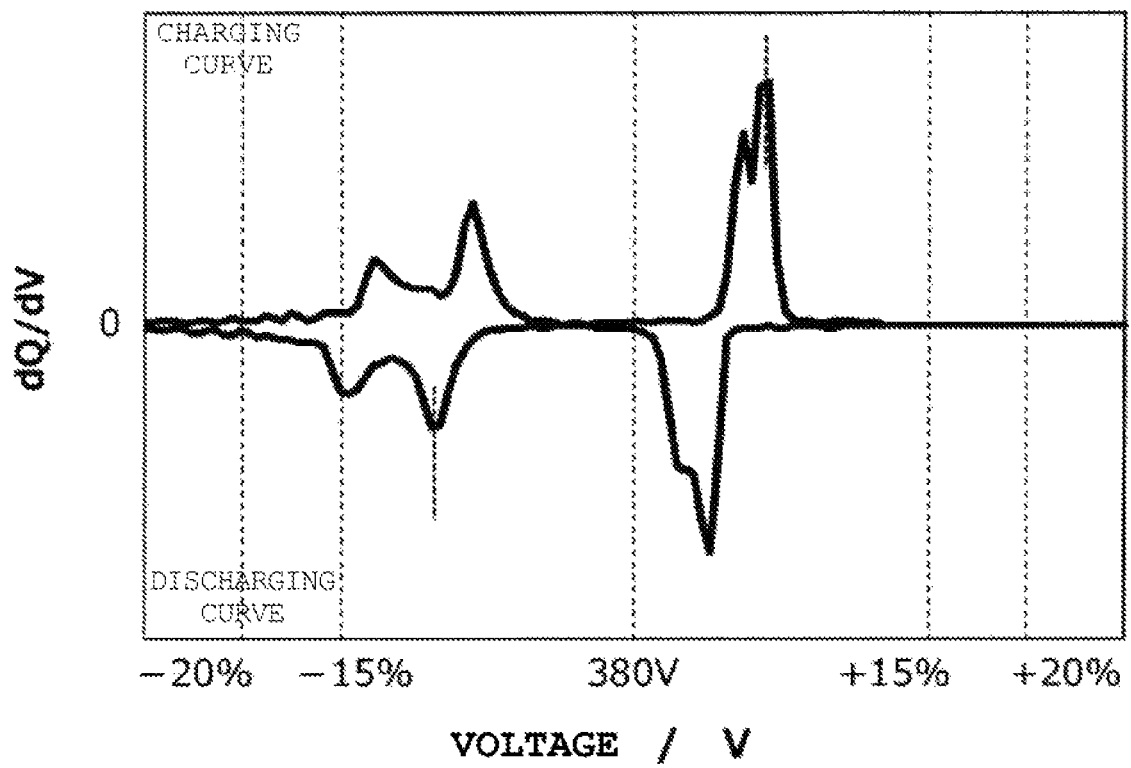
FIG. 53 is a curve (dQ/dV curve) obtained by differentiating the charging/discharging curve of the storage pack 13 prepared in Example 20 with respect to the voltage.

FIG. 52 shows a charging/discharging curve of this storage pack 13, and FIG. 53 shows a curve (dQ/dV curve) obtained by differentiating the charging/discharging curve of the storage pack 13 with respect to the voltage.

The storage pack prepared in Example 20 can be suitably used in the power supplying system 1 having a power supplying mechanism 10 with the rated voltage of DC 380 V.

Example 21

With use of $Li[Ni_{0.25}Mn_{1.75}]O_4$ as a positive electrode active material and hard carbon as a negative electrode active material, a lithium ion secondary battery having an A/C ratio of 1.2 and a capacity of 50 Ah was prepared. For use as a storage pack 13, a storage module was prepared in which 345 lithium ion secondary batteries thus formed were connected in series.

Figure 54:
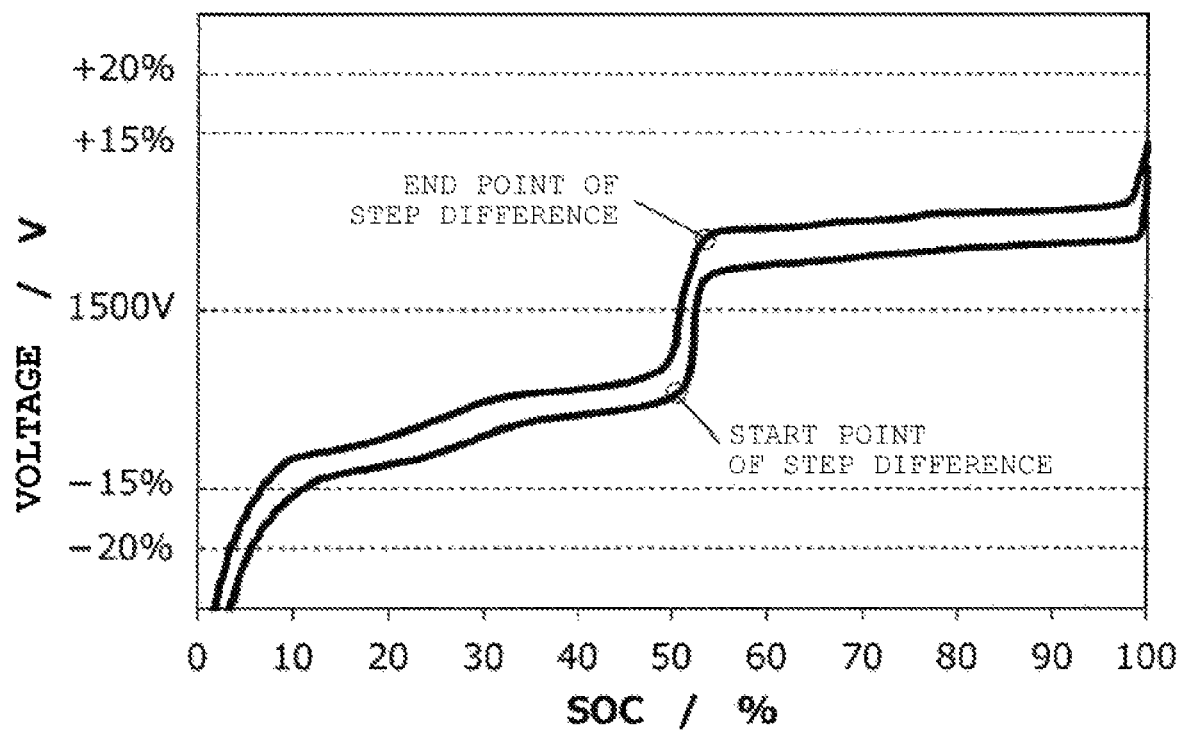
FIG. 54 is a charging/discharging curve of the storage pack 13 prepared in Example 21.
Figure 55:
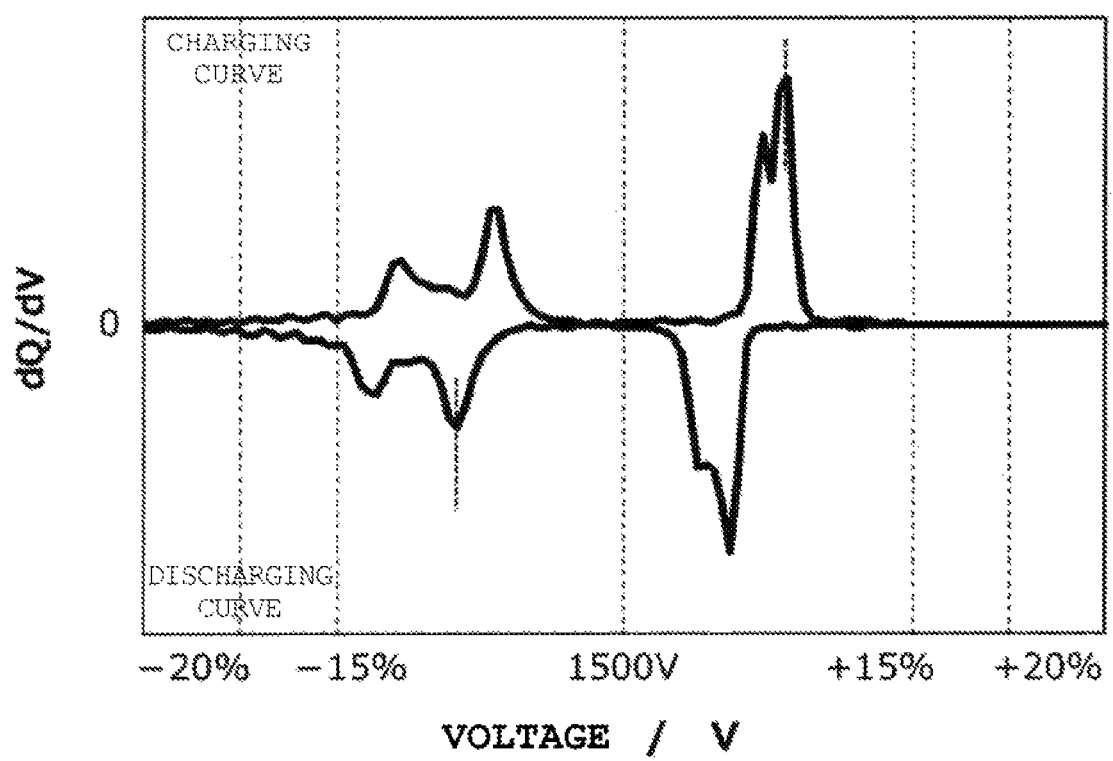
FIG. 55 is a curve (dQ/dV curve) obtained by differentiating the charging/discharging curve of the storage pack 13 prepared in Example 21 with respect to the voltage.

FIG. 54 shows a charging/discharging curve of this storage pack 13, and FIG. 55 shows a curve (dQ/dV curve) obtained by differentiating the charging/discharging curve of the storage pack 13 with respect to the voltage.

The storage pack prepared in Example 21 can be suitably used in the power supplying system 1 having a power supplying mechanism 10 with the rated voltage of DC 1500 V.

Example 22

Figure 56:
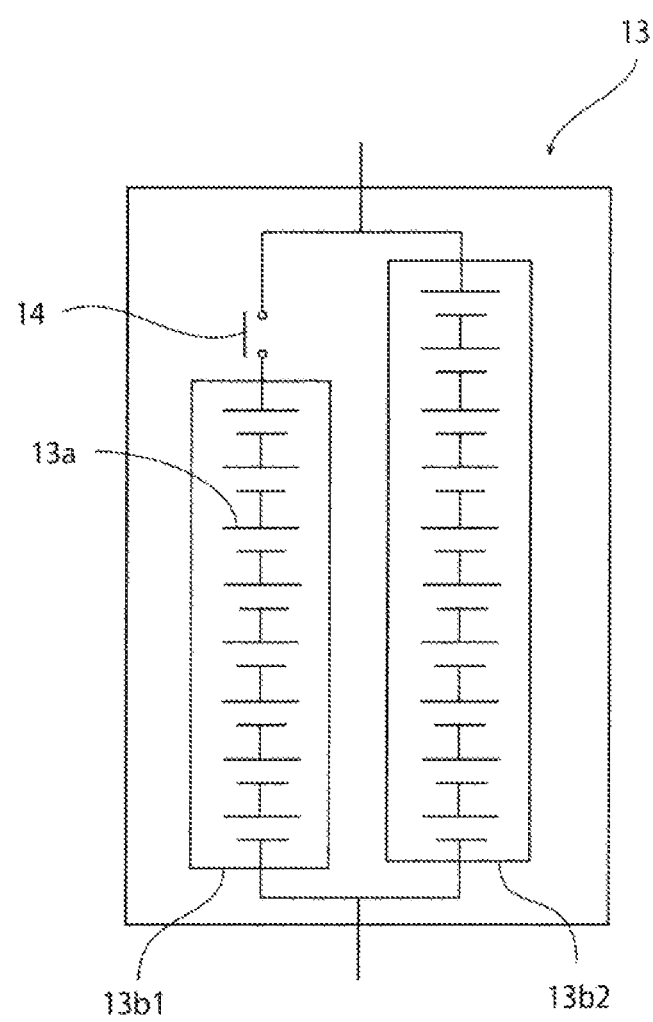
FIG. 56 is a schematic circuit diagram of a storage pack prepared in Example 56.

Referring to FIG. 56, a nickel hydrogen secondary battery having a capacity of 5 Ah was used as a storage device 13a. A first storage module 13b1 was prepared by connecting 8 nickel hydrogen secondary batteries thus formed in series. Also, a second storage module 13b2 was prepared by connecting 10 nickel hydrogen secondary batteries thus formed in series. Further, a storage pack 13 was prepared by connecting the first storage module 13b1 and the second storage module 13b2 in parallel and disposing a switch 14 on the first storage module 13b1 side. The switch 14 is turned on when the voltage of the first storage module 13b1 is 12.0 V or lower and is turned off when the voltage is higher than 12.0 V.

Figure 57:
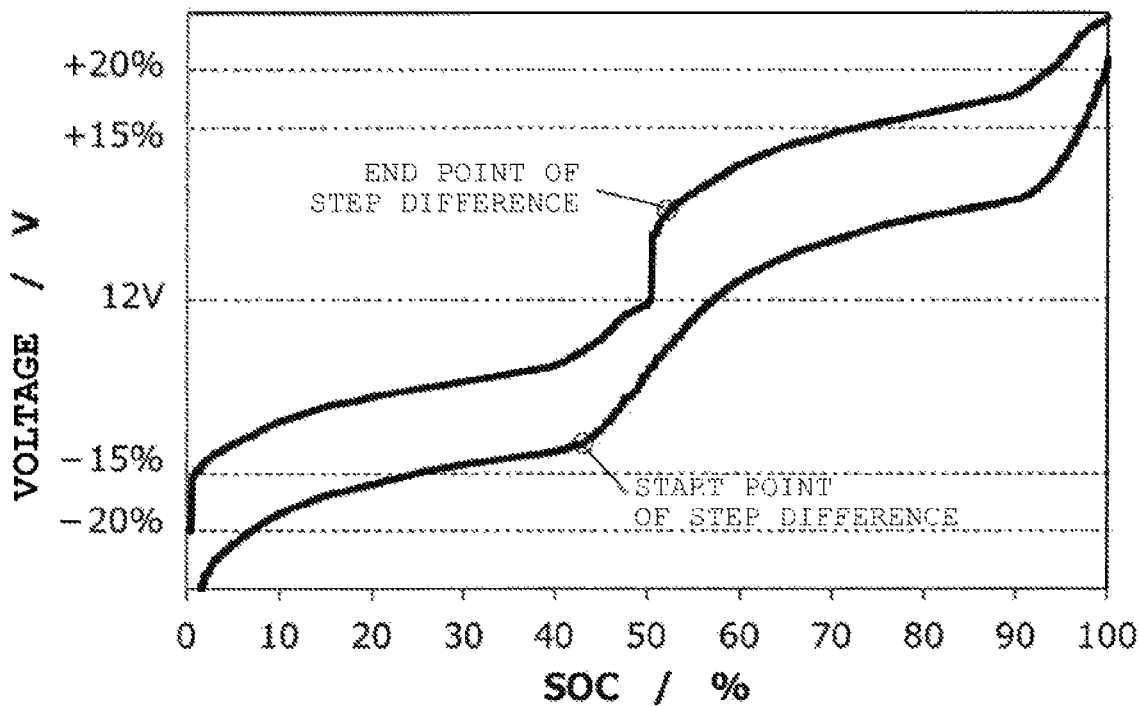
FIG. 57 is a charging/discharging curve of the storage pack 13 prepared in Example 22.
Figure 58:
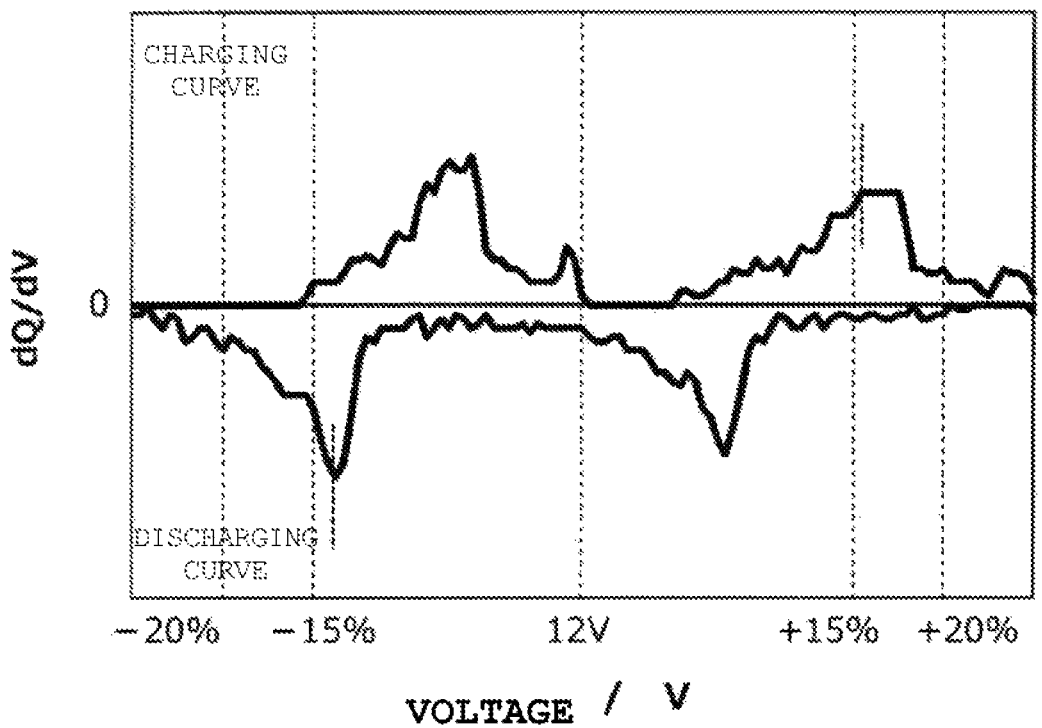
FIG. 58 is a curve (dQ/dV curve) obtained by differentiating the charging/discharging curve of the storage pack 13 prepared in Example 22 with respect to the voltage.

FIG. 57 shows a charging/discharging curve of this storage pack 13, and FIG. 58 shows a curve (dQ/dV curve) obtained by differentiating the charging/discharging curve of the storage pack 13 with respect to the voltage.

The storage pack prepared in Example 22 can be suitably used in the power supplying system 1 having a power supplying mechanism 10 with the rated voltage of DC 12 V.

As will be understood from the result of Example 22, a step difference can be formed in the charging/discharging curve by providing a switch 14 that is turned on/off at a certain voltage in the storage pack 13. Also, by providing the switch, the storage module having the lower charging/discharging voltage can be prevented from being brought into an overcharged state, and the storage module having the higher charging/discharging voltage can be prevented from being brought into an overly discharged state. For this reason, a nickel hydrogen secondary battery or a lithium ion secondary battery having a low overcharging resistance can be used in the storage pack 13. Accordingly, the storage pack 13 prevents the voltage of the first storage pack 11 from entering an overcharged region or an overly discharged region.

TABLE 1

| | Configuration | | | | | | | Storage pack 13 | | | | | | | | | | |
|---|---|---|---|---|---|---|---|---|---|---|---|---|---|---|---|---|---|---|
| | Rated voltage (V) of power supplying mechanism 10 | Positive electrode active material of lithium ion secondary battery | Negative electrode active material of lithium ion secondary battery | A/C ratio | Capacity (Ah) | Number of batteries connected in series | Lower-SOC side of start point of step difference | | | | Higher-SOC side of end point of step difference | | | | Capacity ratio | | | |
| | | | | | | | Start point of step difference | | End point of step difference | | Average discharging voltage (V) | Peak top voltage (V) of dQ/dV curve | Average charging voltage (V) | Peak top voltage (V) of dQ/dV curve | Lower-SOC side of start point of step difference | Higher-SOC side of end point of step difference | | |
| | | | | | | | SOC (%) | Voltage (V) | SOC (%) | Voltage (V) | | | | | | | | |
| Example 1 | 48 | LiNi$_{0.25}$Mn$_{1.75}$O$_4$ | Graphite | 1.2 | 10 | 11 | 50 | 44.4 | 53 | 50.7 | 41.0 | 43.6 | 51.6 | 51.8 | 52 | 48 | | |
| Example 2 | 48 | LiNi$_{0.05}$Mn$_{1.95}$O$_4$ | Graphite | 1.2 | 10 | 11 | 85 | 47.7 | 89 | 51.4 | 41.8 | 43.8 | 51.8 | 51.6 | 89 | 11 | | |
| Example 3 | 48 | LiNi$_{0.15}$Mn$_{1.95}$O$_4$ | Graphite | 1.2 | 10 | 11 | 70 | 44.7 | 72 | 51.2 | 41.5 | 43.8 | 51.7 | 51.6 | 72 | 28 | | |
| Example 4 | 48 | LiNi$_{0.35}$Mn$_{1.65}$O$_4$ | Graphite | 1.2 | 10 | 11 | 31 | 43.9 | 35 | 50.6 | 40.0 | 43.0 | 51.5 | 51.8 | 32 | 68 | | |
| Example 5 | 48 | LiNi$_{0.40}$Mn$_{1.60}$O$_4$ | Graphite | 1.2 | 10 | 11 | 22 | 43.5 | 26 | 50.4 | 39.1 | 42.8 | 51.5 | 51.8 | 23 | 77 | | |
| Reference Example 1 | 48 | LiMn$_2$O$_4$ | Graphite | 1.2 | 10 | 12 | | | | | | No step difference is present in range of SOC 5 to 95% | | | | | | |
| Reference Example 2 | 48 | LiNi$_{0.50}$Mn$_{1.50}$O$_4$ | Graphite | 1.2 | 10 | 11 | | | | | | No step difference is present in range of SOC 5 to 95% | | | | | | |
| Example 6 | 48 | LiNi$_{0.25}$Mn$_{1.75}$O$_4$ | Hard carbon | 1.2 | 10 | 12 | 48 | 45.0 | 54 | 52.9 | 38.4 | 43.6 | 55.2 | 56.0 | 51 | 49 | | |
| Example 7 | 48 | LiNi$_{0.25}$Mn$_{1.75}$O$_4$ | Soft carbon | 1.2 | 10 | 12 | 48 | 45.2 | 54 | 53.0 | 38.8 | 43.8 | 55.1 | 55.8 | 51 | 49 | | |
| Example 8 | 48 | LiNi$_{0.25}$Mn$_{1.75}$O$_4$ | Si | 2.0 | 10 | 12 | 50 | 44.6 | 54 | 53.5 | 41.0 | 43.4 | 54.4 | 53.8 | 52 | 48 | | |
| Example 9 | 48 | LiMn$_2$O$_4$:LiNi$_{0.50}$Mn$_{1.50}$O$_4$ = 60:40 (Weight ratio) | Graphic | 1.2 | 10 | 11 | 61 | 44.8 | 63 | 50.9 | 41.3 | 43.6 | 51.7 | 51.8 | 62 | 38 | | |
| Example 10 | 48 | LiFePO$_4$:LiNi$_{1/3}$Co$_{1/3}$Mn$_{1/3}$O$_2$ = 35:65 (Weight ratio) | Si | 3.0 | 10 | 16 | 34 | 45.5 | 36 | 54.2 | 42.6 | 45.0 | 57.5 | 50.2 | 35 | 65 | | |
| Example 11 | 48 | LiFePO$_4$:LiNi$_{1/3}$Co$_{1/3}$Mn$_{1/3}$O$_2$ = 50:50 (Weight ratio) | Li$_4$Ti$_5$O$_{12}$ | 1.2 | 10 | 24 | 49 | 44.1 | 50 | 51.9 | 41.8 | 43.8 | 56.1 | 52.2 | 49 | 51 | | |
| Example 12 | 48 | LiMn$_2$O$_4$ | Graphite | 1.2 | 6 | 11 | 61 | 44.8 | 63 | 50.9 | 41.3 | 43.6 | 51.7 | 51.8 | 62 | 38 | | |
| Example 13 | 48 | LiNi$_{0.25}$Mn$_{1.75}$O$_4$ | Graphite | 1.2 | 4 | 11 | 50 | 44.2 | 53 | 53.4 | 41.7 | 43.8 | 54.2 | 53.8 | 52 | 48 | | |
| | 48 | LiFePO$_4$ | Li$_4$Ti$_5$O$_{12}$ | 1.2 | 5 | 24 | | | | | | | | | | | | |
| | 48 | LiFePO$_4$ | Li$_4$Ti$_5$O$_{12}$ | 1.2 | 5 | 28 | | | | | | | | | | | | |
| Reference Example 3 | 48 | LiFePO$_4$:LiNi$_{0.50}$Mn$_{1.50}$O$_4$ = 50:50 (Weight ratio) | Hard carbon | 1.5 | 10 | 13 | 48 | 37.3 | 56 | 56.4 | 32.2 | 36.8 | 58.7 | 59.0 | 35 | 65 | | |
| Reference Example 4 | 48 | LiFePO$_4$:LiMn$_2$O$_4$ = 50:50 (Weight ratio) | Li$_4$Ti$_5$O$_{12}$ | 1.2 | 10 | 21 | 49 | 38.6 | 53 | 50.7 | 36.5 | 38.2 | 53.8 | 54.8 | 51 | 49 | | |
| Reference Example 5 | 48 | LiFePO$_4$:LiMn$_2$O$_4$ = 50:50 (Weight ratio) | Li$_4$Ti$_5$O$_{12}$ | 1.2 | 10 | 23 | 49 | 42.3 | 53 | 55.6 | 40.0 | 42.0 | 58.9 | 60.0 | 51 | 49 | | |
| Reference Example 6 | 48 | LiNi$_{0.25}$Mn$_{1.75}$O$_4$ | Graphite | 1.2 | 10 | 9 | 52 | 36.8 | 53 | 41.5 | 33.6 | 35.8 | 42.3 | 42.4 | 53 | 47 | | |
| Reference Example 7 | 48 | LiNi$_{0.25}$Mn$_{1.75}$O$_4$ | Graphite | 1.2 | 10 | 13 | 50 | 52.5 | 54 | 60.2 | 48.5 | 51.6 | 61.0 | 61.2 | 52 | 48 | | |
| Example 14 | 48 | LiNi$_{0.25}$Mn$_{1.75}$O$_4$ | Graphite | 1.2 | 1 | 11 | 50 | 44.4 | 53 | 50.7 | 51.0 | 43.6 | 51.6 | 51.8 | 52 | 48 | | |
| Example 15 | 48 | LiNi$_{0.25}$Mn$_{1.75}$O$_4$ | Graphite | 1.2 | 100 | 11 | 50 | 44.4 | 53 | 50.7 | 41.0 | 43.6 | 51.6 | 51.8 | 52 | 48 | | |
| Example 16 | 48 | LiNi$_{0.25}$Mn$_{1.75}$O$_4$ | Graphite | 1.2 | 1000 | 11 | 50 | 44.4 | 53 | 50.7 | 41.0 | 43.6 | 51.6 | 51.8 | 52 | 48 | | |
| Example 17 | 12 | LiNi$_{0.25}$Mn$_{1.75}$O$_4$ | Hard carbon | 1.2 | 10 | 3 | 48 | 11.2 | 54 | 13.2 | 9.6 | 10.9 | 13.8 | 14.0 | 51 | 49 | | |

TABLE 1-continued

| | Rated voltage (V) of power supplying mechanism 10 | Configuration | | | | | Storage pack 13 | | | | | | | | | |
|---|---|---|---|---|---|---|---|---|---|---|---|---|---|---|---|---|
| | | | | | | | Start point of step difference | | End point of step difference | | Lower-SOC side of start point of step difference | | Higher-SOC side of end point of step difference | | Capacity ratio | |
| | | Positive electrode active material of lithium ion secondary battery | Negative electrode active material of lithium ion secondary battery | A/C ratio | Capacity (Ah) | Number of batteries connected in series | SOC (%) | Voltage (V) | SOC (%) | Voltage (V) | Average discharging voltage (V) | Peak top voltage (V) of dQ/dV curve | Average charging voltage (V) | Peak top voltage (V) of dQ/dV curve | Lower-SOC side of start point of step difference | Higher-SOC side of end point of step difference |
| Example 18 | 14.4 | LiFePO$_4$:LiNi$_{1.3}$Co$_{1.3}$Mn$_{1.75}$O$_2$ = 50:50 (Weight ratio) | Li$_4$Ti$_5$O$_{12}$ | 1.2 | 10 | 7 | 49 | 12.9 | 50 | 15.1 | 12.2 | 12.8 | 16.4 | 15.9 | 49 | 51 |
| Example 19 | 24 | LiNi$_{0.25}$Mn$_{1.75}$O$_4$ | Hard carbon | 1.2 | 10 | 6 | 48 | 22.5 | 54 | 26.5 | 19.2 | 21.8 | 27.6 | 28.0 | 51 | 49 |
| Example 20 | 380 | LiNi$_{0.25}$Mn$_{1.75}$O$_4$ | Graphite | 1.2 | 10 | 86 | 50 | 347 | 53 | 397 | 321 | 340 | 404 | 406 | 52 | 48 |
| Example 21 | 1500 | LiNi$_{0.25}$Mn$_{1.75}$O$_4$ | Graphite | 1.2 | 50 | 345 | 50 | 1394 | 53 | 1591 | 1287 | 1369 | 1620 | 1627 | 52 | 48 |
| Example 22 | 12 | (Nickel hydrogen secondary battery) | (Nickel hydrogen secondary battery) | 1.1 | 5 | 10 | 47 | 10.8 | 52 | 12.9 | 10.0 | 10.4 | 13.9 | 13.9 | 49 | 51 |

DESCRIPTION OF REFERENCE SYMBOLS

1: Power supplying system
10: Power supplying mechanism
10a: Power supplying unit
10b: Power conversion unit
11: Electric load
12: Power line
13: Storage pack
13a: Storage device
13b: Storage module
13b1: First storage module
13b2: Second storage module
14: Switch

The invention claimed is:

1. A power supplying system comprising:
a power supplying mechanism that supplies a DC power;
an electric load;
a power line connecting the power supply to the electric load; and
a storage pack connected to the power line, wherein
a charging/discharging curve of the storage pack has a step difference that passes through a rated voltage of the power supplying mechanism,
an average discharging voltage on a lower-SOC side of a start point of the step difference is −20% or more of the rated voltage, and
an average charging voltage on a higher-SOC side of an end point of the step difference is +20% or less of the rated voltage.

2. The power supplying system according to claim 1, wherein
the average discharging voltage on the lower-SOC side of the start point of the step difference is −2% or less of the rated voltage, and
the average charging voltage on the higher-SOC side of the end point of the step difference is +2% or more of the rated voltage.

3. The power supplying system according to claim 1, wherein the storage pack comprises one of a lithium ion secondary battery and a nickel hydrogen secondary battery.

4. The power supplying system according to claim 3, wherein
the storage pack comprises a lithium ion secondary battery having a positive electrode, and
the positive electrode comprises at least one positive electrode active material selected from $Li[Ni_xMn_{(2-x)}]O_4$ ($0.05 \le x \le 0.45$), $Li[Co_xMn_{(2-x)}]O_4$ ($0.1 \le x \le 1$), $Li[Fe_xMn_{(2-x)}]O_4$ ($0.05 \le x \le 0.45$), $LiFe_aMn_bCo_cNi_dPO_4$ ($0 \le a \le 1, 0 \le b \le 1, 0 \le c \le 1, 0 \le d \le 1, a+b+c+d=1$), and $Li_3V_2(PO_4)_3$.

5. The power supplying system according to claim 3, wherein
the storage pack comprises a lithium ion secondary battery having a positive electrode, and
the positive electrode comprises a plurality of kinds of positive electrode active materials.

6. The power supplying system according to claim 3, wherein
the storage pack comprises a lithium ion secondary battery having a negative electrode, and
the negative electrode comprises a plurality of kinds of negative electrode active materials.

7. The power supplying system according to claim 1, wherein the storage pack comprises a plurality of storage modules connected in parallel, and each of the plurality of storage modules comprises a plurality of storage devices connected in series, and
each of the plurality of storage modules are different from each other in a number of connected storage devices.

8. The power supplying system according to claim 1, wherein the storage pack comprises a plurality of kinds of storage modules having different kinds of storage devices.

9. The power supplying system according to claim 1, wherein, in the storage pack, a ratio of a first capacity on the lower-SOC side of the start point of the step difference to a second capacity on the higher-SOC side of the end point of the step difference is within a range of 10: 90 to 90:10.

10. A power supplying system comprising:
a power supplying mechanism that supplies a DC power;
an electric load;
a power line connecting the power supplying mechanism and the electric load; and
a storage pack connected to the power line, wherein
a charging/discharging curve of the storage pack has a step difference that passes through a rated voltage of the power supplying mechanism,
a voltage of a peak top on a curve (dQ/dV curve) obtained by differentiating the discharging curve of the storage pack with respect to the voltage on a lower-SOC side of a start point of the step difference is −20% or more of the rated voltage, and
a voltage of a peak top on a curve (dQ/dV curve) obtained by differentiating the charging curve of the storage pack with respect to the voltage on a higher-SOC side of an end point of the step difference is +20% or less of the rated voltage.

11. The power supplying system according to claim 10, wherein
the voltage of the peak top on the curve (dQ/dV curve) obtained by differentiating the discharging curve of the storage pack with respect to the voltage on the lower-SOC side of the start point of the step difference is −2% or less of the rated voltage, and
the voltage of the peak top on the curve (dQ/dV curve) obtained by differentiating the charging curve of the storage pack with respect to the voltage on the higher-SOC side of the end point of the step difference is +2% or more of the rated voltage.

12. The power supplying system according to claim 10, wherein the storage pack comprises one of a lithium ion secondary battery and a nickel hydrogen secondary battery.

13. The power supplying system according to claim 12, wherein
the storage pack comprises a lithium ion secondary battery having a positive electrode, and
the positive electrode comprises at least one positive electrode active material selected from $Li[Ni_xMn_{(2-x)}]O_4$ ($0.05 \le x \le 0.45$), $Li[Co_xMn_{(2-x)}]O_4$ ($0.1 \le x \le 1$), $Li[Fe_xMn_{(2-x)}]O_4$ ($0.05 \le x \le 0.45$), $LiFe_aMn_bCo_cNi_dPO_4$ ($0 \le a \le 1, 0 \le b \le 1, 0 \le c \le 1, 0 \le d \le 1, a+b+c+d=1$), and $Li_3V_2(PO_4)_3$.

14. The power supplying system according to claim 12, wherein
the storage pack comprises a lithium ion secondary battery having a positive electrode, and
the positive electrode comprises a plurality of kinds of positive electrode active materials.

15. The power supplying system according to claim 12, wherein
the storage pack comprises a lithium ion secondary battery having a negative electrode, and the negative electrode comprises a plurality of kinds of negative electrode active materials.

16. The power supplying system according to claim 10, wherein the storage pack comprises a plurality of storage modules connected in parallel, and each of the plurality of storage modules comprises a plurality of storage devices connected in series, and each of the plurality of storage modules are different from each other in a number of connected storage devices.

17. The power supplying system according to claim 10, wherein the storage pack comprises a plurality of kinds of storage modules having different kinds of storage devices.

18. The power supplying system according to claim 10, wherein, in the storage pack, a ratio of a first capacity on the lower-SOC side of the start point of the step difference to a second capacity on the higher-SOC side of the end point of the step difference is within a range of 10:90 to 90:10.

* * * * *